US008168081B2

US 8,168,081 B2

(12) United States Patent
Klasen-Memmer et al.

(10) Patent No.: US 8,168,081 B2
(45) Date of Patent: May 1, 2012

(54) LIQUID-CRYSTALLINE MEDIUM

(75) Inventors: Melanie Klasen-Memmer, Heuchelheim (DE); Georg Bernatz, Darmstadt (DE); Izumi Saito, Darmstadt (DE); Matthias Bremer, Darmstadt (DE); Lars Lietzau, Darmstadt (DE); Volker Reiffenrath, Rossdorf (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 98 days.

(21) Appl. No.: 12/373,398

(22) PCT Filed: Jul. 17, 2007

(86) PCT No.: PCT/EP2007/006327
§ 371 (c)(1),
(2), (4) Date: Jan. 12, 2009

(87) PCT Pub. No.: WO2008/009417
PCT Pub. Date: Jan. 24, 2008

(65) Prior Publication Data
US 2009/0309066 A1    Dec. 17, 2009

(30) Foreign Application Priority Data
Jul. 19, 2006  (EP) .................... 06015030

(51) Int. Cl.
*C09K 19/00* (2006.01)
*C09K 19/06* (2006.01)
*C09K 19/32* (2006.01)
*C09K 19/52* (2006.01)

(52) U.S. Cl. ........ 252/299.6; 252/299.01; 252/299.61; 252/299.62; 252/299.63; 252/299.64; 252/299.65; 428/1.1; 430/20; 349/117

(58) Field of Classification Search ............ 252/299.01, 252/299.1, 299.6, 299.63; 428/1.1; 430/20; 349/117
See application file for complete search history.

(56) References Cited

U.S. PATENT DOCUMENTS

| 5,271,864 | A | 12/1993 | Wand et al. |
| 6,475,595 | B1 | 11/2002 | Bremer et al. |
| 6,548,126 | B1 | 4/2003 | Sasada et al. |
| 6,638,581 | B2 * | 10/2003 | Heckmeier et al. ............ 428/1.1 |
| 6,692,657 | B1 | 2/2004 | Kato et al. |
| 2002/0084443 | A1 | 7/2002 | Heckmeier et al. |
| 2003/0017279 | A1 | 1/2003 | Klasen-Memmer et al. |
| 2005/0104039 | A1 | 5/2005 | Kim et al. |
| 2010/0108945 | A1 * | 5/2010 | Iijima et al. .............. 252/299.61 |

FOREIGN PATENT DOCUMENTS

| CH | 678 947 | A5 | 11/1991 |
| DE | 37 34 116 | A1 | 4/1989 |
| DE | 39 06 052 | A1 | 9/1989 |
| DE | 39 06 040 | A1 | 9/1998 |
| DE | 100 13 681 | A1 | 11/2000 |
| DE | 101 07 544 | A1 | 9/2001 |
| DE | 101 58 081 | A1 | 8/2002 |
| EP | 0 969 071 | A1 | 1/2000 |
| EP | 1 081 123 | A2 | 3/2001 |

* cited by examiner

*Primary Examiner* — Geraldina Visconti
(74) *Attorney, Agent, or Firm* — Millen, White, Zelano & Branigan, P.C.

(57) ABSTRACT

The invention relates to a liquid-crystalline medium based on a mixture of dielectrically negative, polar compounds which comprises at least one compound of the formula I $$R^{11}-A^{11}-Z^{11}-A^{12}-[Z^{12}-A^{13}]_m-[Z^{13}-A^{14}]_n-R^{12} \qquad I$$

in which the parameters have the meanings indicated in claim 1,
to the use thereof in an electro-optical display, particularly in an active-matrix display based on the VA, ECB, PALC, FFS or IPS effect, and to displays of this type.

22 Claims, No Drawings

LIQUID-CRYSTALLINE MEDIUM

The present invention relates to liquid-crystal media and to the use thereof in liquid-crystal displays, and to these liquid-crystal displays, particularly liquid-crystal displays which use the ECB (electrically controlled birefringence) effect with dielectrically negative liquid crystals in a homeotropic starting alignment. The liquid-crystal media according to the invention are distinguished by a particularly short response time in the displays according to the invention at the same time as a high voltage holding ratio.

Displays which use the ECB effect have become established as so-called VAN (vertically aligned nematic) displays, for example in the MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9 and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book 11, pp. 760 to 763) designs, ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757) displays, besides IPS (in-plane switching) displays (for example: Yeo, S. D., Paper 15.3: "A LC Display for the TV Application", SID 2004 International Symposium, Digest of Technical Papers, XXXV, Book II, pp. 758 & 759), and the long-known displays, as one of the three more recent types of liquid-crystal display that are currently the most important besides TN (twisted nematic) displays, in particular for television applications. In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media of negative dielectric anisotropy ($\Delta\epsilon$), whereas TN and to date all conventional IPS displays use liquid-crystalline media of positive dielectric anisotropy.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the greatest possible value of the dielectric anisotropy. In general, at most relatively small proportions of neutral compounds and if possible no compounds having the opposite sign of the dielectric anisotropy to the medium are employed. In the case of liquid-crystal media of negative dielectric anisotropy for ECB displays, predominantly compounds of negative dielectric anisotropy are thus employed. The liquid-crystal media employed generally consist predominantly and usually even essentially of liquid-crystal compounds of negative dielectric an isotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

The liquid-crystal media of the prior art having correspondingly low addressing voltages have relatively low electrical resistance values or a low voltage holding ratio and result in undesirably high power consumptions in the displays.

In addition, the addressing voltage of the displays of the prior art is often too great, in particular for displays which are not connected directly or not continuously to the power supply network, such as, for example, displays for mobile applications.

In addition, the phase range must be sufficiently broad for the intended application.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

There is therefore a great demand for liquid-crystal media which do not have the disadvantages of the media from the prior art, or at least do so to a significantly reduced extent.

Surprisingly, it has been found that it has been possible to achieve liquid-crystal displays which have a short response time in ECB displays and at the same time have a sufficiently broad nematic phase, favourable birefringence ($\Delta n$) and a high voltage holding ratio.

The invention relates to a liquid-crystalline medium based on a mixture of polar compounds which comprises one or more compounds of the formula I

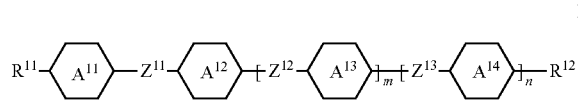

in which $R^{11}$ and $R^{12}$ each, independently of one another, denote H, an unsubstituted alkyl or alkenyl radical having up to 15 C atoms, where, in addition, one or more $CH_2$ groups in these radicals may be replaced by —O—, —S—,

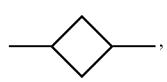

—C≡C—, —$CF_2$—O—, —O—$CF_2$—, —CO—O— or —O—CO— in such a way that O atoms are not linked directly to one another, preferably an unsubstituted alkyl, alkenyl, alkoxy or alkenyloxy radical, particularly preferably one of $R^{11}$ and $R^{12}$ denotes an alkyl or alkenyl radical and the other denotes an alkyl, alkenyl, alkoxy or alkenyloxy radical, particularly preferably $R^{11}$ denotes straight-chain alkyl or alkenyl, in particular $CH_2=CH-$, $E\text{-}CH_3-CH=CH-$, $CH_2=CH-CH_2-CH_2-$, $CH_3-CH=CHC_2H_4-$, $CH_3-$, $C_2H_5-$, $n\text{-}C_3H_7-$, $n\text{-}C_4H_9-$ or $n\text{-}C_5H_{11}-$, one of the rings

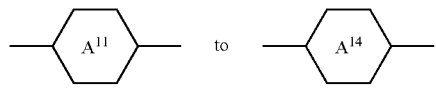

present denotes

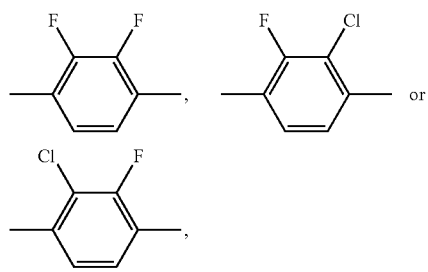

preferably

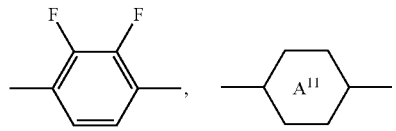

and another of the rings to

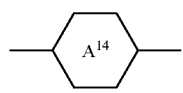

present denotes

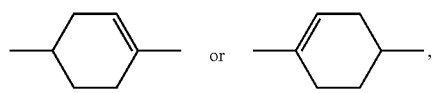

and the others, if present, each, independently of one another, denote

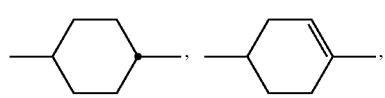

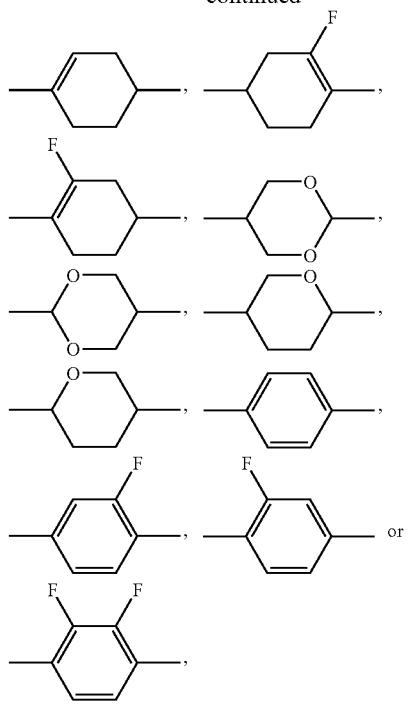

preferably

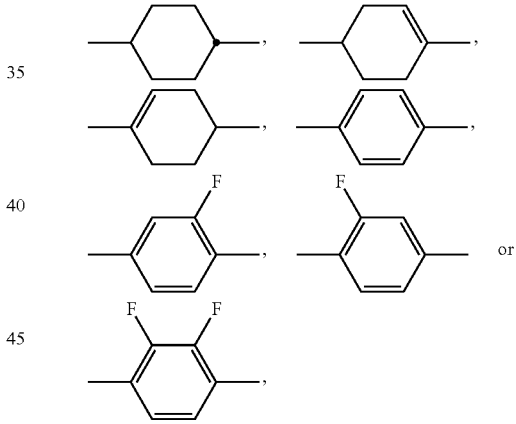

$Z^{11}$ to $Z^{13}$ each, independently of one another, denote $-CH_2-CH_2-$, $-CH=CH-$, $-C\equiv C-$, $-CH_2-O-$, $-O-CH_2-$, $-CO-O-$, $-O-CO-$, $-CF_2-O-$, $-O-CF_2-$, $-CF_2-CF_2-$ or a single bond, preferably $-CH_2-CH_2-$, $-CH=CH-$, $-C\equiv C-$, $-CF_2-O-$, $-O-CF_2-$ or a single bond, particularly preferably one or, if present, more of $Z^{11}$ to $Z^{13}$ and very particularly preferably $Z^{11}$ to $Z^{13}$ all denote a single bond, m and n each, independently of one another, denote 0 or 1, and (m+n) preferably denotes 0 or 1.

Media of this type are to be used, in particular, for electro-optical displays with active-matrix addressing based on the ECB effect and for IPS (in-plane switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\epsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the so-called IPS effect.

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred here, the electro-optical effect used to date was predominantly the TN effect.

A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays most used hitherto usually operate as TN cells with crossed polarisers in transmission and are back-lit. For TV applications, displays containing IPS cells or ECN (or VAN) cells have recently been used to an increased extent.

The term MLC displays here covers any matrix display with integrated non-linear elements, i.e. besides the active matrix also displays with passive elements, such as varistors or diodes (MIM=metal-insulator-metal).

MLC displays of this type are particularly suitable for TV applications (for example pocket televisions) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty of producing grey shades in these displays.

There thus continues to be a great demand for MLC displays having very high specific resistance at the same time as a wide operating-temperature range, short response times and a low threshold voltage with the aid of which various grey shades can be produced.

The invention has the object of providing MLC displays, not only for monitor and TV applications, but also for mobile telephones and navigation systems, which are based on the ECB or IPS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has now been found that this object can be achieved if nematic liquid-crystal mixtures which comprise at least one compound of the formula I are used in these display elements. Compounds of the formula I are known, for example, from DE 39 06 040 as liquid crystals and from DE 102 04 236 as intermediates. U.S. Pat. No. 6,548,126 and U.S. Pat. No. 6,395,353 disclose compounds of the formula I in liquid-crystal mixtures.

The invention thus relates to a liquid-crystalline medium based on a mixture of polar compounds which comprises at least one compound of the formula I.

The mixtures according to the invention exhibit very broad nematic phase ranges with clearing points $\geq 85°$ C., very favourable values for the capacitive threshold, relatively high values for the holding ratio and at the same time very good low-temperature stabilities at $-30°$ C. and $-40°$ C. as well as very low rotational viscosities. The mixtures according to the invention are furthermore distinguished by a good ratio of clearing point and rotational viscosity and high negative dielectric anisotropy.

Particular preference is given to compounds of the formula I in which at least one of the groups

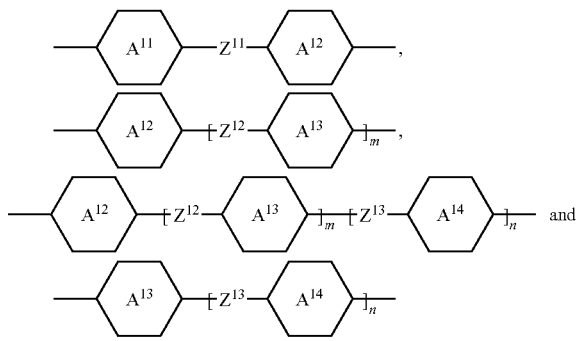

present in the compound of the formula I denotes

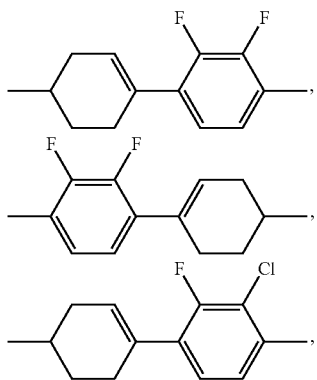

-continued

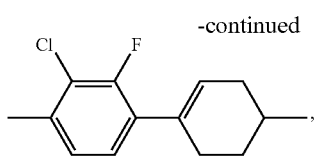

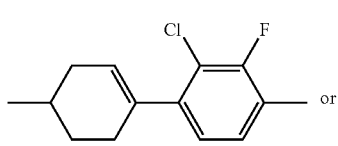

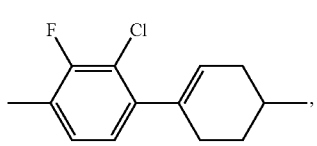

preferably

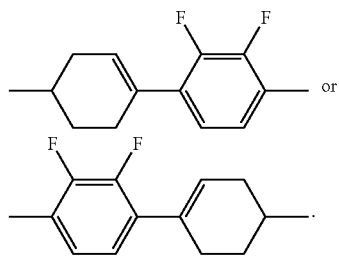

Particular preference is given to compounds of the formula I in which
a) $R^{11}$ and/or $R^{12}$ denote H, alkyl, alkenyl or alkoxy, preferably having up to 6 C atoms, $R^{12}$ very particularly preferably denotes alkoxy or alkenyloxy,
b) $R^{11}$ and $R^{12}$ both denote alkyl, where the alkyl radical may be identical or different,
c) $R^{11}$ denotes straight-chain alkyl, vinyl, 1E-alkenyl or 3-alkenyl.

If $R^{11}$ and/or $R^{12}$ denote alkenyl, this is preferably $CH_2=CH$, $CH_3-CH=CH$, $CH_2=CH-C_2H_5$ or $CH_3-CH=CH-C_2H_5$.

The medium according to the invention preferably comprises one, two, three, four or more, preferably one, two or three, compounds of the formula I.

The media according to the invention are preferably dielectrically negative.

The liquid-crystal media according to the invention preferably comprise
a) a first dielectrically negative, mesogenic component (component A), which preferably consists of one or more dielectrically negative compound(s) of the formula I,
b) a second dielectrically negative, mesogenic component (component B), which consists of one or more dielectrically negative compound(s) of the formula II

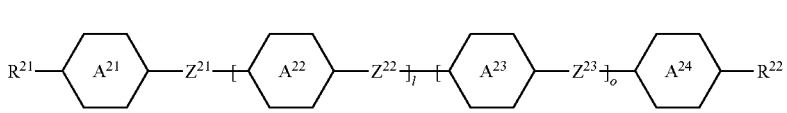

in which
$R^{21}$ and $R^{22}$ each, independently of one another, denote H, an unsubstituted alkyl or alkenyl radical having up to 15 C atoms, where, in addition, one or more $CH_2$ groups in these radicals may be replaced by —O—, —S—,

—C≡C—, —$CF_2$—O—, —O—$CF_2$—, —CO—O— or —O—CO— in such a way that O atoms are not linked directly to one another, preferably an unsubstituted alkyl, alkenyl, alkoxy or alkenyloxy radical, particularly preferably one of $R^{21}$ and $R^{22}$ denotes an alkyl or alkenyl radical and the other denotes an alkyl, alkenyl, alkoxy or alkenyloxy radical, preferably, independently of one another, alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, particularly preferably one of $R^{21}$ and $R^{22}$, preferably $R^{11}$, denotes an alkyl or alkenyl radical and the other denotes an alkyl, alkenyl, alkoxy or alkenyloxy radical, particularly preferably $R^{21}$ denotes straight-chain alkyl, in particular $CH_3$—, $C_2H_5$—, n-$C_3H_7$, n-$C_4H_9$— or n-$C_5H_{11}$—, or alkenyl, in particular $CH_2$=CH—, E-$CH_3$—CH=CH—, $CH_2$=CH—$CH_2$—$CH_2$—, E-$CH_3$—CH=CH—$CH_2$—$CH_2$— or E-n-$C_3H_7$—CH=CH—, one of the rings

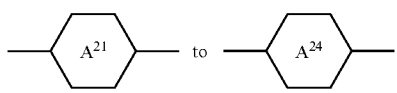

present denotes

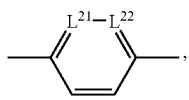

and the others, if present, each, independently of one another, denote

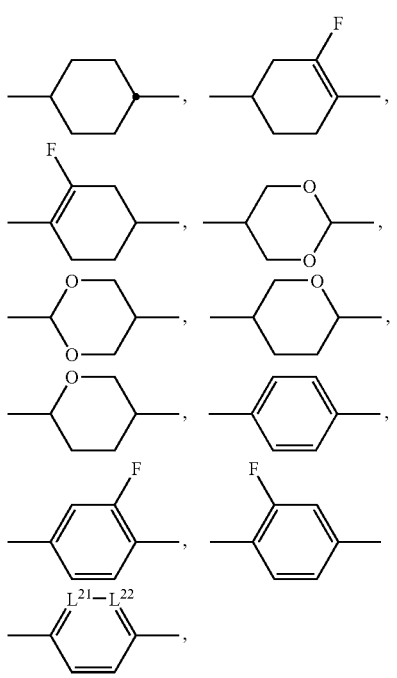

preferably

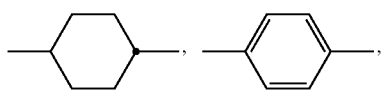

-continued

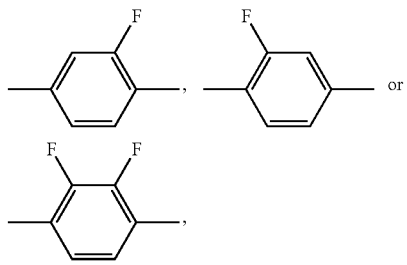

particularly preferably

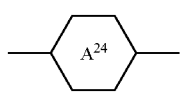

denotes

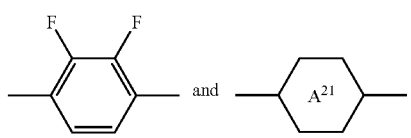

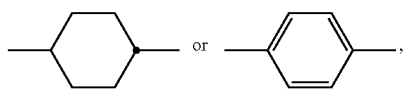

denotes $L^{21}$ and $L^{22}$ each, independently of one another, denote =C($X^2$)— or =N—, preferably at least one of $L^{21}$ and $L^{22}$ denotes =C(—F)— and the other denotes =C(—F)— or =C(—Cl)—, particularly preferably $L^{21}$ and $L^{22}$ both denote =C(—F)—, $X^2$ denotes F, Cl, $OCF_3$, $CF_3$, $CH_3$, $CH_2F$, $CHF_2$, preferably F or Cl, particularly preferably F,

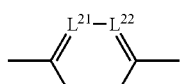

preferably denotes

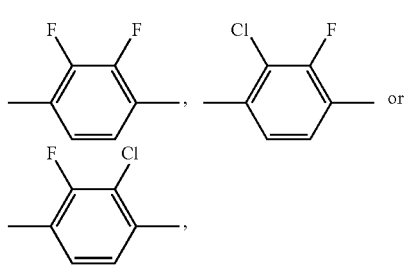

particularly preferably

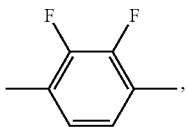

$Z^{21}$ to $Z^{23}$ each, independently of one another, denote —CH$_2$—CH$_2$—, —CH$_2$—CF$_2$—, —CF$_2$—CH$_2$—, —CF$_2$—CF$_2$—, —CH=CH—, —CF=CH—, —CH=CF—, —C≡C—, —CH$_2$—O—, —O—CH$_2$—, —O—, —CH$_2$—, —CO—O—, —O—CO—, —CF$_2$—O—, —O—CF$_2$— or a single bond, preferably —CH$_2$—CH$_2$—, —CH=CH—, —C≡C—, —CF$_2$—O—, —O—CF$_2$— or a single bond, particularly preferably one or, if present, more of $Z^{21}$ to $Z^{23}$ denote a single bond, and very particularly preferably all denote a single bond, l and o each, independently of one another, denote 0 or 1, and (l+o) preferably denotes 0 or 1, and/or c) a dielectrically neutral, mesogenic component (component C), which consists of one or more dielectrically neutral compounds of the formula III

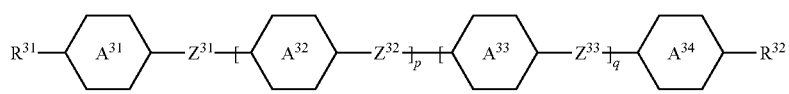

III in which $R^{31}$ and $R^{32}$ each, independently of one another, have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy,

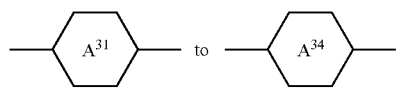

each, independently of one another, denote

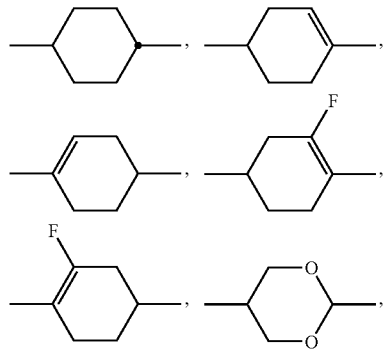

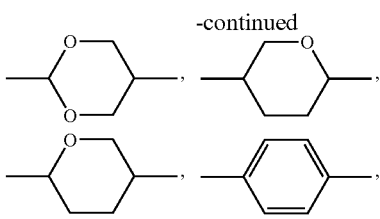

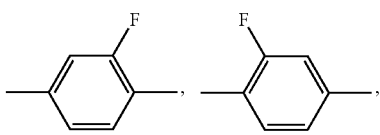

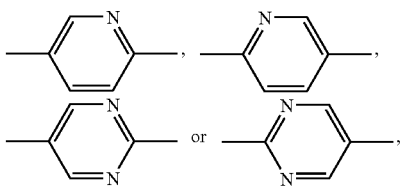

preferably

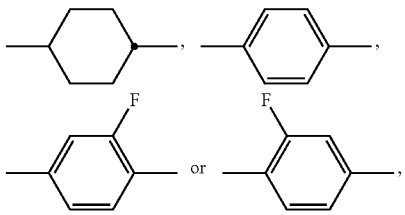

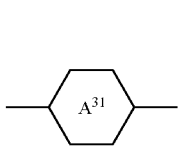

preferably denotes

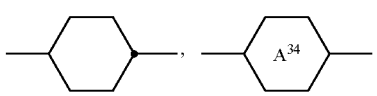

preferably denotes

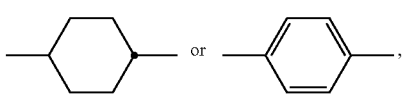

and, if present,

preferably denotes

$Z^{31}$ to $Z^{33}$ each, independently of one another, have one of the meanings given for $Z^{11}$ to $Z^{13}$ and preferably denote —CH$_2$—CH$_2$—, —CH=CH—, —C≡C—, —COO— or a single bond, preferably —CH$_2$—CH$_2$— or a single bond and particularly preferably a single bond, p and q each, independently of one another, denote 0 or 1,
(p+q) preferably denotes 0 or 1, preferably 0,
and/or
d) a further dielectrically negative, mesogenic component (component D), which consists of one or more dielectrically negative compounds selected from the group of the compounds of the formulae IV and V

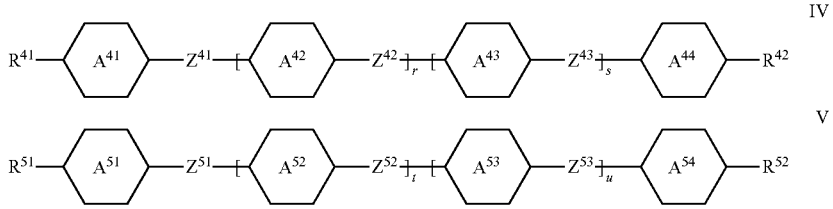

in which
$R^{41}$, $R^{42}$, $R^{51}$ and $R^{52}$ each, independently of one another, have one of the meanings given for $R^{11}$ and $R^{12}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy, one of the rings

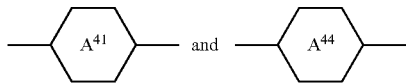

denotes

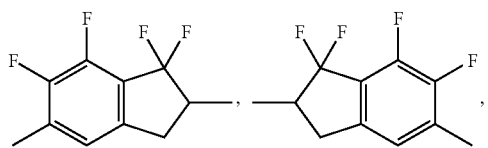

preferably

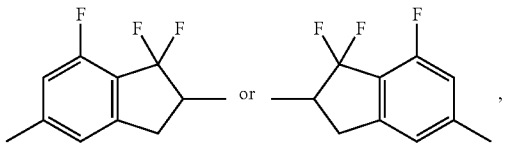

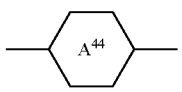

denotes

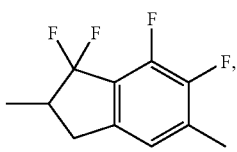

and the other rings

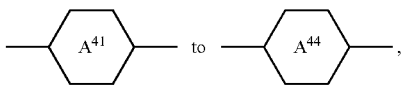

if present, each, independently of one another, denote

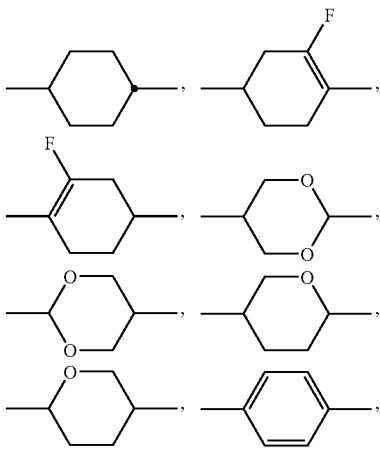

-continued
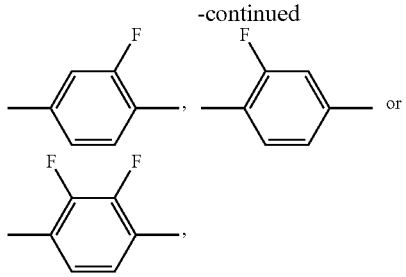
preferably
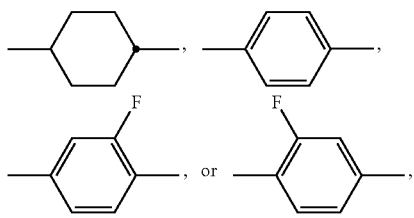
particularly preferably
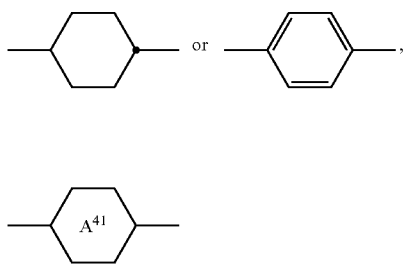
also denotes a single bond,
in the case where
denotes
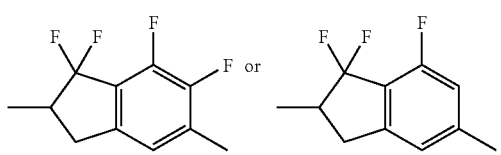
$R^{42}$ preferably denotes H,
one of the rings
to
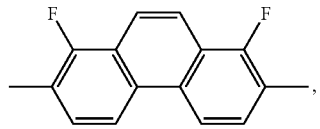
denotes
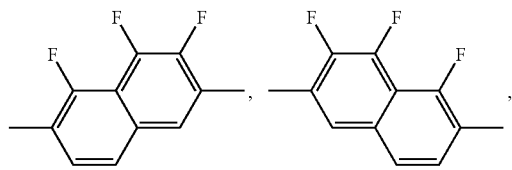
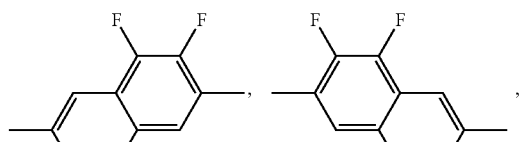
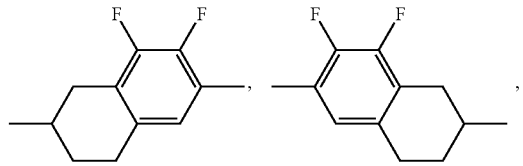
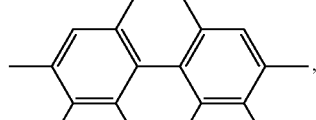
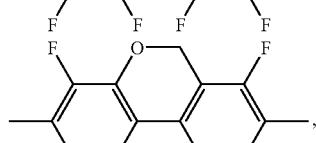
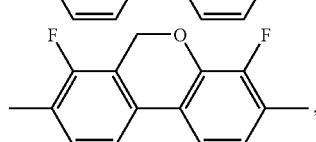
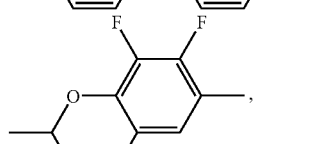
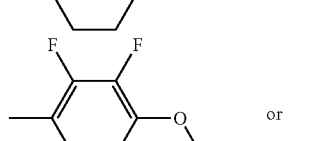
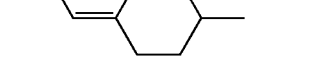

-continued

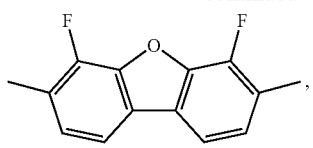

preferably

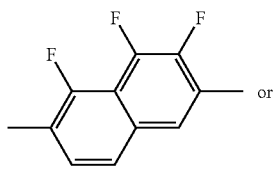

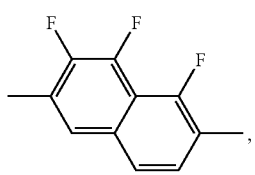

and the others, if present, each, independently of one another, denote

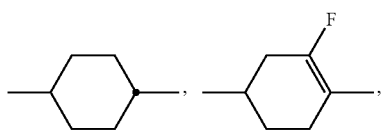

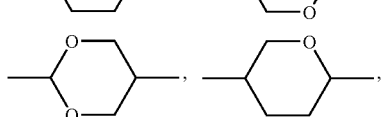

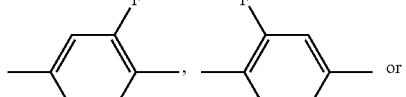

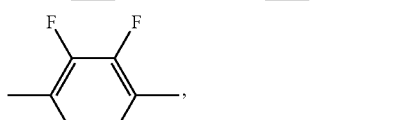

preferably

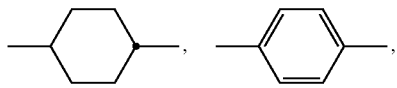

-continued

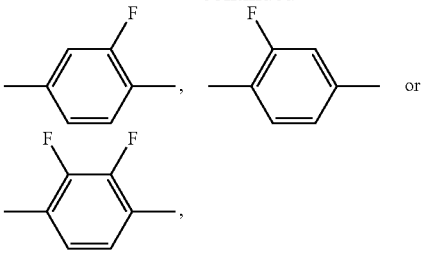

also denotes a single bond,
$Z^{41}$ to $Z^{43}$ and
$Z^{51}$ to $Z^{53}$ each, independently of one another, have one of the meanings given for $Z^{11}$ to $Z^{13}$ and preferably denote —$CH_2$—$CH_2$—, —CH=CH—, —C≡C—, —COO— or a single bond, preferably —$CH_2$—$CH_2$— or a single bond and particularly preferably a single bond,
r and s each, independently of one another, denote 0 or 1,
(r+s) preferably denotes 0 or 1, preferably 0,
t and u each, independently of one another, denote 0 or 1,
(t+u) preferably denotes 0 or 1, preferably 0,
and optionally
e) a chiral component (component E), which consists of one or more chiral compounds.

The compounds of the formula I are preferably selected from the sub-formulae IA and IB

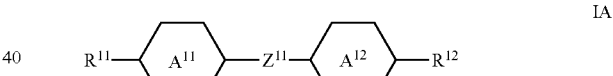

IA

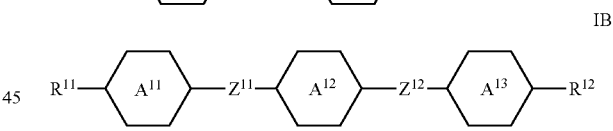

IB in which the parameters have the meaning given above under formula I.

The compounds of the formula I are particularly preferably selected from the sub-formulae IA-1 and IB-1 to IB-10, preferably IA-1, and IB-1 to IB-3, IB-9 and IB-10

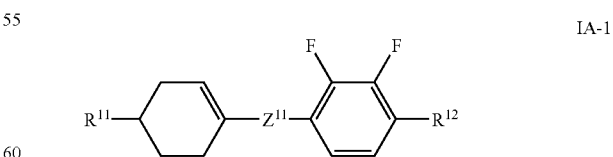

IA-1

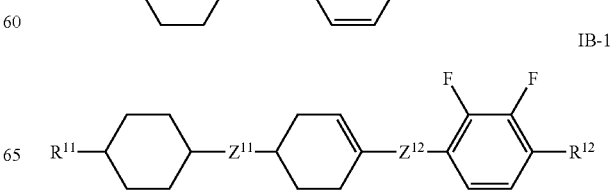

IB-1

-continued

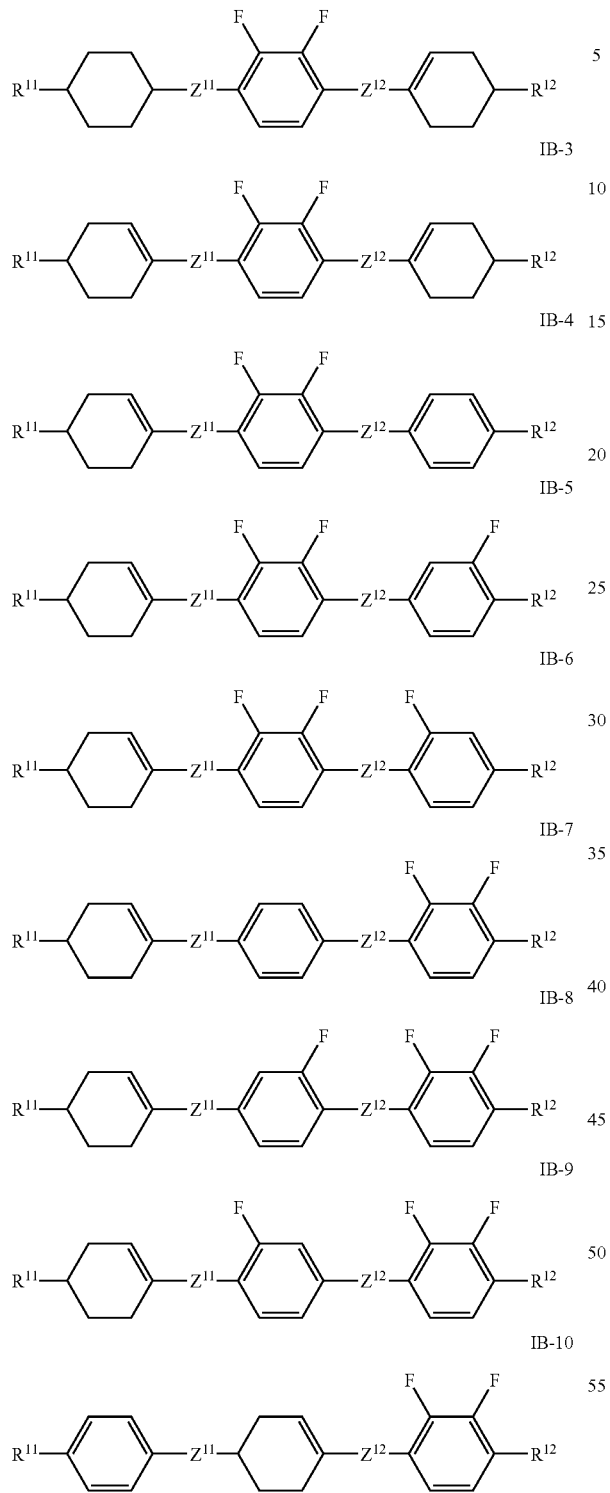

in which the parameters have the meaning given above, and preferably one or both of $Z^{11}$ and, if present, $Z^{12}$ denote a single bond.

The compounds of the formula I are very particularly preferably selected from the sub-formulae IA'-1 and IB'-1 to IB'-4, preferably from the formulae IA'-1 and/or IB'-1,

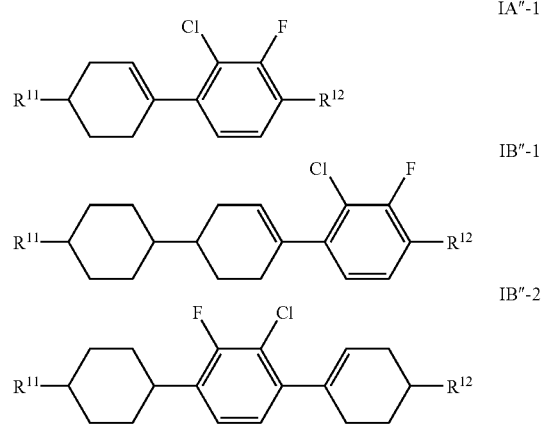

in which the parameters have the meaning given above, and $R^{11}$ and $R^{12}$ preferably, independently of one another, denote alkyl having 1 to 7, preferably having 1 to 5, C atoms, preferably n-alkyl, or alkenyl having 2 to 5 C atoms, preferably 1-alkenyl, and particularly preferably, in particular in the case of formulae IA'-1 and IB'-1, $R^{12}$ denotes $(O)C_vH_{2v+1}$, where v denotes 1 to 6.

In a preferred embodiment, the medium comprises one or more compounds of the formulae IA and/or IB selected from the group of the compounds of the formulae IA"-1, IB"-1 and IB"-2, preferably of the formulae IA"-1 and/or IB"-1, in which the parameters have the meaning given above, and $R^{11}$ and $R^{12}$ preferably, independently of one another, denote alkyl having 1 to 7, preferably having 1 to 5, C atoms, preferably n-alkyl, or alkenyl having 2 to 5 C atoms, preferably 1-alkenyl, and particularly preferably $R^{12}$ denotes $(O)C_vH_{2v+1}$, where v denotes 1 to 6.

In a further preferred embodiment, the medium comprises one or more compounds of the formula IA and/or IB selected from the group of the compounds of the formulae IA'''-1, IB'''-1 and IB'''-2, preferably of the formulae IA''-1 and/or IB''-1,

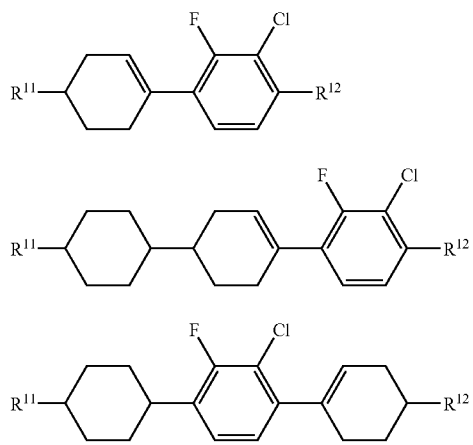

IA''-1

IB''-1

IB''-2 in which the parameters have the meaning given above, and $R^{11}$ and $R^{12}$ preferably, independently of one another, denote alkyl having 1 to 7, preferably having 1 to 5, C atoms, preferably n-alkyl, or alkenyl having 2 to 5 C atoms, preferably 1-alkenyl, and particularly preferably $R^{12}$ denotes $(O)C_vH_{2v+1}$, where v denotes 1 to 6.

In a further preferred embodiment, the medium comprises one or more compounds of the formula IA'-1 selected from the group of the compounds of the formulae IA'-1a and IA'-1b, preferably of the formula IA'-1b,

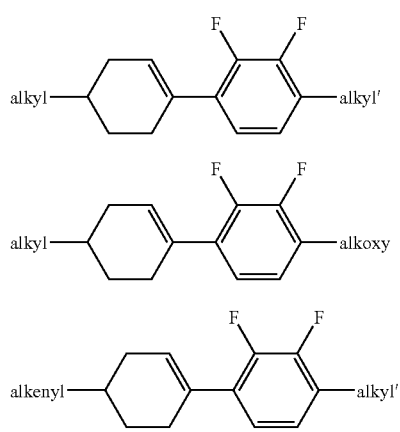

IA'-1a

IA'-1b

IA'-1c

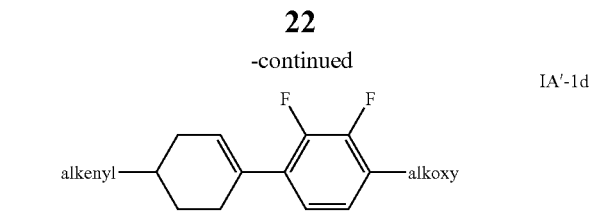

IA'-1d in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula IB'-1 selected from the group of the compounds of the formulae IB'-1 a to IB'-1d, preferably of the formulae IB'-1a and/or IB'-1b,

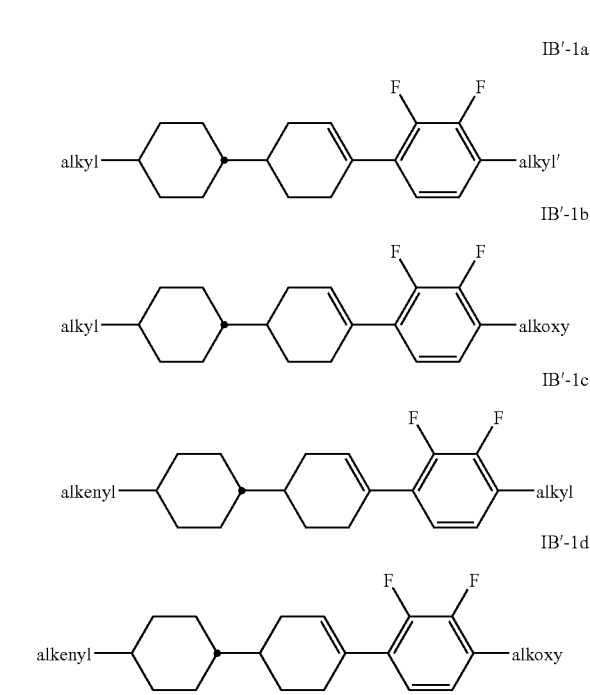

IB'-1a

IB'-1b

IB'-1c

IB'-1d in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a preferred embodiment, the medium comprises one or more compounds of the formula II, selected from the group of the compounds of the formulae IIA to IIC, preferably IIA and IIB,

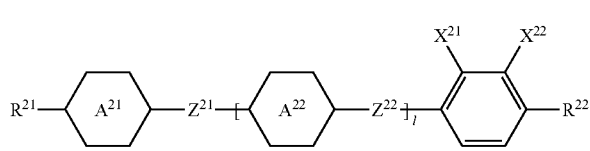

IIA

-continued

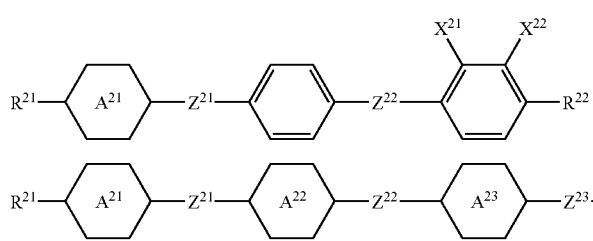

in which the parameters have the meanings indicated above, but in formula IIA

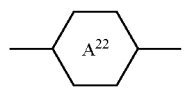

does not denote

and preferably

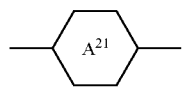

and

independently of one another, denote

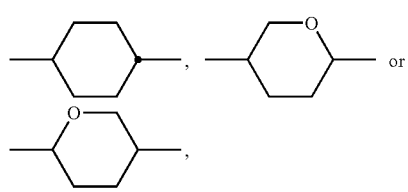

and particularly preferably

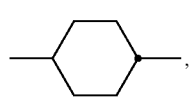

$R^{21}$ denotes alkyl,
$R^{22}$ denotes alkyl or alkoxy, particularly preferably $(O)C_vH_{2v+1}$,
$X^{21}$ and $X^{22}$ both denote F,
$Z^{21}$ and $Z^{22}$, independently of one another, denote a single bond, —CH$_2$—CH$_2$—, —CH=CH—, —CH$_2$O—, —OCH$_2$—, —O—, —CH$_2$—, —CF$_2$O— or —OCF$_2$—, preferably a single bond or —CH$_2$CH$_2$—, particularly preferably a single bond,
p denotes 1 or 2, and
v denotes 1 to 6.

In a preferred embodiment, the medium comprises one or more compounds of the formula II selected from the group of the compounds of the formulae II-1 to II-13

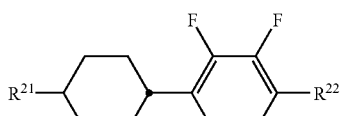

II-1

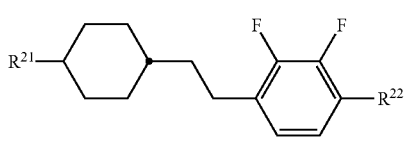

II-2

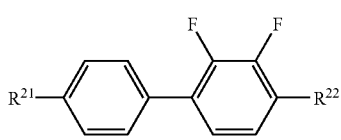

II-3

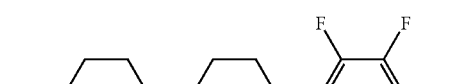

II-4

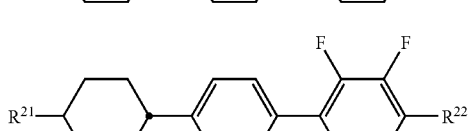

II-5

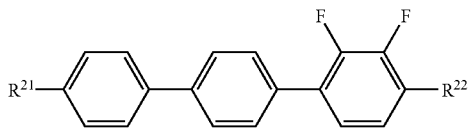

II-6

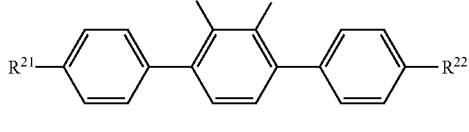

II-7

-continued

II-8
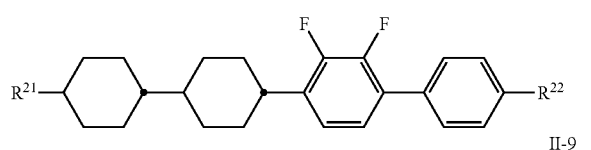

II-9
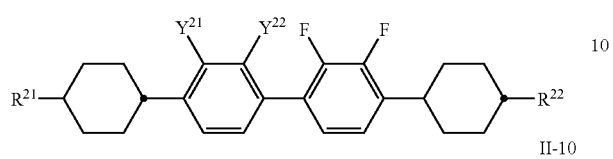

II-10
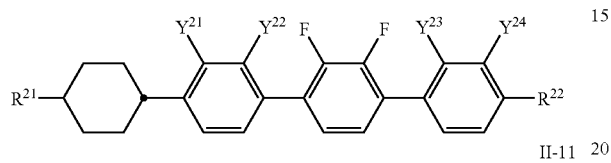

II-11
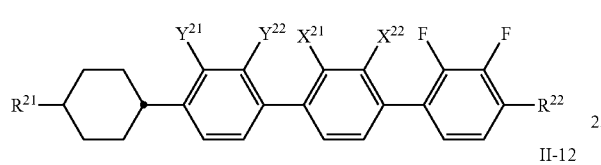

II-12
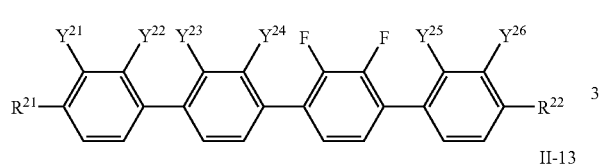

II-13
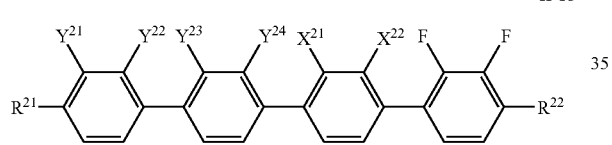

in which
$Y^{21}$ to $Y^{26}$, independently of one another, denote H or F, and $X^{21}$ and $X^{22}$ both denote H, or one of $X^{21}$ and $X^{22}$ denotes H and the other denotes F,
but preferably at most four, particularly preferably at most three and very particularly preferably one or two, of $Y^{21}$ to $Y^{26}$, $X^{21}$ and $X^{22}$ denote F,
and
the other parameters have the respective meaning indicated above for formula II, and preferably
$R^{21}$ denotes alkyl or alkenyl, and
$R^{22}$ denotes alkyl, alkenyl, alkoxy or alkenyloxy, preferably $(O)C_vH_{2v+1}$, and
v denotes an integer from 1 to 6.

In a further preferred embodiment, the medium comprises one or more compounds of the formula II-1, selected from the group of the compounds of the formulae II-1a to II-1d, preferably of the formulae II-1b and/or II-1d, particularly preferably of the formula II-1b, II-1a
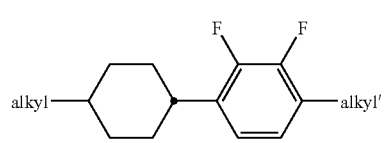

-continued

II-1b
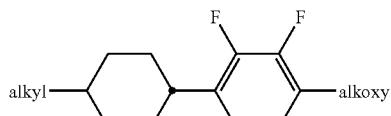

II-1c
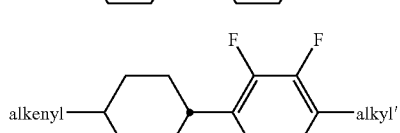

II-1d
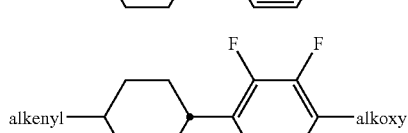

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

Preferred compounds of the formulae II-1c and II-1d are the compounds of the following formulae:

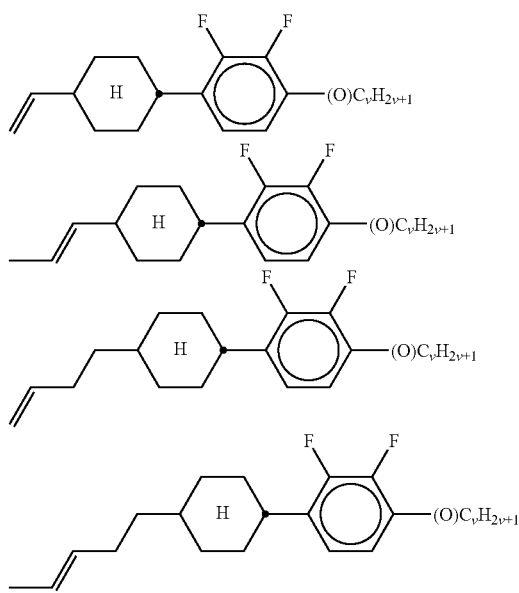

in which v has the meaning indicated above.
Further preferred compounds of the formula II-1 are the compounds of the following formulae:

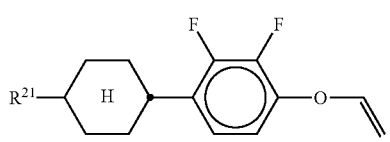

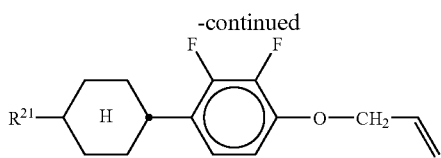

in which R²¹ has the respective meaning indicated above for formula II.

In a preferred embodiment, the medium comprises one or more compounds of the formula II-3, selected from the group of the compounds of the formulae II-3a to II-3d, preferably of the formulae II-3b and/or II-3d, particularly preferably of the formula II-3b, II-3a
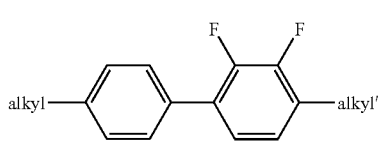

II-3b
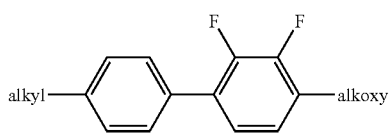

II-3c
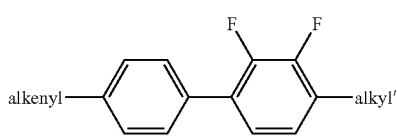

II-3d
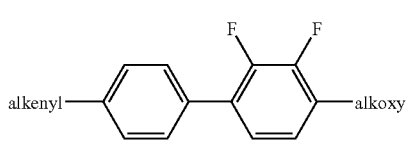

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

The concentration of these biphenyl compounds in the mixture as a whole is preferably 3% by weight or more, in particular 5% by weight or more and very particularly preferably from 5 to 25% by weight.

In a further preferred embodiment, the medium comprises one or more compounds of the formula II-4, selected from the group of the compounds of the formulae II-4-a to II-4-d, preferably of the formulae II-4-a and/or II-4-b, particularly preferably of the formula II-4-b, II-4a
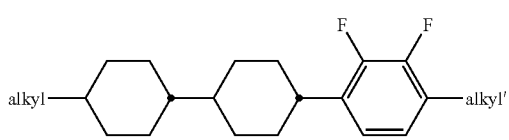

II-4b
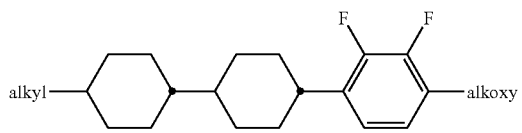

II-4c
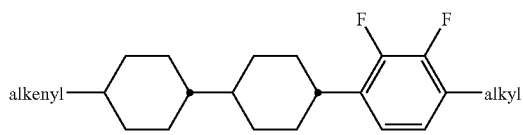

II-4d
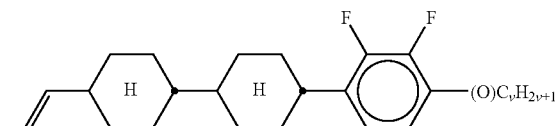

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

Preferred compounds of the formulae II-4-c and II-4-d are the compounds of the following formulae:

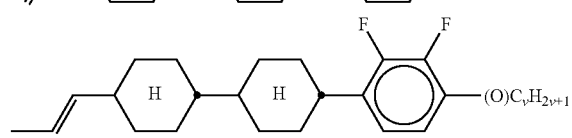

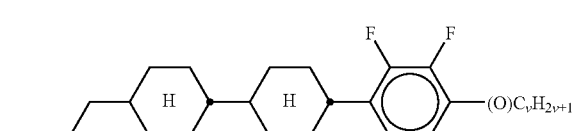

in which v has the meaning indicated above.

In a further preferred embodiment, the medium comprises one or more compounds of the formula II-4 of the following sub-formula II-4-e II-4e

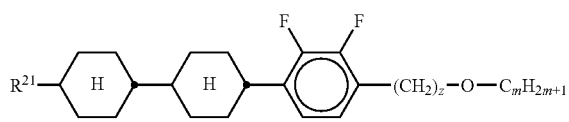

in which
R$^{21}$ has the meaning indicated above, and
m and z each, independently of one another, denote an integer from 1 to 6, and
m+z preferably denotes an integer from 1 to 6.

In a further preferred embodiment, the medium comprises one or more compounds of the formula II-5, selected from the group of the compounds of the formulae II-5a to II-5d, preferably of the formulae II-5b and/or II-5d, II-5a

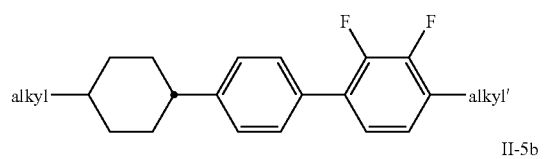

II-5b

II-5c

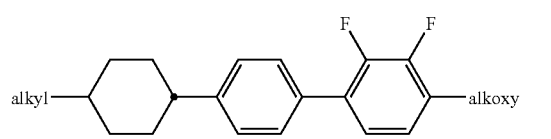

II-5d

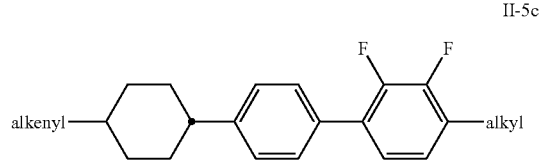

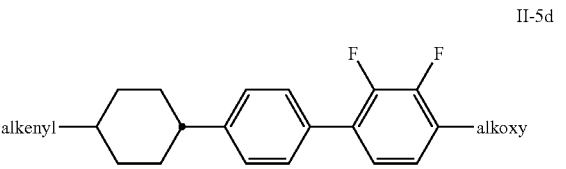

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

Preferred compounds of the formulae II-5c and II-5d are the compounds of the following formulae:

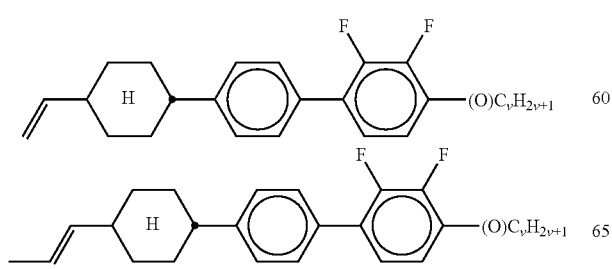

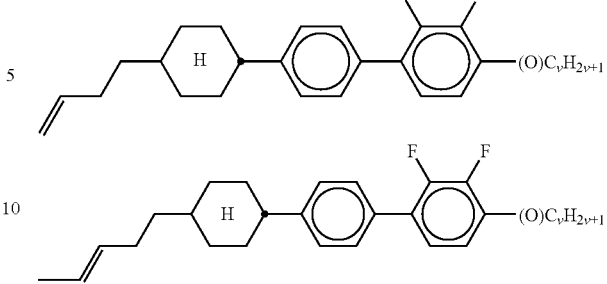

in which v has the meaning indicated above.

In a further preferred embodiment, the medium comprises one or more compounds of the formula I-4, selected from the group of the compounds of the formulae II-6a to II-6d, preferably of the formulae II-6a and/or II-6c, particularly preferably of the formula II-6a, II-6a

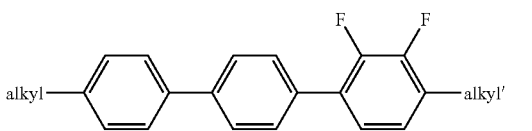

II-6b

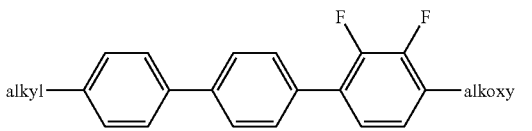

II-6c

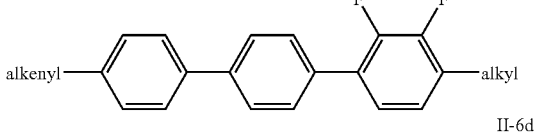

II-6d

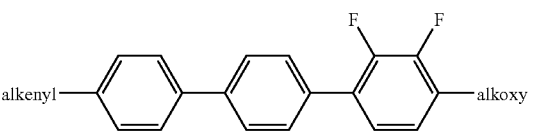

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms,
and/or the group of the compounds of the formulae II-6e to II-6m II-6e

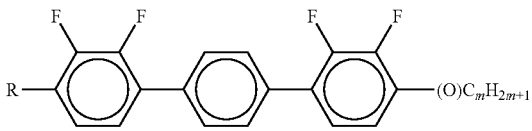

II-6f
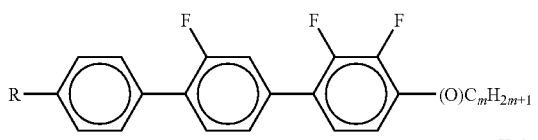

II-6g
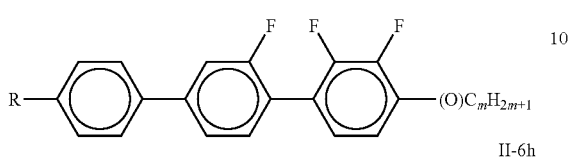

II-6h
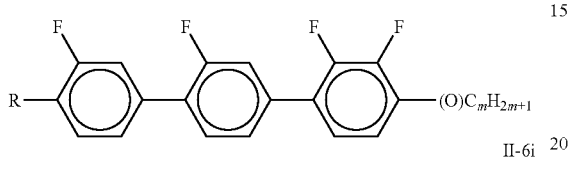

II-6i
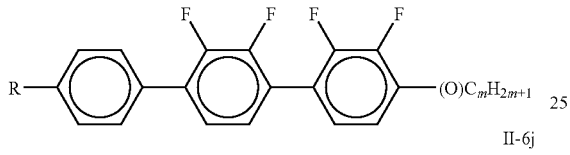

II-6j
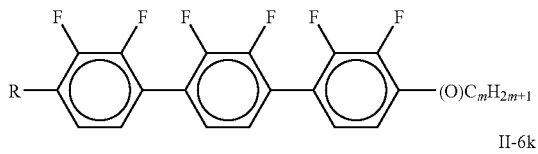

II-6k
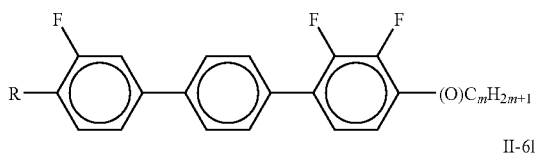

II-6l
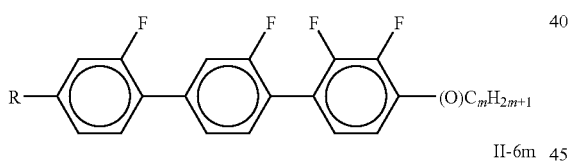

II-6m
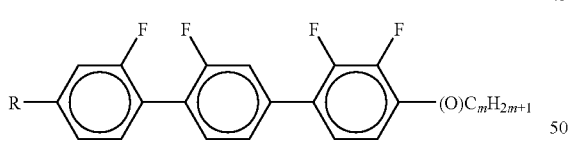

in which
R has the meaning given above for $R^{21}$, and
m denotes an integer from 1 to 6.
R preferably denotes straight-chain alkyl or alkoxy, each having 1 to 6 C atoms, or alkylalkoxy, alkenyl or alkenyloxy having 2-6 C atoms, particularly preferably alkyl having 1-5 C atoms, preferably methyl, ethyl, propyl, butyl, or furthermore alkoxy having 1-5 C atoms, preferably hexyl, methoxy, ethoxy, propoxy or butoxy.

In a further preferred embodiment, the medium comprises one or more compounds of the formula II-7, selected from the group of the compounds of the formulae II-7a to II-7d, preferably of the formulae II-7a and/or II-7c, particularly preferably of the formula II-7a, II-7a
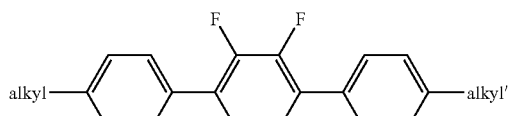

II-7b
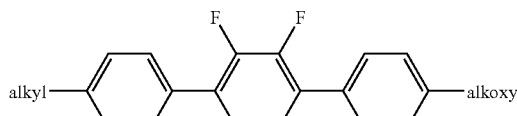

II-7c
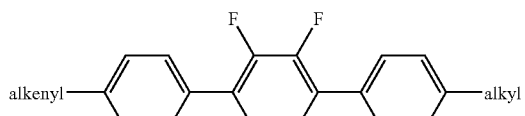

II-7d
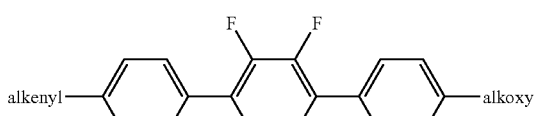

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms,
and/or the group of the compounds of the formulae II-7e to II-7i II-7e
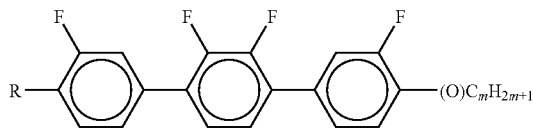

II-7f
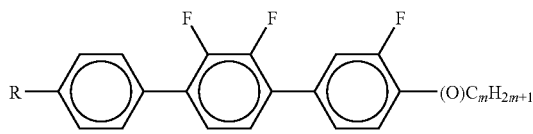

II-7g
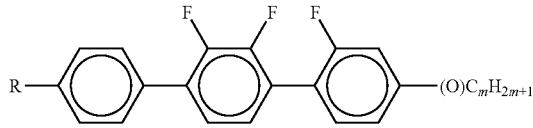

II-7h
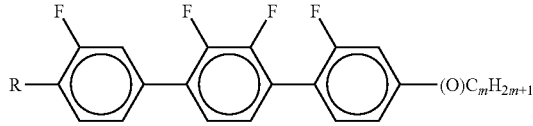

-continued

II-7i
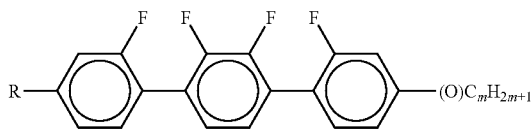

in which

R has the meaning given above for $R^{21}$, and m denotes an integer from 1 to 6.

R preferably denotes straight-chain alkyl or alkoxy, each having 1 to 6 C atoms, or alkylalkoxy, alkenyl or alkenyloxy having 2-6 C atoms, particularly preferably alkyl having 1-5 C atoms, preferably methyl, ethyl, propyl, butyl, or furthermore alkoxy having 1-5 C atoms, preferably hexyl, methoxy, ethoxy, propoxy or butoxy.

In a further preferred embodiment, the medium comprises one or more compounds of the formula II-8, selected from the group of the compounds of the formulae II-8a and II-8b, particularly preferably II-8b, II-8a
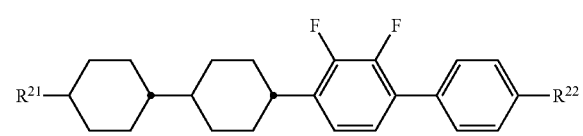

II-8b
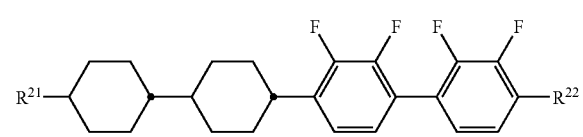

in which the parameters have the meanings indicated above.

In a further preferred embodiment, the medium comprises one or more compounds of the formula II-9, selected from the group of the compounds of the formulae II-9a to II-9d II-9a
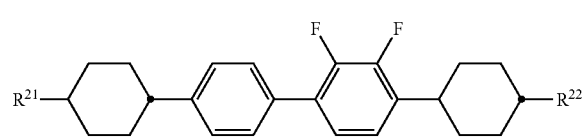

II-9b
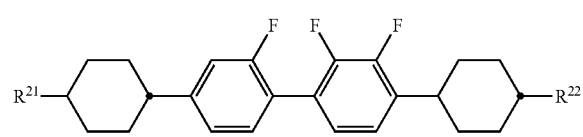

II-9c
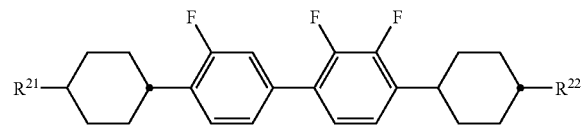

II-9d
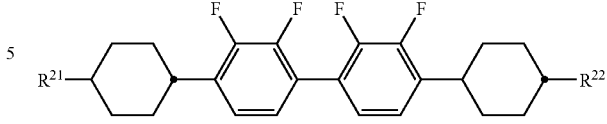

in which the parameters have the meanings indicated above, and preferably $R^{22}$ denotes $C_vH_{2v+1}$, and v denotes an integer from 1 to 6.

In a further preferred embodiment, the medium comprises one or more compounds of the formula II-10, selected from the group of the compounds of the formulae II-10a to II-10e II-10a
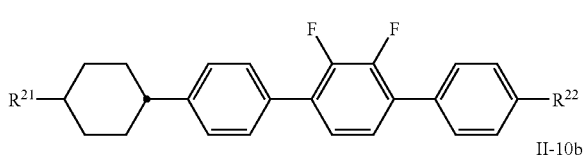

II-10b
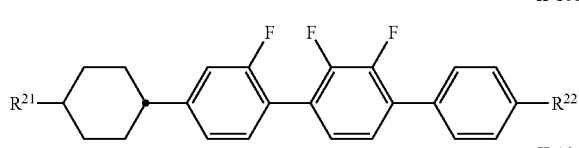

II-10c
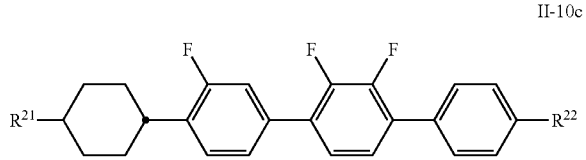

II-10d
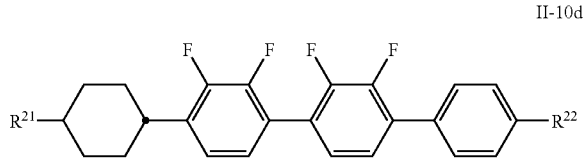

II-10e
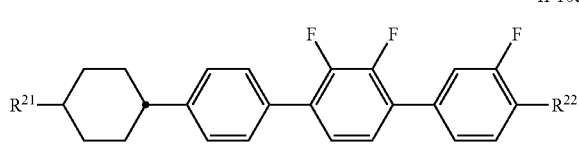

in which the parameters have the meanings indicated above, and preferably $R^{22}$ denotes $C_vH_{2v+1}$, and v denotes an integer from 1 to 6.

In a further preferred embodiment, the medium comprises one or more compounds of the formula II-11, selected from the group of the formulae II-11a and II-11b, particularly preferably II-11b, II-11a
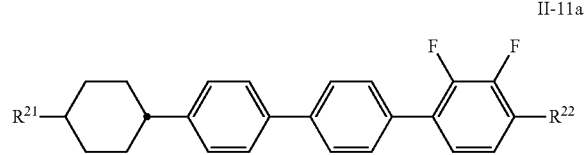

-continued

II-11b
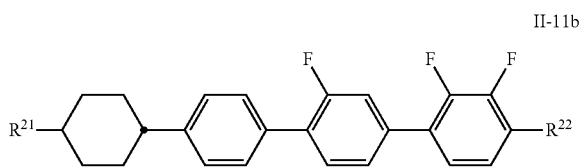

in which the parameters have the meanings indicated above.

In a preferred embodiment, the medium comprises one or more compounds of the formula II selected from the group of the compounds of the formulae II'-1 and II'-2 and/or II"-1 and II"-2 and/or II'''-1 to II'''-3 and/or II$^{(IV)}$-1 to II$^{(IV)}$-3 and/or II$^{(V)}$-1

II'-1
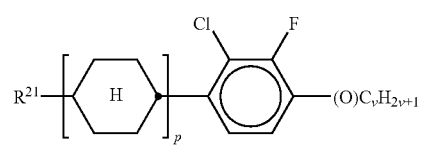

II'-2
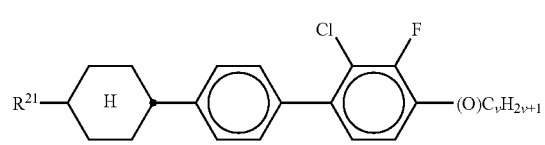

II"-1
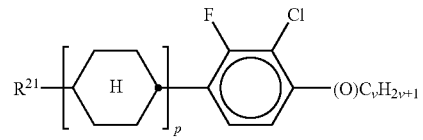

II"-2
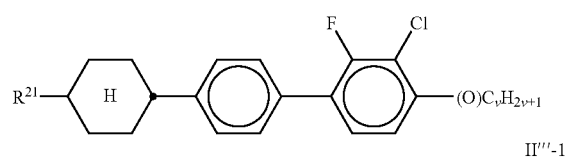

II'''-1
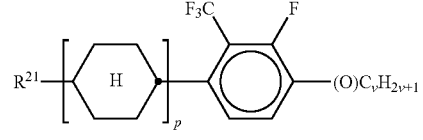

II'''-2
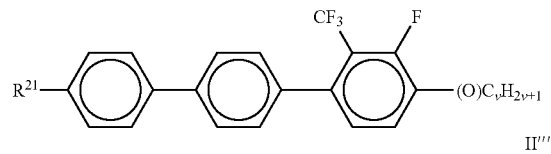

II'''-3
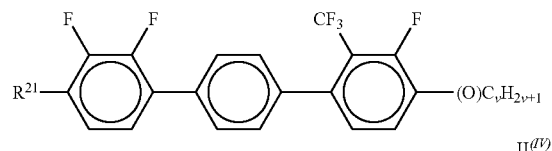

II$^{(IV)}$-1
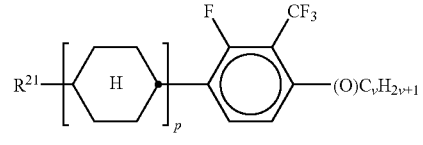

II$^{(IV)}$-2
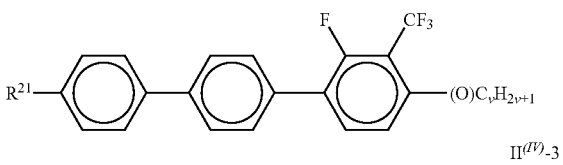

II$^{(IV)}$-3
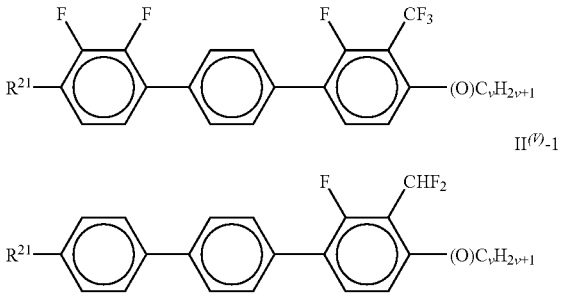

II$^{(V)}$-1
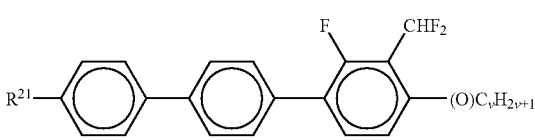

in which the parameters have the respective meaning given above, and p denotes 0, 1 or 2, and preferably R$^{21}$ denotes alkyl or alkenyl.

Particular preference is given to the compounds of the above formulae in which R$^{21}$ denotes straight-chain alkyl, in particular CH$_3$, C$_2$H$_5$, n-C$_3$H$_7$, n-C$_4$H$_9$ or n-C$_5$H$_{11}$, or alkenyl, in particular CH$_2$=CH, CH$_3$CH=CH, CH$_2$=CHCH$_2$CH$_2$, CH$_3$CH=CHC$_2$H$_4$ or C$_3$H$_7$CH=CH.

In a further preferred embodiment, the medium comprises one or more compounds of the formula III in which at least two of the rings

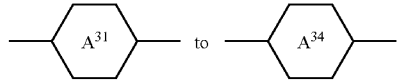

each, independently of one another, denote

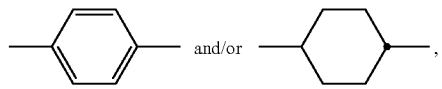

where very particularly preferably two adjacent rings are linked directly, preferably

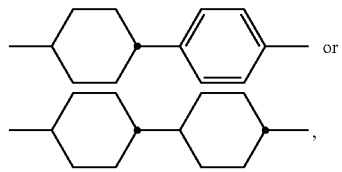

where one or more H atoms in the phenylene ring may be replaced, independently of one another, by F or CN, preferably by F, and one or two non-adjacent CH$_2$ groups of the cyclohexylene ring or of one of the two cyclohexylene rings may be replaced by O atoms.

In a further preferred embodiment, the medium comprises one or more compounds of the formula III from the group of the compounds of the formulae III-1 to III-11, preferably selected from the group of the compounds of the formulae III-1 to III-9, preferably from the group III-1 to III-6 and particularly preferably from the group III-1 and III-4,

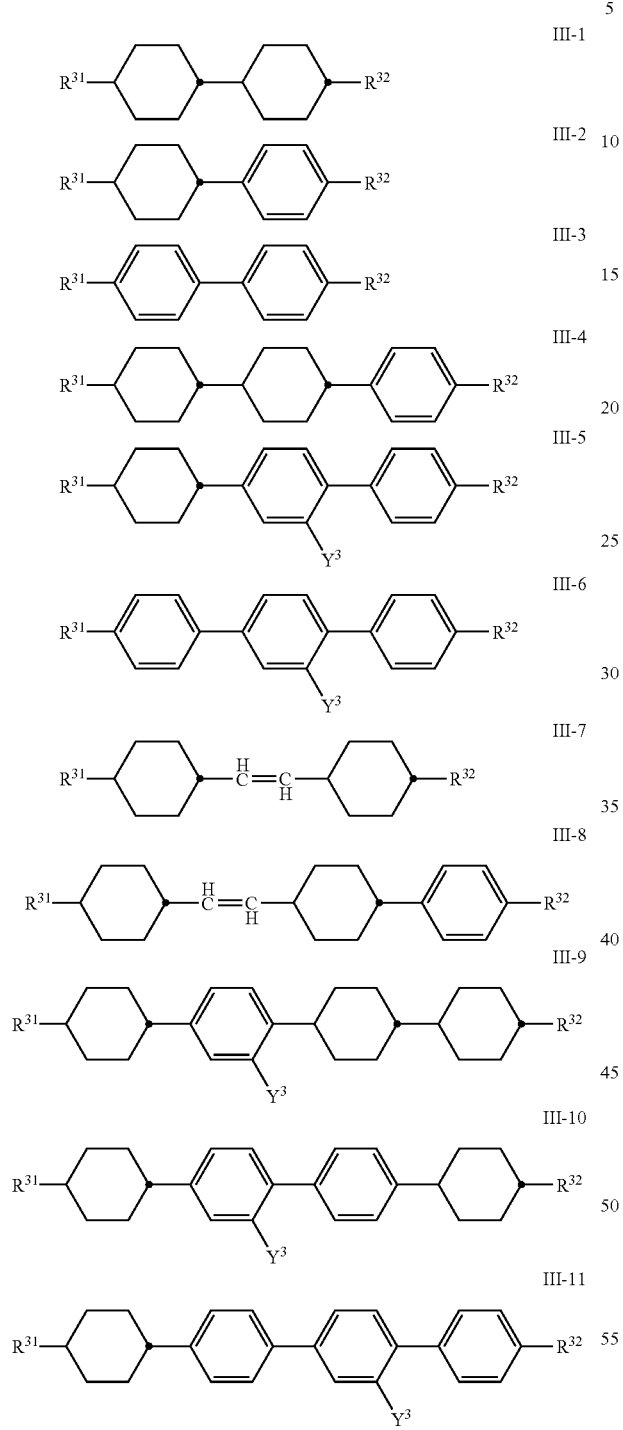

in which the parameters have the respective meaning indicated above for formula II, and $Y^3$ denotes H or F, and preferably $R^{31}$ denotes alkyl or alkenyl, and $R^{32}$ denotes alkyl, alkenyl or alkoxy, preferably alkyl or alkenyl, particularly preferably alkenyl.

The medium particularly preferably comprises one or more compound(s) of the formula III-1, selected from the group
of the formula III-1c, particularly preferably
of the formula III-1 in which $R^{31}$ denotes vinyl or 1-propenyl and $R^{32}$ denotes alkyl, preferably n-alkyl, particularly preferably $R^{31}$ denotes vinyl and $R^{32}$ denotes propyl, and
of the formula II-11d, particularly preferably
of the formula III-1 in which $R^{31}$ and $R^{32}$, independently of one another, denote vinyl or 1-propenyl, preferably $R^{31}$ denotes vinyl and particularly preferably $R^{31}$ and $R^{32}$ denote vinyl.

In a further preferred embodiment, the medium comprises one or more compounds of the formula III-1, selected from the group of the compounds of the formulae III-1a to III-1e, preferably of the formula III-1a and/or formulae III-1c and/or III-1d, particularly preferably of the formulae III-1c and/or III-1d and very particularly preferably of the formula III-1c and of the formula III-1d,

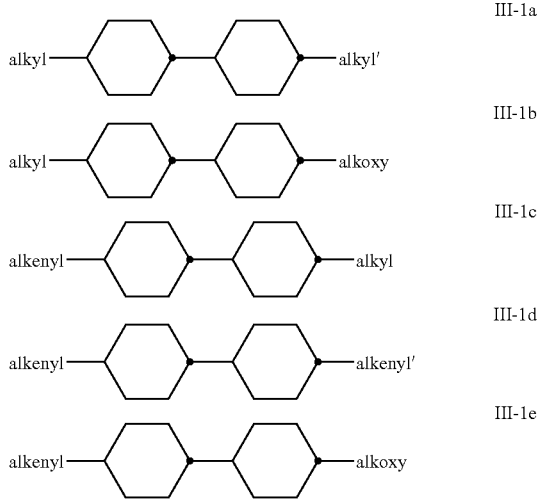

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl and alkenyl', independently of one another, denote alkenyl having 2 to 7 C atoms, preferably having 2 to 5 C atoms.

The medium according to the invention particularly preferably comprises compounds of the formula III-1 in amounts of 20% by weight or more, in particular of 25% by weight or more, very particularly preferably of 30% by weight or more, in particular compounds of the formula III-1a'

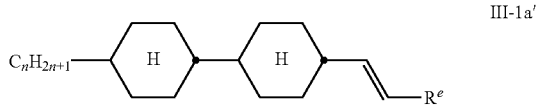

in which
n=3, 4, 5, and $R^e$ denotes H or $CH_3$.

In a further preferred embodiment, the medium comprises one or more compounds of the formula III-2, selected from the group of the compounds of the formulae III-2a to III-2d, preferably of the formulae III-2a and/or III-2b, particularly preferably of the formula III-2b,

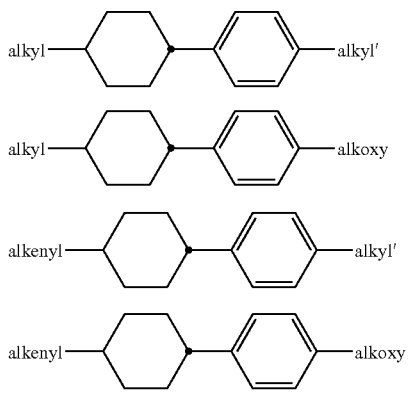

III-2a
III-2b
III-2c
III-2d in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl denotes alkenyl having 2 to 7 C atoms, preferably having 2 to 5 C atoms.

In a further preferred embodiment, the medium comprises one or more compounds of the formula III-3, selected from the group of the compounds of the formulae III-3a to III-3c

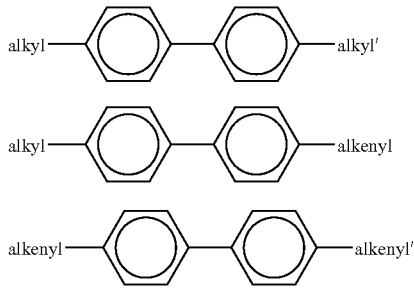

III-3a
III-3b
III-3c in which alkyl and alkyl', independently of one another, denote alkyl having 1 to 7 C atoms, preferably having 2 to 5 C atoms, alkenyl denotes alkenyl having 2 to 7 C atoms, preferably having 2 to 5 C atoms.

The proportion of these biphenyls in the mixture as a whole is preferably 3% by weight or more, in particular 5% by weight or more.

Preferred compounds of the formulae III-3a and III-3b are the compounds of the following formulae:

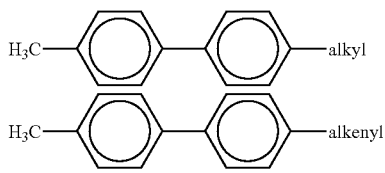

in which the parameters have the meaning indicated above.

Particularly preferred compounds of the formula III-3b are the compounds of the following formulae:

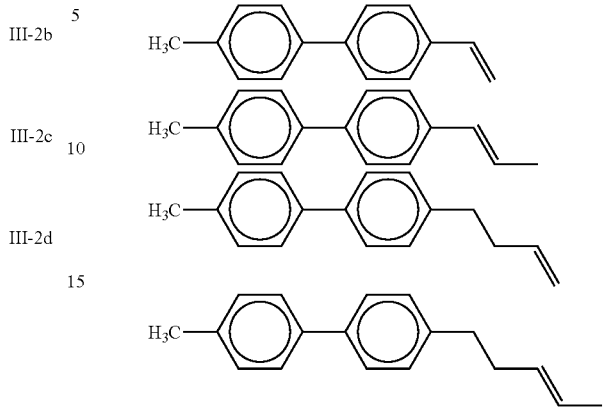

and of these in particular those of the last formula.

In a preferred embodiment, the medium comprises one or more compounds of the formula III-4, particularly preferably one or more compound(s) in which $R^{31}$ denotes vinyl or 1-propenyl and $R^{32}$ denotes alkyl, preferably n-alkyl, particularly preferably $R^{31}$ denotes vinyl and $R^{32}$ denotes methyl.

In a further preferred embodiment, the medium comprises one or more compounds of the formula III-4, selected from the group of the compounds of the formulae III-4-a to III-4-d, preferably of the formulae III-4-a and/or III-4-b, particularly preferably of the formula III-4-b,

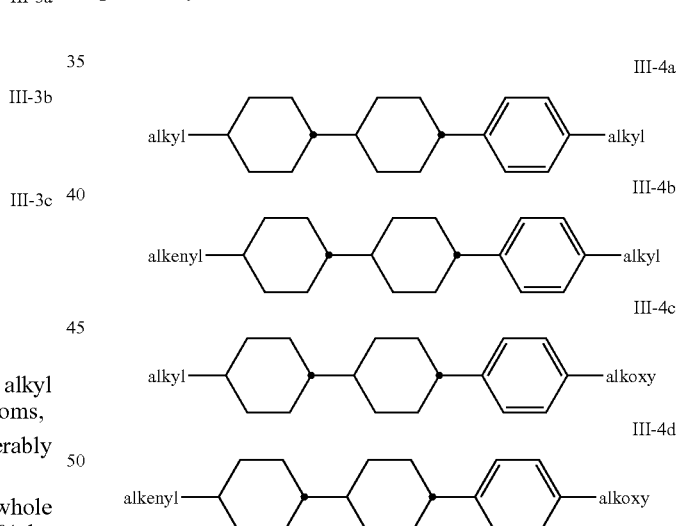

III-4a
III-4b
III-4c
III-4d in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl denotes alkenyl having 2 to 7 C atoms, preferably having 2 to 5 C atoms.

In a preferred embodiment, the medium comprises one or more compounds of the formula III-5, particularly preferably one or more compound(s) in which $R^{31}$ denotes alkyl, vinyl or 1-propenyl and $R^{32}$ denotes alkyl, preferably n-alkyl.

In a further preferred embodiment, the medium comprises one or more compounds of the formula III-5 selected from the group of the compounds of the formulae III-5a to III-5d, preferably of the formulae III-5a and/or III-5b, particularly preferably of the formula III-5a III-5a

III-5b
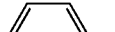

III-5c
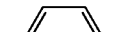

III-5d
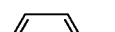

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl denotes alkenyl having 2 to 7 C atoms, preferably having 2 to 5 C atoms, and/or of the formulae III-5e to III-5h, preferably of the formulae III-5e and/or III-5f, particularly preferably of the formula III-5e, III-5e

III-5f

III-5g

III-5h

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl denotes alkenyl having 2 to 7 C atoms, preferably having 2 to 5 C atoms.

In a further preferred embodiment, the medium comprises one or more compounds of the formula III-6 selected from the group of the compounds of the formulae III-6a to III-6c, preferably of the formulae III-6a and/or III-6b, particularly preferably of the formula III-6a, III-6a
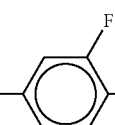

III-6b
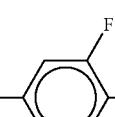

III-6c
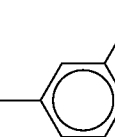

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl denotes alkenyl having 2 to 7 C atoms, preferably having 2 to 5 C atoms.

In a further preferred embodiment, the medium comprises one or more compounds of the formula III-6 selected from the group of the compounds of the formulae III-10a and III-10b III-10a
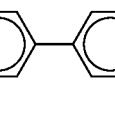

III-10b
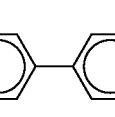

in which alkyl and alkyl', independently of one another, denote alkyl having 1 to 7 C atoms, preferably having 2 to 5 C atoms.

In a further preferred embodiment, the medium comprises one or more compounds of the formula III-11 selected from the compounds of the formula III-11a III-11a

in which alkyl and alkyl', independently of one another, denote alkyl having 1 to 7 C atoms, preferably having 2 to 5 C atoms.

In a further preferred embodiment, the medium (additionally) comprises one or more compounds which contain an indane unit, preferably compounds of the formula IV, preferably selected from the group of the compounds of the formulae IV-1 to IV-2,

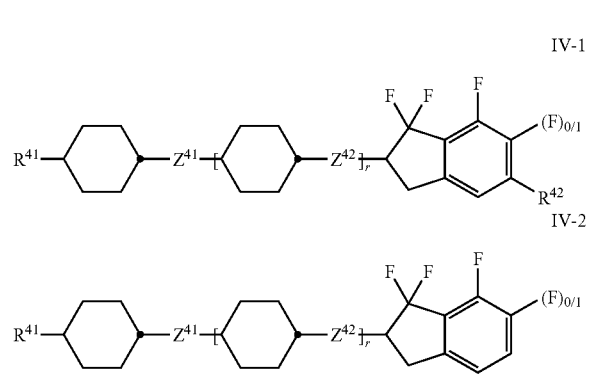

in which the parameters have the respective meaning indicated above for formula V, and preferably
$R^{41}$ denotes alkyl or alkenyl, and
$R^{42}$ denotes alkyl, alkenyl, alkoxy or alkenyloxy,
$Z^{41}$ denotes a single bond, and
r denotes 0.

In a further preferred embodiment, the medium (additionally) comprises one or more compounds which contain a tetrahydronaphthyl or naphthyl unit, preferably compounds of the formula V, preferably selected from the group of the compounds of the formulae V-1 to V-8,

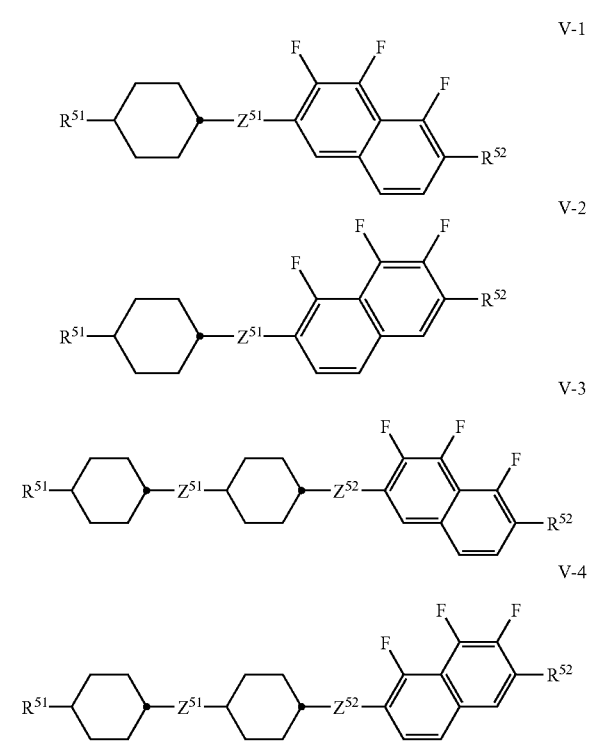

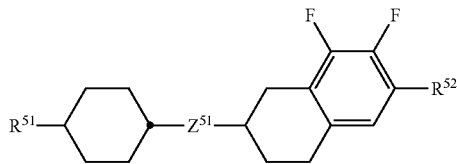

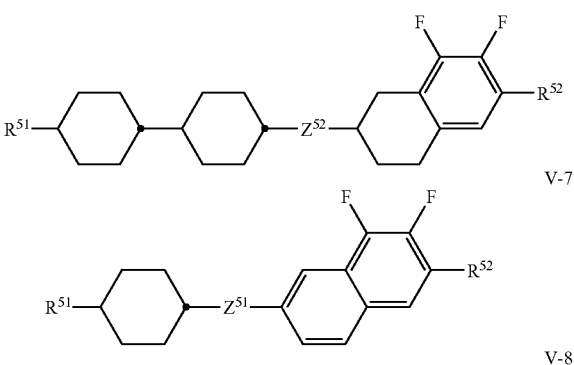

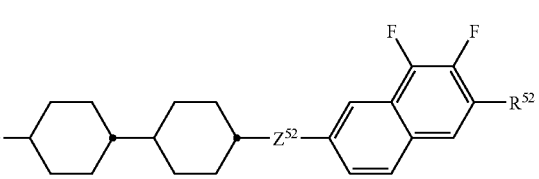

in which the parameters have the respective meaning indicated above for formula V, and preferably
$R^{51}$ denotes alkyl or alkenyl, and
$R^{52}$ denotes alkyl, alkenyl, alkoxy or alkenyloxy,
and
in formulae V-1 and V-2,
$Z^{51}$ denotes —CH$_2$—CH$_2$— or a single bond,
in formulae V-3 and V-4,
$Z^{51}$ denotes a single bond, and
$Z^{52}$ denotes —CH$_2$—CH$_2$— or a single bond.

In a further preferred embodiment, the medium (additionally) comprises one or more compounds which contain a fluorinated phenanthrene unit, preferably compounds of the formula V, preferably selected from the group of the compounds of the formulae V-9 and V-10,

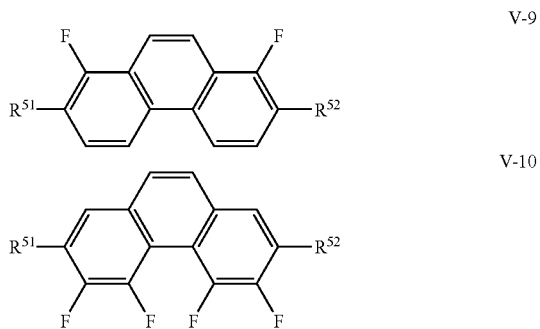

in which the parameters have the respective meaning indicated above for formula V, and preferably
$R^{51}$ denotes alkyl or alkenyl, and
$R^{52}$ denotes alkyl, alkenyl, alkoxy or alkenyloxy.

In a further preferred embodiment, the medium (additionally) comprises one or more compounds which contain a fluorinated dibenzofuran unit, preferably compounds of the formula V, preferably of the formula V-11,

in which the parameters have the respective meaning indicated above for formula V, and preferably
R$^{51}$ denotes alkyl or alkenyl, and
R$^{52}$ denotes alkyl, alkenyl, alkoxy or alkenyloxy.

The chiral compound or the chiral compounds which can be used in component E of the liquid-crystal media in accordance with the present invention are selected from the known chiral dopants. Component E preferably consists predominantly, particularly preferably essentially and very particularly preferably virtually completely of one or more compounds selected from the group of the compounds of the following formulae VI to VIII

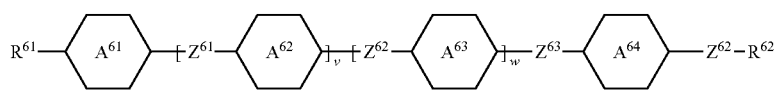

VI

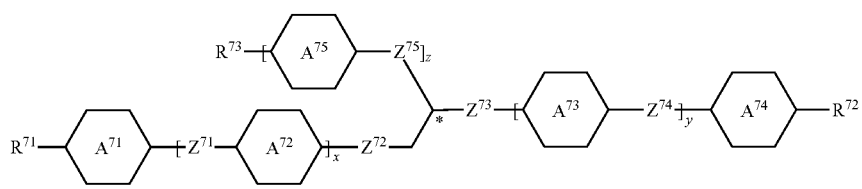

VII

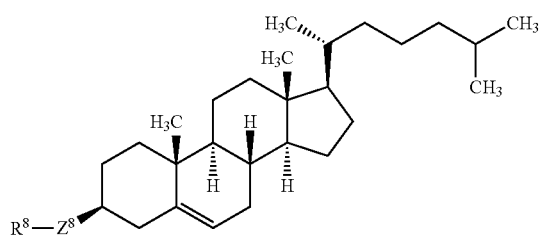

VIII

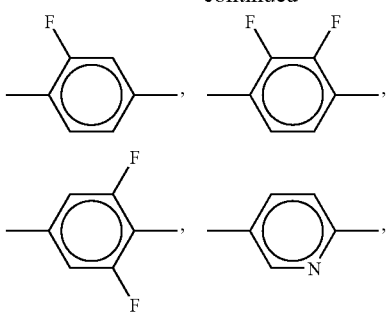

in which
R$^{61}$ and R$^{62}$, R$^{71}$ to R$^{73}$ and R$^8$ each, independently of one another, have the meaning given above for R$^{21}$ for formula II and alternatively denote H, CN, F, Cl, CF$_3$, OCF$_3$, CF$_2$H or OCF$_2$H, and at least one of R$^{61}$ and R$^{62}$ denotes a chiral group,
Z$^{61}$ and Z$^{62}$, Z$^{71}$ to Z$^{73}$ and Z$^8$ each, independently of one another, denote —CH$_2$CH$_2$—, —CH=CH—, —COO—, —O—CO— or a single bond, preferably Z$^{61}$, Z$^{62}$, Z$^{71}$, Z$^{74}$ and Z$^{75}$ denote a single bond, Z$^{63}$, Z$^{72}$ and Z$^{73}$ denote —COO— or a single bond, Z$^{72}$ preferably denotes —COO— and Z$^{73}$ and Z$^8$ denote —O—CO—,

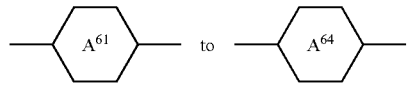

and

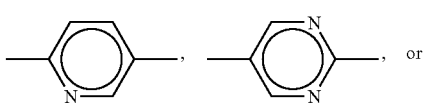

each, independently of one another, denote

-continued

-continued

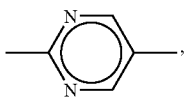

u and v, and
x, y and z each, independently of one another, denote 0 or 1, preferably
u and v both denote 0, and
x and v both denote 1.

The compounds of the formulae VI to VIII are preferably selected from the group of the compounds of the formulae VI-1 to VI-3, VII-1 and VII-2, and VIII-1 and VIII-2 in which the parameters each have the meaning given above for the formulae VI to VIII, and preferably
$R^{61}$ and $R^{62}$, $R^{71}$ to $R^{73}$ and
$R^8$ denote alkyl, alkenyl or alkoxy, H, CN, F, Cl, $CF_3$, $OCF_3$, $CF_2H$ or $OCF_2H$ and at least one of $R^{31}$ and
$R^{32}$ denotes a chiral group, preferably isooctyloxy,
$Z^{61}$ denotes a single bond,
$Z^{63}$ in formula V-2 denotes a single bond and in formula V-3 denotes —COO—,
$Z^{72}$ denotes —COO—,
$Z^{73}$ denotes —O—CO—,
m denotes an integer from 1 to 8, preferably 6, and
l denotes an integer from 0 to 8 which is different from m, preferably 1.

The compounds are particularly preferably selected from the group of the compounds of the following formulae VI-1a, VI-1b, VI-2a to VI-2c and VI-3a, VII-1a and VII-2a and VIII-1a and VIII-2a VI-1
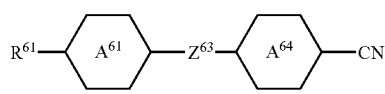

VI-2
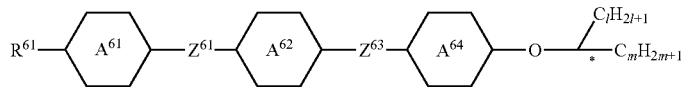

VI-3
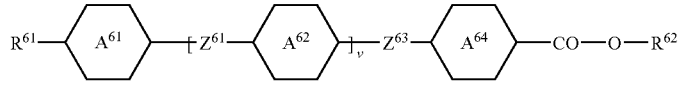

VII-1
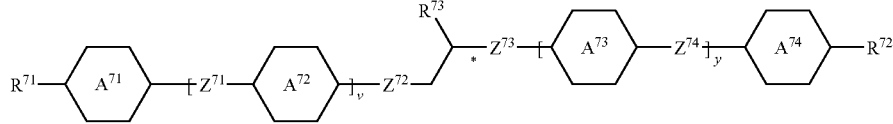

VII-2
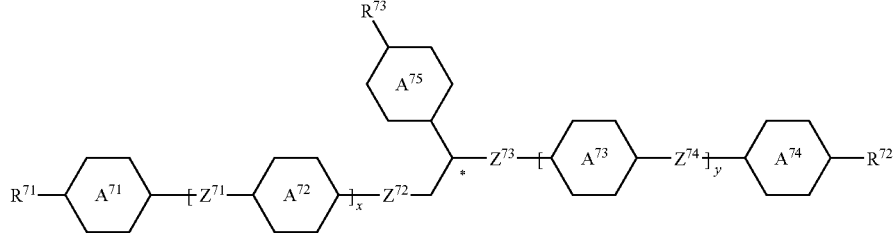

VIII-1
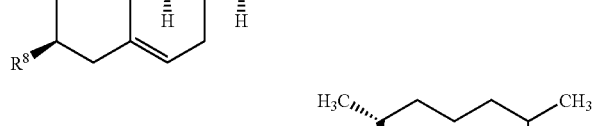

VIII-2
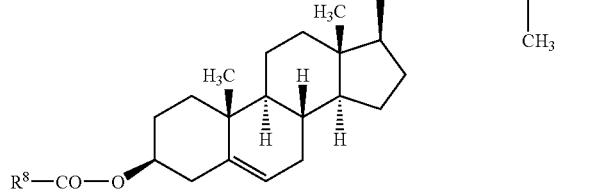

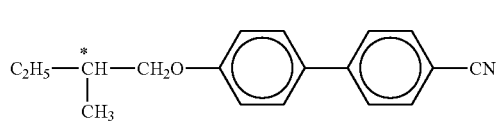 VI-1a

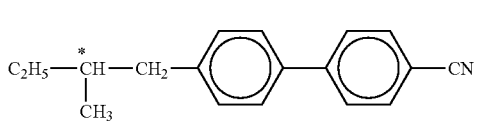 VI-1b

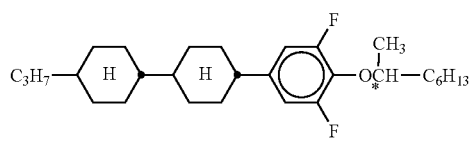 VI-2a

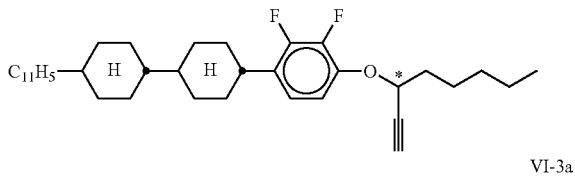 VI-2b

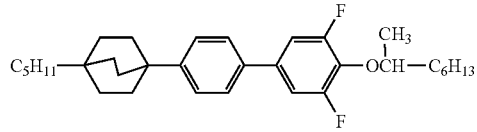 VI-2c

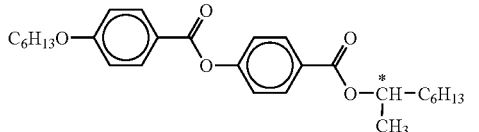 VI-3a

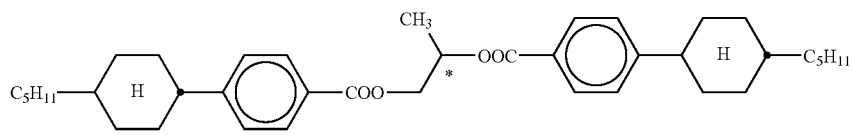 VII-1a

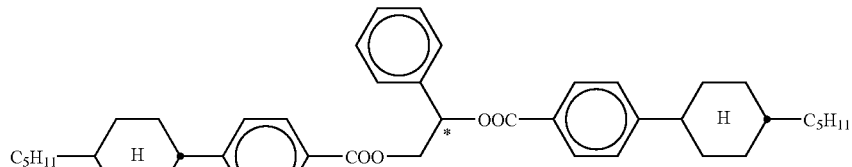 VII-1b

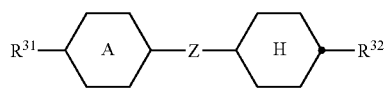 VIII-1a

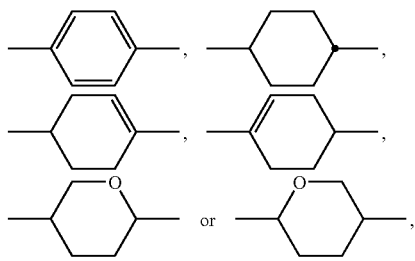 VIII-2a

Particularly preferred embodiments of the present invention satisfy one or more of the following conditions.

i. The liquid-crystalline medium comprises one or more compounds selected from the sub-formulae IA-1 and IB-1 to IB-5, preferably from the sub-formulae IA'-1 and IB'-1 to IB'-5, particularly preferably from the sub-formulae IA-1 and/or IB-1, preferably from the sub-formulae IA'-1 and/or IB'-1.

ii. The proportion of compounds of the formula II in the mixture as a whole is 20% by weight or more.

iii. The proportion of compounds of the formula III in the mixture as a whole is 5% by weight or more.

iv. The liquid-crystalline medium comprises one or more compounds of the formula III of the following sub-formula:

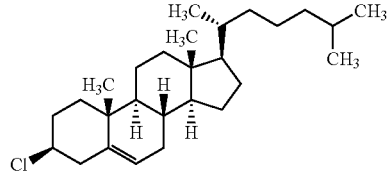

in which

R$^{31}$ and R$^{32}$ each, independently of one another, denote a straight-chain alkyl, alkenyl, alkylalkoxy or alkoxy radical having up to 12 C atoms, and

denotes

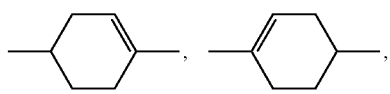

preferably

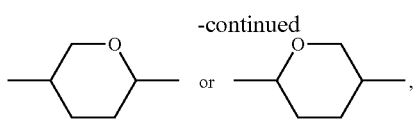

Z denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$— or —CF=CF—, where the compounds of the formulae III-1 and III-2 are excluded.

v. The liquid-crystalline medium comprises one or more compounds of the formula II of the following sub-formula II-6

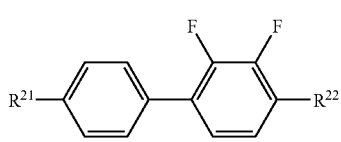

II-6 in which R$^{21}$ and R$^{22}$ have the meaning indicated above.

vi. The medium according to the invention preferably comprises one or more compounds selected from the group of the formulae II-1a, III-1b, III-11c and III-1d, preferably of the formulae III-1a, III-1b and III-1c, particularly preferably of the formula II-1c.

vii. The liquid-crystalline medium comprises one or more particularly preferred compounds of the formulae III-1c and III-1d selected from the sub-formulae mentioned below:

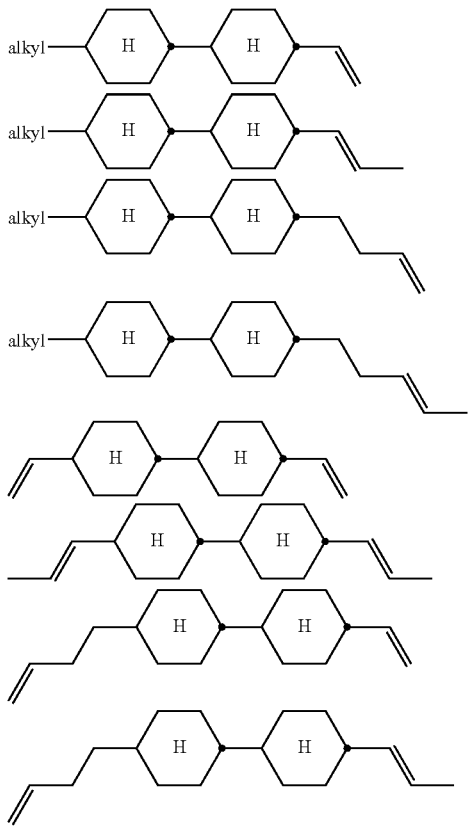

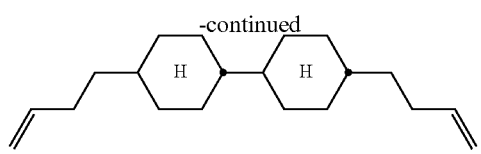

in which alkyl has the meaning given above and preferably in each case, independently of one another, denotes alkyl having 1 to 6, preferably having 2 to 5, C atoms, and in the case where n denotes 3 or more, preferably n-alkyl.

viii. The liquid-crystalline medium essentially consists of
2 to 80% by weight of one or more compounds of the formula I,
2 to 80% by weight of one or more compounds of the formula II,
2 to 80% by weight of one or more compounds of the formula III, and/or
2 to 80% by weight of one or more compounds selected from the group of the compounds of the formulae IV and/or V.

ix. The liquid-crystalline medium comprises one or more fluorinated terphenyls of the formula selected from the group of the compounds of the formulae II-6 and/or III-6, particularly preferably selected from the respective preferred sub-formulae thereof, and/or of the formulae II'''-2, II'''-3, II$^{(IV)}$-2, II$^{(IV)}$-3, II$^{(V)}$-1 and/or of the formulae T-1 to T-4, preferably T-1 and/or T-4,

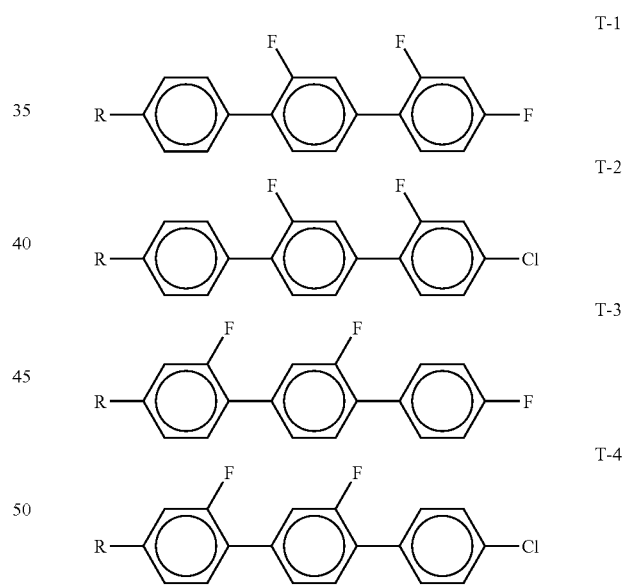

in which
R has the meanings indicated for R$^{31}$ and preferably denotes alkyl, alkenyl, alkoxy, alkylalkoxy or alkenyloxy having 1 or 2 to 6 C atoms respectively, particularly preferably (O)C$_m$H$_{2m+1}$, very particularly preferably C$_m$H$_{2m+1}$, and m denotes an integer from 1 to 6.

R is preferably straight-chain alkyl, alkoxy or alkylalkoxy, each having 1-6 C atoms, alkenyl or alkenyloxy having 2-6 C atoms, preferably alkyl, furthermore alkoxy, each having 1-5 C atoms, preferably methyl, ethyl, propyl, butyl, pentyl, hexyl, methoxy, ethoxy, propoxy, butoxy, pentoxy.

The terphenyls are preferably employed in the mixtures according to the invention if it is intended that the Δn value of the mixture is 0.09 or more. Preferred mixtures comprise 2 to 20% by weight of one or more terphenyl compounds, preferably selected from the group of the terphenyls indicated above.

x. The liquid-crystalline medium preferably comprises the above-mentioned terphenyls in amounts of 2 to 30% by weight, in particular of 5 to 20% by weight.
The terphenyls are preferably employed in mixtures having a Δn of 0.10 or more in combination with the compounds of the formulae I, II and III. Preferred mixtures comprise 2 to 20% by weight of terphenyls and 5 to 60% by weight of further compounds of the formula III.

xi. The liquid-crystalline medium comprises one or more compounds of the formula I in amounts of 2 to 90% by weight, in particular of 5 to 80% by weight, particularly preferably of 10 to 70% by weight and very particularly preferably of 15 to 45% by weight.

xii. The liquid-crystalline medium comprises one or more compounds of the formula IA in amounts of 2 to 25% by weight, in particular of 3 to 20% by weight, and very particularly preferably of 4 to 17% by weight per individual compound.

xiii. The liquid-crystalline medium comprises one or more compounds of the formula I containing three six-membered rings in amounts of 2 to 20% by weight, in particular of 2 to 15% by weight, and very particularly preferably of 3 to 10% by weight per individual compound.

xiv. The liquid-crystalline medium comprises one or more compounds of the formula I containing four six-membered rings in amounts of 1 to 15% by weight, in particular of 2 to 12% by weight, and very particularly preferably of 3 to 8% by weight per individual compound.

xv. The liquid-crystalline medium comprises one or more compounds of the formula II containing two six-membered rings, preferably of the sub-formulae II-1 and/or II-6, preferably in amounts of 1 to 60% by weight, in particular 5% by weight or more, and very particularly preferably of 5 to 45% by weight, in particular in the range from 2 to 20% by weight per individual compound.

xvi. The liquid-crystalline medium comprises one or more compounds of the formula II containing three six-membered rings, preferably of the sub-formulae II-3 and/or II-4, particularly preferably of the formulae II-3b and/or II-3d and/or II-4-b and/or II-4-d, preferably in amounts of 1 to 60% by weight, in particular 10% by weight or more, and very particularly preferably of 5 to 45% by weight, in particular in the range from 2 to 20% per individual compound.

xvii. The liquid-crystalline medium comprises one or more compounds of the formula II containing three six-membered rings, preferably of the sub-formulae II-4 and/or II-6 and/or II-7, particularly preferably of the formulae II-4-a and/or II-4-c and/or II-5a and/or II-5b and/or II-6a and/or II-6c and/or II-7a and/or II-7c, preferably in amounts of 1 to 50% by weight, in particular of 10% by weight or more, and very particularly preferably of 5 to 45% by weight, in particular in the range from 2 to 15% by weight per individual compound of the compounds of the formulae II-4-a and/or II-4-c, from 2 to 10% by weight per individual compound of the compounds of the formulae II-5a and II-5c and/or from 2 to 20% per individual compound of the compounds of the formulae II-6a and II-6c.

xviii. The liquid-crystalline medium comprises one or more compounds of the formula IV, preferably in amounts of 2% by weight or more, in particular of 5% by weight or more, and very particularly preferably of 5 to 25% by weight, in particular in the range from 2 to 12% by weight per individual compound.

xix. The liquid-crystalline medium comprises one or more compounds of the formula V, preferably in amounts of 3% by weight or more, in particular of 5% by weight or more, and very particularly preferably of 5 to 25% by weight, in particular in the range from 2 to 20% by weight per individual compound.

xx. The liquid-crystalline medium comprises one or more compounds of the formula III selected from the group of the following formulae:

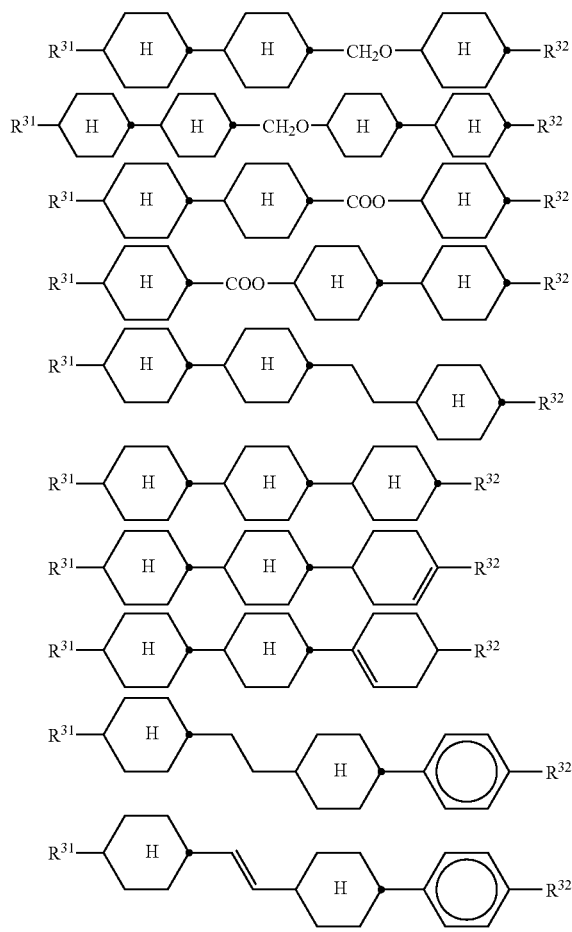

in which $R^{31}$ and $R^{32}$ have the meaning indicated above and preferably each, independently of one another, denote a straight-chain alkyl, alkoxy or alkenyl radical having 1 or 2 to 7 C atoms respectively, particularly preferably straight-chain alkyl, furthermore alkenyl.

The proportion of these compounds in the mixture is preferably 5 to 40% by weight.

The invention furthermore relates to an electro-optical display with active-matrix addressing based on the ECB effect, characterised in that it contains, as dielectric, a liquid-crystalline medium according to the present invention.

The liquid-crystal mixture preferably has a nematic phase range of at least 60 degrees and a flow viscosity $v_{20}$ of at most 30 mm$^2 \cdot$s$^{-1}$ at 20° C.

The liquid-crystal mixture according to the invention has a Δ∈ of about −0.5 to −8.0, in particular of about −2.5 to −6.0, where Δ∈ denotes the dielectric anisotropy. The rotational viscosity γ₁ is preferably 200 mPa·s or less, in particular 170 mPa·s or less.

The birefringence Δn in the liquid-crystal mixture is generally between 0.06 and 0.16, preferably between 0.08 and 0.12.

The mixtures according to the invention are suitable for all VA-TFT applications, such as, for example, VAN, MVA, (S)-PVA and ASV. They are furthermore suitable for IPS (in-plane switching), FFS (fringe field switching) and PALC applications of negative Δ∈.

The nematic liquid-crystal mixtures in the displays according to the invention generally comprise two components A and B, which themselves consist of one or more individual compounds.

For component A, one (or more) individual compounds which has (have) a Δ∈ value of ≦−0.8 is (are) preferably selected. This value must be more negative, the smaller the proportion of A in the mixture as a whole.

For component B, one (or more) individual compounds which has (have) a Δ∈ value of ≦−0.8 is (are) preferably selected. This value must be more negative, the smaller the proportion of B in the mixture as a whole.

Component C has pronounced nematogeneity and a flow viscosity of not greater than 30 mm²·s⁻¹, preferably not greater than 25 mm²·s⁻¹, at 20° C.

Particularly preferred individual compounds in component C are extremely low-viscosity nematic liquid crystals having a flow viscosity of not greater than 18 mm²·s⁻¹, preferably not greater than 12 mm²·s⁻¹, at 20° C.

Component C is monotropically or enantiotropically nematic and is able to prevent the occurrence of smectic phases down to very low temperatures in liquid-crystal mixtures. For example, if various materials of high nematogeneity are in each case added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, and particularly preferably 10 or less, compounds of the formulae I and II and/or III and/or IV and/or V.

Besides compounds of the formulae I to V, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IX $$R^{91}\text{-L-G-E-}R^{92} \qquad \text{IX}$$

in which L and E each denote a carbo- or heterocyclic ring system from the group formed by 1,4-disubstituted benzene and cyclohexane rings, 4,4'-disubstituted biphenyl, phenyl-cyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH—CQ— | —CH=N(O)— |
| | —C≡C— | —CH₂—CH₂— |
| | —CO—O— | —CH₂—O— |
| | —CO—S— | —CH₂—S— |
| | —CH=N— | —COO-Phe-COO— |
| | —CF₂O— | —CF=CF— |
| | —OCF₂— | —OCH₂— |
| | —(CH₂)₄— | —(CH₂)₃O— | or a C—C single bond, Q denotes halogen, preferably chlorine, or —CN, and $R^{91}$ and $R^{92}$ each denote alkyl, alkenyl, alkoxy, alkanoyloxy or alkoxycarbonyloxy having up to 18, preferably up to 8, carbon atoms, or one of these radicals alternatively denotes CN, NC, NO₂, NCS, CF₃, OCF₃, F, Cl or Br.

In most of these compounds, $R^{91}$ and $R^{92}$ are different from one another, one of these radicals usually being an alkyl or alkoxy group. Other variants of the proposed substituents are also common. Many such substances or also mixtures thereof are commercially available. All these substances can be prepared by methods known from the literature.

The concentration of the compounds of the formula IX in the mixture as a whole is preferably 1% to 25%, particularly preferably 1% to 15% and very particularly preferably 2% to 9%.

The media according to the invention may optionally also comprise a dielectrically positive component, whose total concentration is preferably 10% by weight or less, based on the entire medium.

In a preferred embodiment, the liquid-crystal media according to the invention comprise in total, based on the mixture as a whole, 5% or more to 80% or less, preferably 10% or more to 70% or less, preferably 20% or more to 60% or less and particularly preferably 30% or more to 50% or less and very particularly preferably 35% or more to 40% or less of component A and 10% or more to 85% or less, preferably 20% or more to 80% or less, preferably 30% or more to 70% or less and particularly preferably 40% or more to 60% or less and very particularly preferably 45% or more to 50% or less of component B and 5% or more to 70% or less, preferably 10% or more to 55% or less, preferably 25% or more to 50% or less of component C.

In a preferred embodiment, the liquid-crystal media according to the invention comprise components A and C and preferably one or more components selected from the group of components B, D and E; they preferably consist predominantly, particularly preferably essentially and very particularly preferably virtually completely of the said components.

The liquid-crystal media according to the invention preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 90° C. or more.

The term "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low region. The birefringence values are preferably in the range from 0.065 or more to 0.130 or less, particularly preferably in the range from 0.080 or more to 0.120 or less and very particularly preferably in the range from 0.085 or more to 0.110 or less.

In this embodiment, the liquid-crystal media according to the invention have negative dielectric anisotropy and have relatively high absolute values of the dielectric anisotropy ($|\Delta\epsilon|$), which are preferably in the range from 2.7 or more to 5.3 or less, preferably up to 4.5 or less, preferably from 2.9 or more to 4.5 or less, particularly preferably from 3.0 or more to 4.0 or less and very particularly preferably from 3.5 or more to 3.9 or less.

The liquid-crystal media according to the invention have relatively low values for the threshold voltage ($V_0$) in the range from 1.7 V or more to 2.5 V or less, preferably from 1.8 V or more to 2.4 V or less, particularly preferably from 1.9 V or more to 2.3 V or less and very particularly preferably from 1.95 V or more to 2.1 V or less.

In a further preferred embodiment, the liquid-crystal media according to the invention preferably have relatively low values of the average dielectric anisotropy ($\epsilon_{av.} \equiv (\epsilon_\parallel + 2\epsilon_\perp)/3$) which are preferably in the range from 5.0 or more to 7.0 or less, preferably from 5.5 or more to 6.5 or less, still more preferably from 5.7 or more to 6.4 or less, particularly preferably from 5.8 or more to 6.2 or less and very particularly preferably from 5.9 or more to 6.1 or less.

In a preferred embodiment, which is particularly suitable for use in LCD TV displays, the liquid-crystal media according to the invention have absolute values of the dielectric anisotropy ($|\Delta\epsilon|$) which are preferably in the range from 1.7 or more to 4.9 or less, preferably up to 4.3 or less, preferably from 2.3 or more to 4.0 or less, particularly preferably from 2.8 or more to 3.8 or less.

In this embodiment, the liquid-crystal media according to the invention have values for the threshold voltage ($V_0$) in the range from 1.9 V or more to 2.5 V or less, preferably from 2.1 V or more to 2.3 V or less.

In addition, the liquid-crystal media according to the invention have high values for the voltage holding ratio in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

In general, liquid-crystal media having a low addressing voltage or threshold voltage here have a lower voltage holding ratio than those having a greater addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

Unless indicated otherwise, the individual compounds are generally employed in the mixtures in concentrations from in each case 1% or more to 30% or less, preferably from 2% or more to 30% or less and particularly preferably from 4% or more to 16% or less.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "consist virtually completely of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "$\leq$" means less than or equal to, preferably less than, and "$\geq$" means greater than or equal to, preferably greater than.

For the present invention,

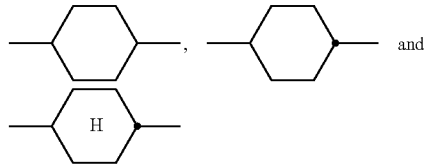

denote trans-1,4-cyclohexylene, and

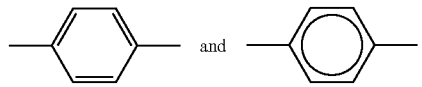

denote 1,4-phenylene.

For the present invention, the term "dielectrically positive compounds" means compounds having a $\Delta\epsilon > 1.5$, "dielectrically neutral compounds" means those having $-1.5 \leq \Delta\epsilon \leq 1.5$ and "dielectrically negative compounds" means those having $\Delta\epsilon < -1.5$. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to see. However, it is also possible to prepare the liquid-crystal mixtures in other conventional ways, for example using premixes or from a so-called "multibottle system".

The mixtures according to the invention exhibit very broad nematic phase ranges with clearing points of 65° C. or more, very favourable values for the capacitive threshold, relatively high values for the holding ratio and at the same time very good low-temperature stabilities at −30° C. and −40° C. Furthermore, the mixtures according to the invention are distinguished by low rotational viscosities $\gamma_1$.

Some further preferred embodiments of the mixtures according to the invention are mentioned below.

a) Liquid-crystalline medium which comprises one, two, three, four or more, preferably one, two or three, compounds of the formula I.

b) Liquid-crystalline medium where the proportion of compounds of the formula I in the mixture as a whole is 2% by weight or more, preferably 4% by weight or more, particularly preferably 2% by weight or more to 20% by weight or less.

c) Liquid-crystalline medium where the proportion of compounds of the formulae IIA and/or IIB in the mixture as a whole is at least 20% by weight.

d) Liquid-crystalline medium which comprises or essentially consists of 2 to 20% by weight of one or more compounds of the formula I and 20 to 80% by weight of one or more compounds of the formulae IIA and/or IIB.

e) Liquid-crystalline medium which additionally comprises one or more compounds of the formula II selected from one or more of the following formulae:

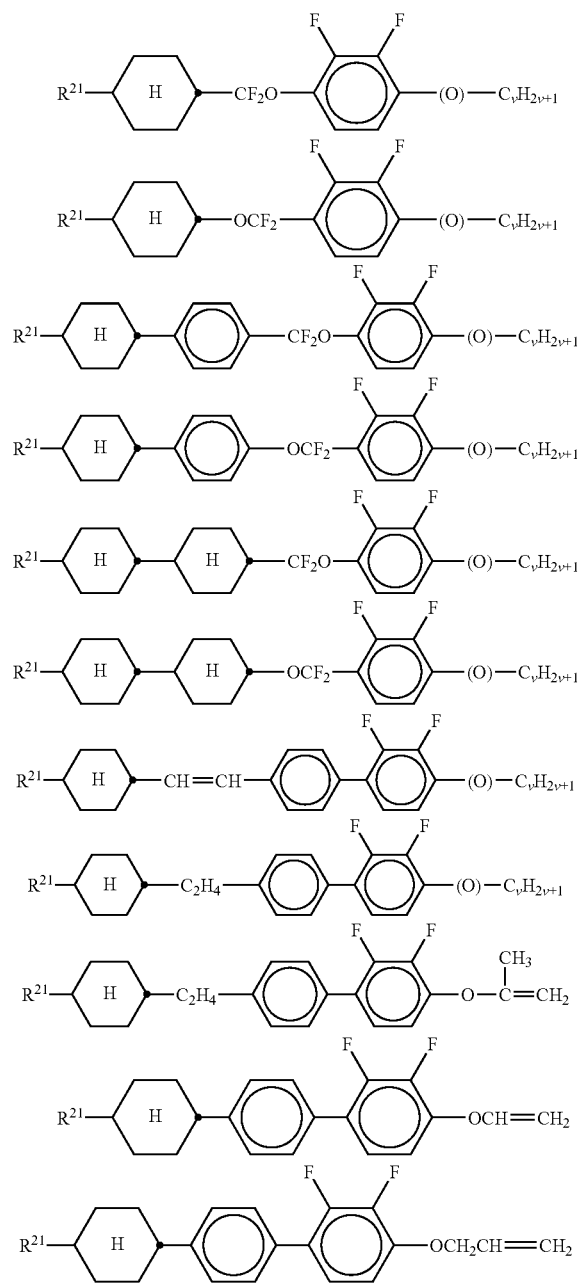

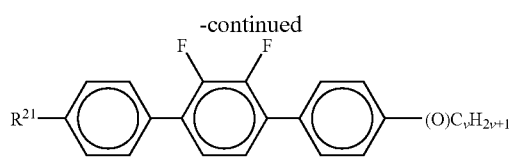

in which the parameters have the meaning indicated above, and preferably $R^{21}$ denotes alkyl and v denotes 1 to 6.

f) Liquid-crystalline medium which (additionally) comprises one or more compounds of the formula II selected from one or more of the following formulae:

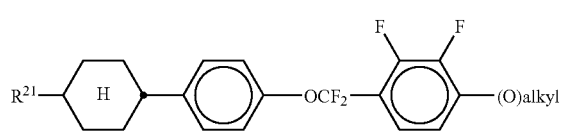

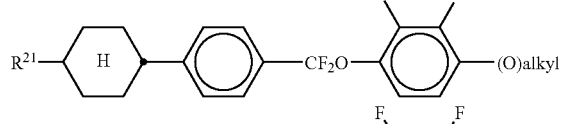

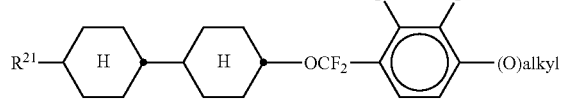

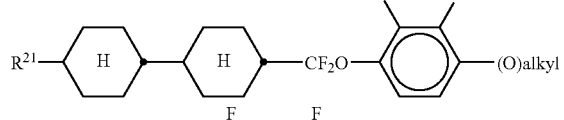

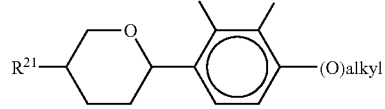

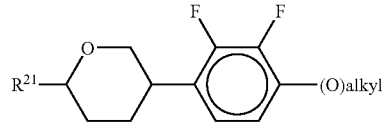

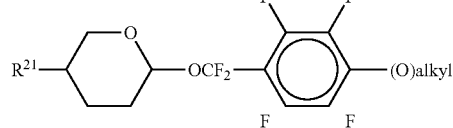

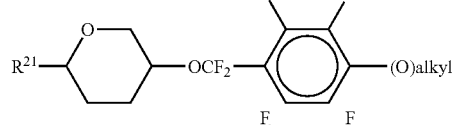

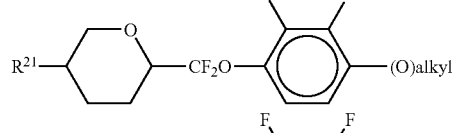

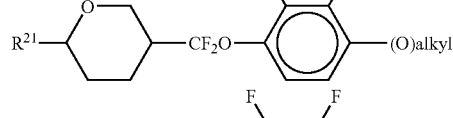

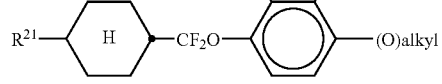

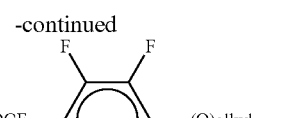

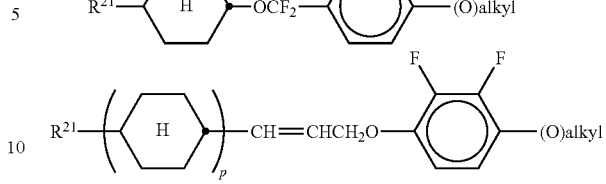

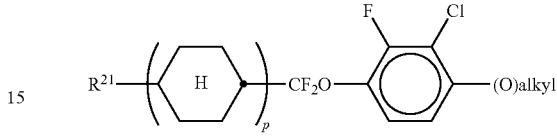

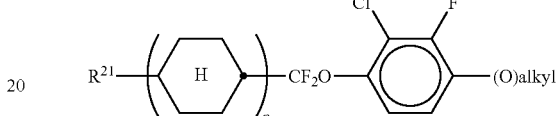

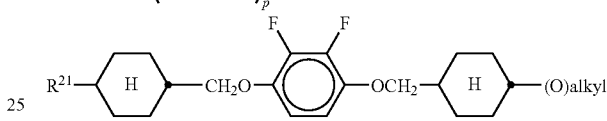

in which the parameter alkyl has the meaning indicated above, and preferably $R^{21}$ denotes a straight-chain alkyl, alkoxy or alkenyl radical having 1 or 2 to 7 C atoms respectively, and "alkyl" denotes a straight-chain alkyl radical having 1 to 6 C atoms.

g) Liquid-crystalline medium which comprises one, two, three, four or more compounds of the formula III in which $R^{31}$ and $R^{32}$ preferably each, independently of one another, denote straight-chain alkyl, alkoxy or alkenyl, each having up to 6 C atoms, and $Z^{31}$ and $Z^{32}$ preferably each, independently of one another, denote a single bond, furthermore —COO— or —CH$_2$O—, and the rings $A^{31}$, $A^{32}$ and $A^{33}$ preferably each, independently of one another, denote

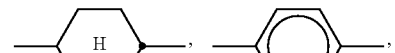

furthermore

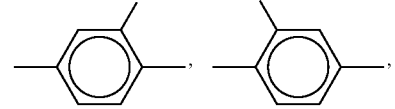

h) Liquid-crystalline medium where the proportion of the compounds of the formula III in the mixture as a whole is at least 5% by weight.

i) Preferred liquid-crystal media according to the invention (additionally) comprise one or more compounds of the formula IV selected from one or more formulae of the group of the formulae

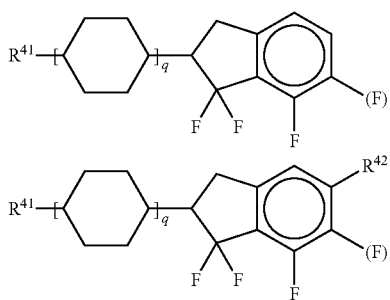

in which
R$^{41}$ and R$^{42}$ have the meanings indicated above, and q denotes 1 or 2, and R$^{42}$ preferably denotes CH$_3$, C$_2$H$_5$ or n-C$_3$H$_7$, preferably in amounts of 3% by weight or more, in particular 5% by weight or more and very particularly preferably in the range from 5 to 30% by weight.

j) Preferred liquid-crystalline media according to the invention (additionally) comprise one or more compounds of the formula V of the following formula:

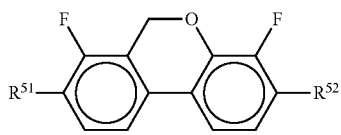

in which the parameters have the meanings indicated above, preferably in amounts of 3 to 20% by weight, in particular in amounts of 3 to 15% by weight.

These compounds are preferably selected from the group of the compounds of the following formulae:

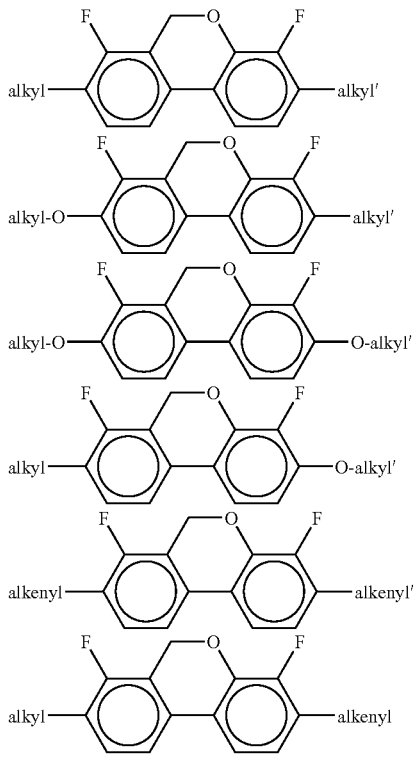

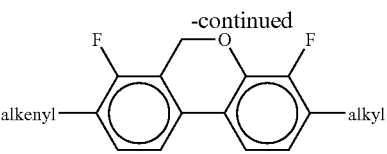

in which
alkyl and alkyl' each, independently of one another, denote a straight-chain alkyl radical having 1 to 6 C atoms, and alkenyl and alkenyl' each, independently of one another, denote a straight-chain alkenyl radical having 2 to 6 C atoms.

k) Preferred liquid-crystalline media according to the invention (additionally) comprise one or more compounds of the formula V of the following formula:

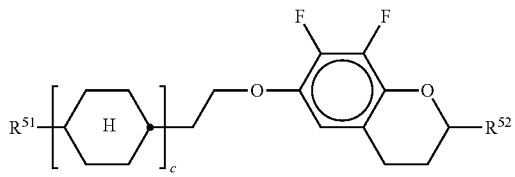

in which
R$^{51}$ and R$^{52}$ have the meanings indicated above, and c denotes 1 or 2,
preferably in amounts of 3 to 20% by weight, in particular in amounts of 3 to 15% by weight.

Particularly preferred compounds of this formula are the compounds of the following formulae:

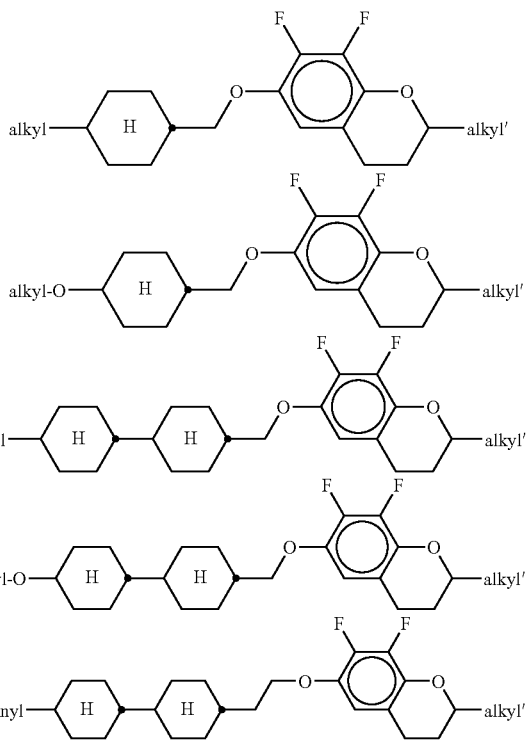

in which
alkyl and alkyl' each, independently of one another, denote a straight-chain alkyl radical having 1 to 6 C atoms, and alkenyl and alkenyl' each, independently of one another, denote a straight-chain alkenyl radical having 2 to 6 C atoms.

l) Liquid-crystalline medium which comprises one or more compounds of the formula V selected from the following formulae:

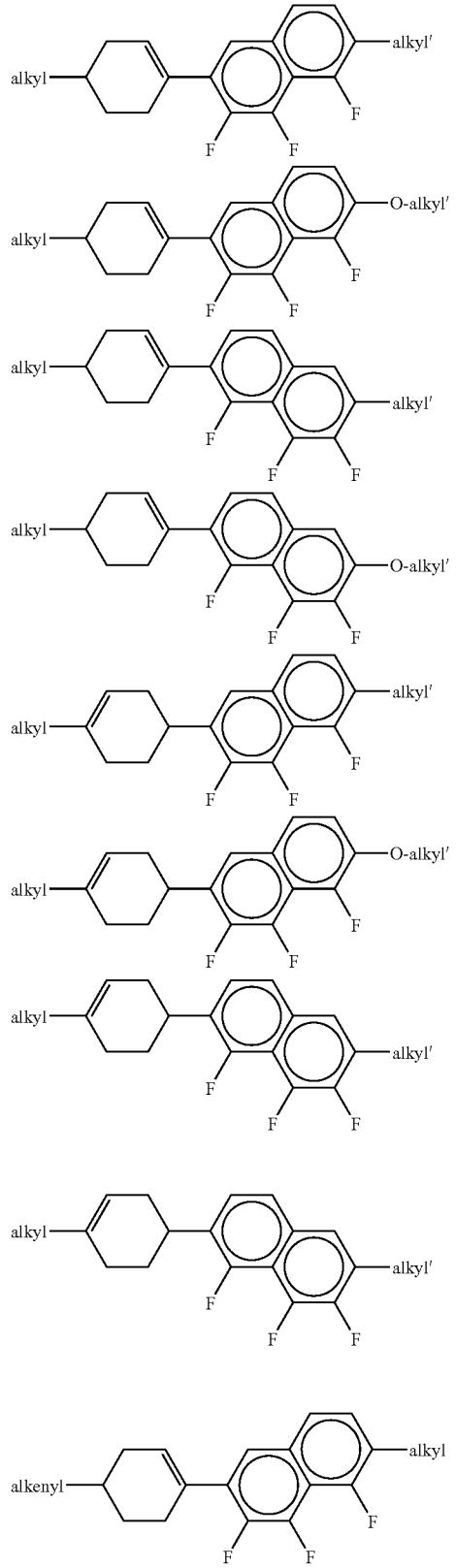

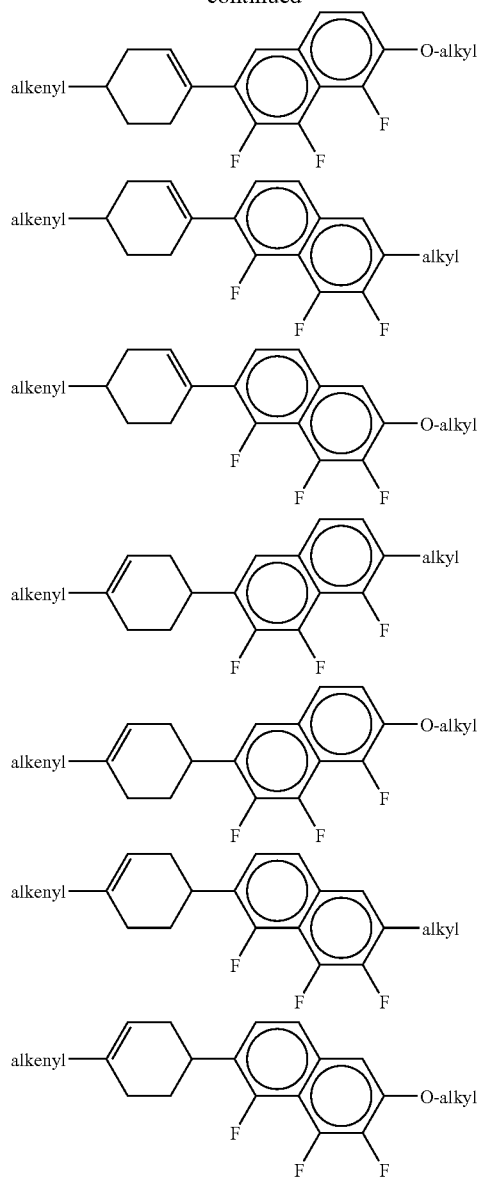

in which alkyl and alkyl' each, independently of one another, denote a straight-chain alkyl radical having 1 to 6 C atoms, alkenyl denotes a straight-chain alkenyl radical having 2 to 6 C atoms.

m) Preferred liquid-crystalline media according to the invention (additionally) comprise one or more compounds which contain a tetrahydronaphthyl or naphthyl unit, such as, for example, the compounds of the following formula:

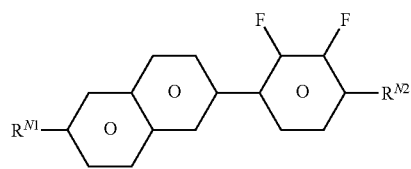

in which $R^{N1}$ and $R^{N2}$ each, independently of one another, have the meanings indicated for $R^{11}$, preferably denote straight-chain alkyl, straight-chain alkoxy or straight-chain alkenyl.

The invention furthermore relates to an electro-optical display with active-matrix addressing based on the ECB effect, characterised in that it contains, as dielectric, a liquid-crystalline medium according to the present application.

The liquid-crystal mixture according to the invention preferably has a nematic phase range of at least 60 degrees and a flow viscosity $v_{20}$ at 20° C. of 30 mm$^2$·s$^{-1}$ or less.

In a preferred embodiment, the liquid-crystal mixture according to the invention has a $\Delta\in$ of about −0.5 to −7.0, in particular of about −2.0 to −4.0, where $\Delta\in$ denotes the dielectric anisotropy. The rotational viscosity 71 is preferably 150 mPa·s or less, in particular 130 mPa·s or less.

The birefringence Δn in the liquid-crystal mixture is generally 0.13 or less, preferably between 0.06 and 0.12 and in particular between 0.07 and 0.11.

In a particularly preferred embodiment, the mixtures according to the invention comprise 1 to 35% of one or more compounds of the formula I, preferably of the formula IB'-1, particularly preferably of the formula IB'-1b and very particularly selected from the formula CLY-n-Om. The following individual compounds are preferably employed: CLY-2-O2, CLY-3-O2, CLY-3-O3 and/or CLY-2-O4. The concentrations of the individual compounds are preferably in the range from 1% or more to 15% or less.

The explanation of the constituents of these abbreviations is given in Tables A to C below, and the abbreviations used are summarised in Table D below.

These mixtures preferably comprise the following components:

optionally one or more compounds of the formula II-5, preferably in a total concentration of 10% or less, particularly preferably 5% or less, one or more compounds selected from the group of the compounds of the formula II-1, preferably II-1b, IA'-1, preferably IIA'-1b, AIY-n-Om and II-3, preferably II-3b, preferably in a total concentration of 60% or less, and the concentrations of the respective individual compounds are preferably in the range from 2 to 20%, one or more compounds of the formula II-4, preferably II-4-a and/or II-4-b, preferably in a total concentration of 60% or less, and the concentrations of the respective individual compounds are preferably in the range from 2 to 20%, one or more compounds selected from the group of the compounds of the formula II-6, preferably II-6a, and II-7, preferably II-7a, preferably in a total concentration of 50% or less, and the concentrations of the respective individual compounds are preferably in the range from 2 to 20%, optionally one or more compounds of the formula IV, preferably of the formula IV-2, particularly preferably where r=0 and/or $Z^{41}$=a single bond and/or (F)$_{0/1}$=F, very particularly preferably of the formula CK-n-F, preferably in a total concentration of 30% or less, and the concentrations of the respective individual compounds are preferably in the range from 2 to 15%, optionally one or more compounds selected from the group of the formulae III-1 and III-4, particularly preferably of the formulae III-1c and III-4b, very particularly preferably of the formulae CC-n-Vm, CCP-nVm, and CCP-Vn-m, and especially preferably the group of the formulae CC-3-V1, CC-4-V2 and CCP-nV-m, preferably in a total concentration of 15% or less, particularly preferably 5% or less, and the mixture very particularly preferably contains none of these compounds, optionally one or more compounds selected from the group of the formula III-2, preferably III-2a and/or III-2b, III-1a, III-b, III-3, preferably III-3c, III-4, preferably III-4-a, III-5, preferably III-a, III-6, preferably III-6a, III-11, CCZC-n-m, CCOC-n-m, CCZPC-n-m and PGIGI-n-F, preferably in a total concentration of 10% or more to 70% or less.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of −0.5 or less. It preferably comprises compounds of the formulae I, IIA and/or IIB.

The proportion of component A is preferably in the range from 45 to 100%, in particular from 60 to 100%.

For component A, one (or more) individual compounds which has (have) a $\Delta\in$ value of −0.8 or less is (are) preferably selected. This value must be more negative, the smaller the proportion of A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

Particularly preferred individual compounds in component B are extremely low-viscosity nematic liquid crystals having a flow viscosity of 18 mm$^2$·s$^{-1}$ or less, preferably 12 mm$^2$·s$^{-1}$ or less, at 20° C. Component B is monotropically or enantiotropically nematic, has no smectic phases and is able to prevent the occurrence of smectic phases down to very low temperatures in liquid-crystal mixtures. For example, if various materials of high nematogeneity are in each case added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

The phases preferably comprise 4 to 15, in particular 5 to 12, compounds of the formulae I, IIA and/or IIB and optionally III.

Besides compounds of the formulae I, IIA and/or IIB and III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl- or cyclohexylbenzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ether, tolans and substituted cinnamic acid esters.

The liquid-crystalline mixtures according to the invention are prepared by mixing one or more compounds of the formula I with one or more further mesogenic compounds.

It goes without saying per se to the person skilled in the art that the media according to the invention for use in VA, IPS, FFS or PALC displays may also comprise compounds in which, for example, H, N, O, Cl, F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.1 to 5% by weight, particularly preferably 0.2 to 2% by weight, based on the mixture. Mixtures of this type can be used for so-called polymer-stabilised VA modes, in which polymerisation of the reactive mesogens in the liquid-crystalline mixture is intended to occur. A prerequisite for this is that the liquid-crystal mixture does not itself comprise any polymerisable components, such as, for example, compounds containing alkenyl side chains.

The structure of the liquid-crystal displays according to the invention corresponds to the conventional geometry, as described, for example, in EP-A 0 240 379.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The liquid-crystal phases according to the invention can be modified by means of suitable additives in such a way that they can be employed in any type of, for example, ECB, VAN, IPS, GH or ASM-VA-LCD display that has been disclosed to date.

The dielectrics may advantageously also comprise one or more further additives known to the person skilled in the art and described in the literature, preferably selected from the group of the UV absorbers, antioxidants, nanoparticles and free-radical scavengers. For example, 0 to 15% of pleochroic dyes, stabilisers and/or chiral dopants may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity, or substances may be added in order to modify the dielectric anisotropy, the viscosity and/or the alignment of the nematic phases, as can nanoparticles. Substances of this type are described, for example, in DE-A 22 09 127, 22 40 864, 23 21 632, 23 38 281, 24 50 088, 26 37 430 and 28 53 728.

Table E below indicates possible dopants which can be added to the mixtures according to the invention. If the mixtures comprise one or more dopants, it is (they are) employed in amounts of 0.01 to 4% by weight, preferably 0.1 to 1.0% by weight.

Stabilisers which can be added, for example, to the mixtures according to the invention, preferably in amounts of 0.01 to 6% by weight, in particular 0.1 to 3% by weight, are mentioned below in Table F.

For the purposes of the present invention, all concentrations are, unless explicitly noted otherwise, indicated in percent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly differential degrees (° or degree), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status Nov. 1997, Merck KGaA, Germany, and apply to a temperature of 20° C., and $\Delta n$ is determined at 589 nm and $\Delta \in$ at 1 kHz, unless explicitly indicated otherwise in each case.

The electro-optical properties, for example the threshold voltage ($V_0$) (capacitive measurement), are, as is the switching behaviour, determined in test cells produced at Merck KGaA. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicular to one another and effect a homeotropic alignment of the liquid crystals. The surface area of the transparent, virtually square electrodes of ITO is 1 cm².

Unless indicated otherwise, a chiral dopant is not added to the liquid-crystal mixtures used, but the latter are also particularly suitable for applications in which doping of this type is necessary.

The voltage holding ratio is determined in test cells produced at Merck KGaA. The measurement cells have substrates made from soda-lime glass and are constructed with polyimide alignment layers (AL-3046 from Japan Synthetic Rubber, Japan) with a layer thickness of 50 nm, which have been rubbed perpendicular to one another. The layer thickness is uniformly 6.0 μm. The surface area of the transparent electrodes of ITO is 1 cm².

The voltage holding ratio is determined at 20° C. ($HR_{20}$) and after 5 minutes in the oven at 100° C. ($HR_{100}$). The voltage used has a frequency of 60 Hz.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm²·s⁻¹, 14 mm² s⁻¹ and 27 mm²·s⁻¹ respectively.

The following symbols are used:

$V_0$ threshold voltage, capacitive [V] at 20° C.,
$n_e$ extraordinary refractive index measured at 20° C. and 589 nm,
$n_o$ ordinary refractive index measured at 20° C. and 589 nm,
$\Delta n$ optical anisotropy measured at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
$\Delta \in$ dielectric anisotropy at 20° C. and 1 kHz, cl.p. or
T(N, I) clearing point [° C.],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN], and
LTS low temperature stability (phase), determined in test cells.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging members, and Table C lists the meanings of the symbols for the left- and right-hand end groups of the molecules. Table D lists illustrative molecular structures and the abbreviations thereof.

TABLE A

Ring elements

C, D, DI, A, AI, P, G, GI, U, UI, Y, Np, N3f, N3fI

TABLE A-continued

Ring elements tH, tHI, tH2f, tH2fI, dH, K, KI, L, LI, F, FI

TABLE B

| | Bridging members | | |
|---|---|---|---|
| E | —CH₂—CH₂— | | |
| V | —CH=CH— | | |
| T | —C≡C— | | |
| W | —CF₂—CF₂— | | |
| B | —CF=CF— | | |
| Z | —CO—O— | ZI | —O—CO— |
| X | —CF=CH— | XI | —CH=CF— |
| O | —CH₂—O— | OI | —O—CH₂— |
| Q | —CF₂—O— | QI | —O—CF₂— |

TABLE C

End groups

| On the left individually or in combination | | On the right individually or in combination | |
|---|---|---|---|
| -n- | $C_nH_{2n+1}$— | -n | —$C_nH_{2n+1}$ |
| -nO— | $C_nH_{2n+1}$—O— | -nO | —O—$C_nH_{2n+1}$ |
| —V— | $CH_2$=CH— | —V | —CH=$CH_2$ |
| -nV— | $C_nH_{2n+1}$—CH=CH— | -nV | —$C_nH_{2n}$—CH=$CH_2$ |
| —Vn- | $CH_2$=CH—$C_nH_{2n}$— | —Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL- | Cl— | —CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO— | $CFH_2O$— | —OM | —$OCFH_2$ |
| -DO— | $CF_2HO$— | —OD | —$OCF_2H$ |
| -TO— | $CF_3O$— | —OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| —NA- | N≡C—C≡C— | -AN | —C≡C—C≡N |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are place markers for other abbreviations from this table.

Besides the compounds of the formula I, the mixtures according to the invention preferably comprise one or more compounds of the compounds mentioned below.

The following abbreviations are used:
(m, m=1-6; z=1-6)

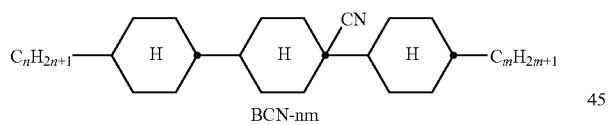

BCN-nm

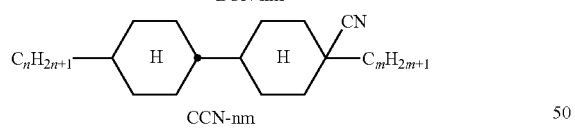

CCN-nm

TABLE D

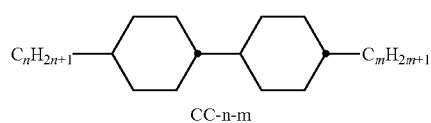

CC-n-m

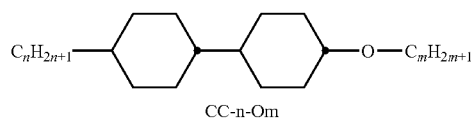

CC-n-Om

TABLE D-continued
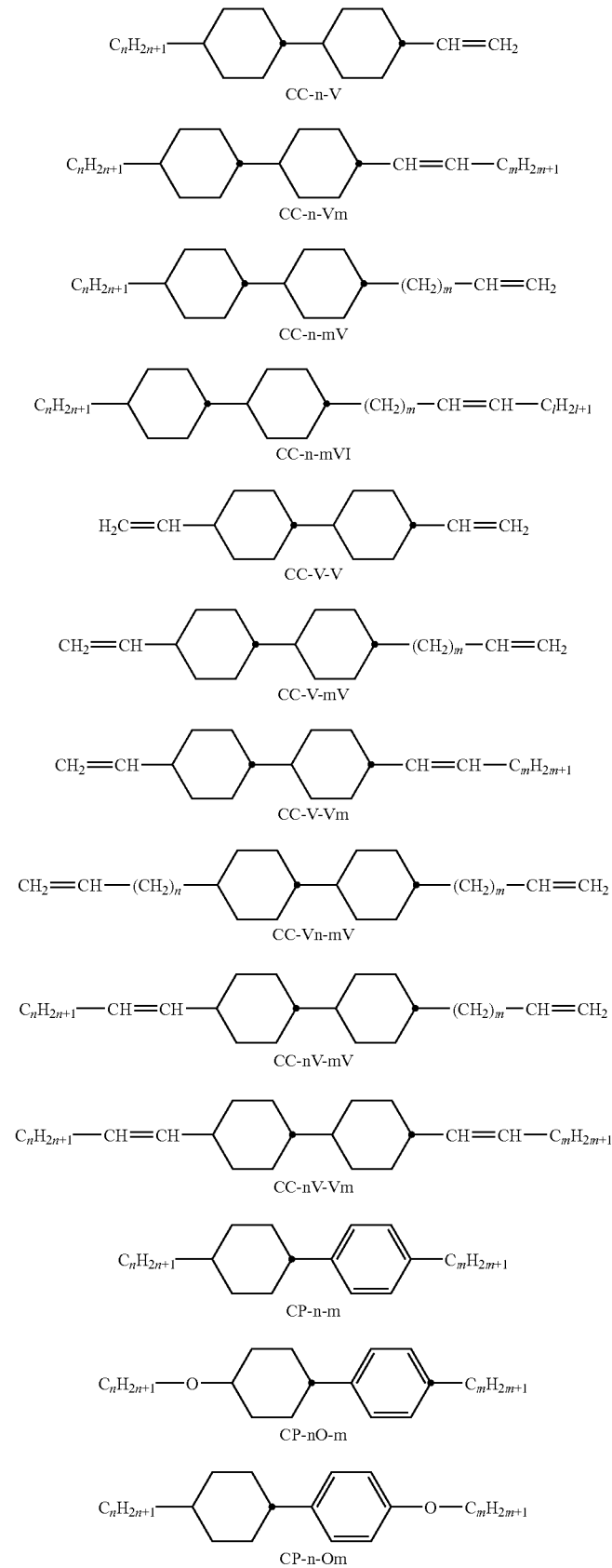

TABLE D-continued
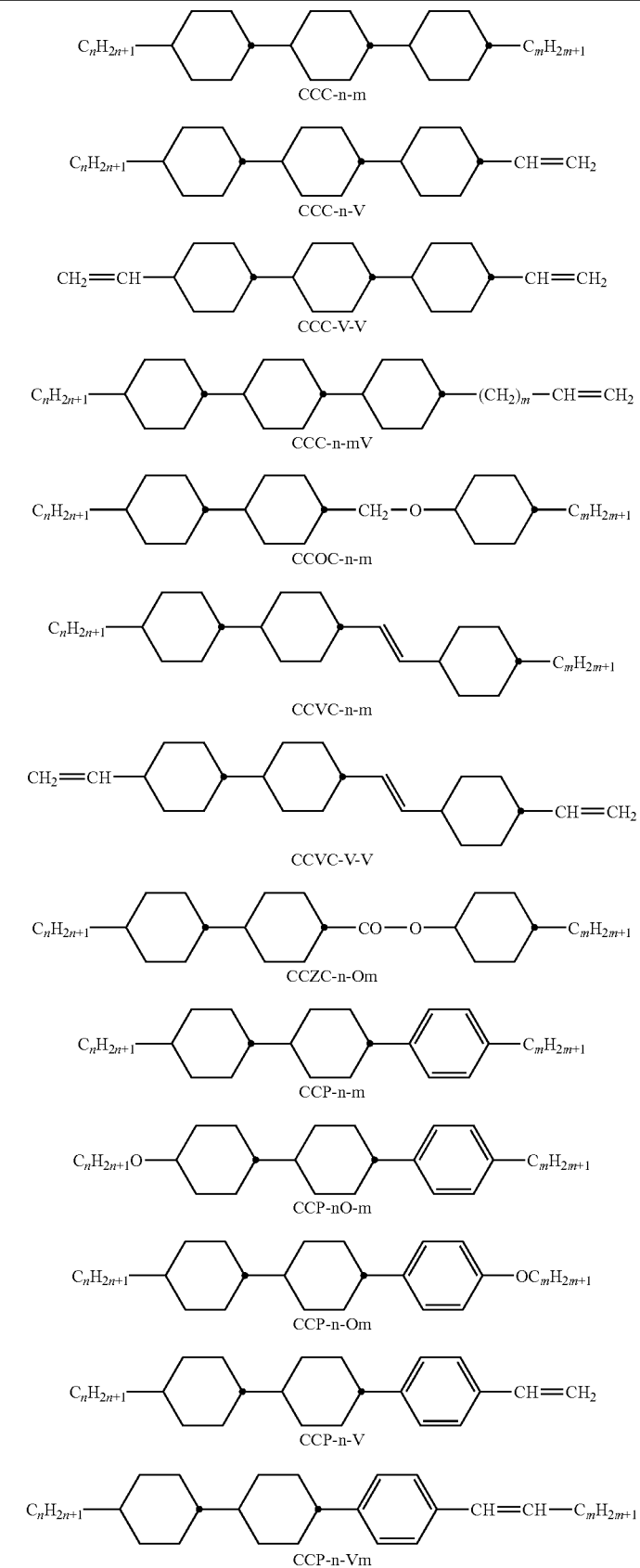

TABLE D-continued structures:
- CCP-n-mV
- CCP-n-mVI
- CCP-V-m
- CCP-nV-m
- CCP-Vn-m
- CCP-nVm-I
- CPP-n-m
- CPP-nO-m
- CPP-n-Om
- CPP-V-m
- CPP-nV-m
- CPP-Vn-m
- CPP-nVm-I TABLE D-continued
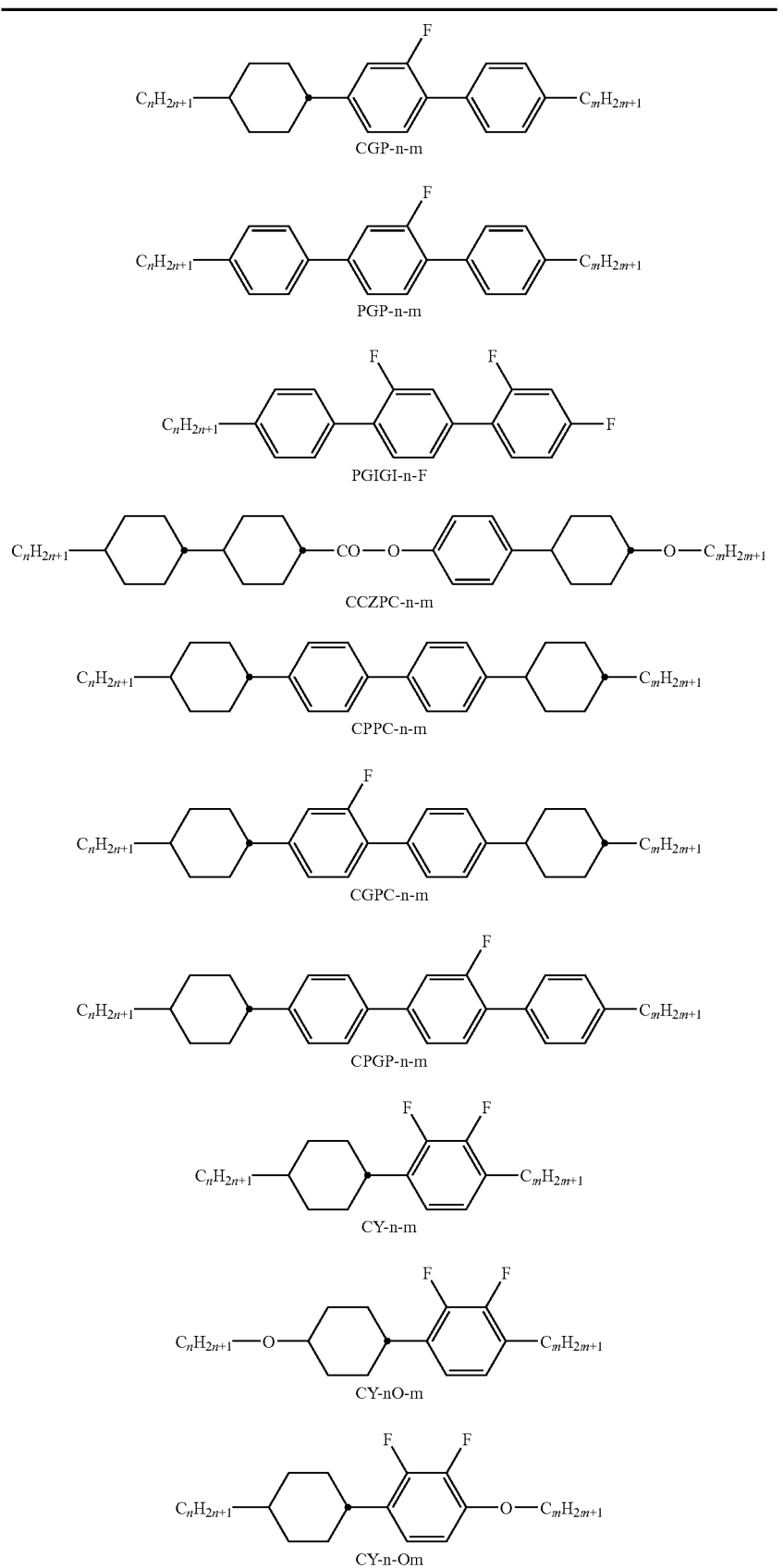

TABLE D-continued
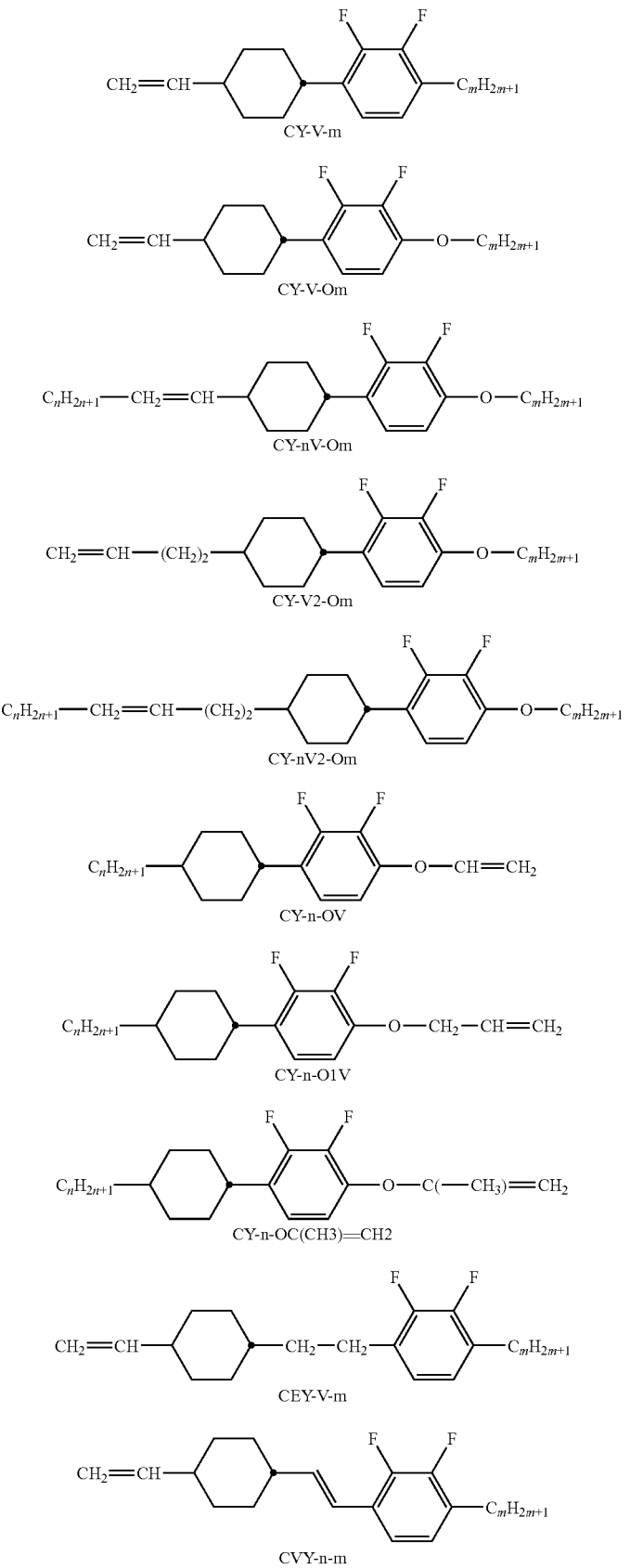

TABLE D-continued
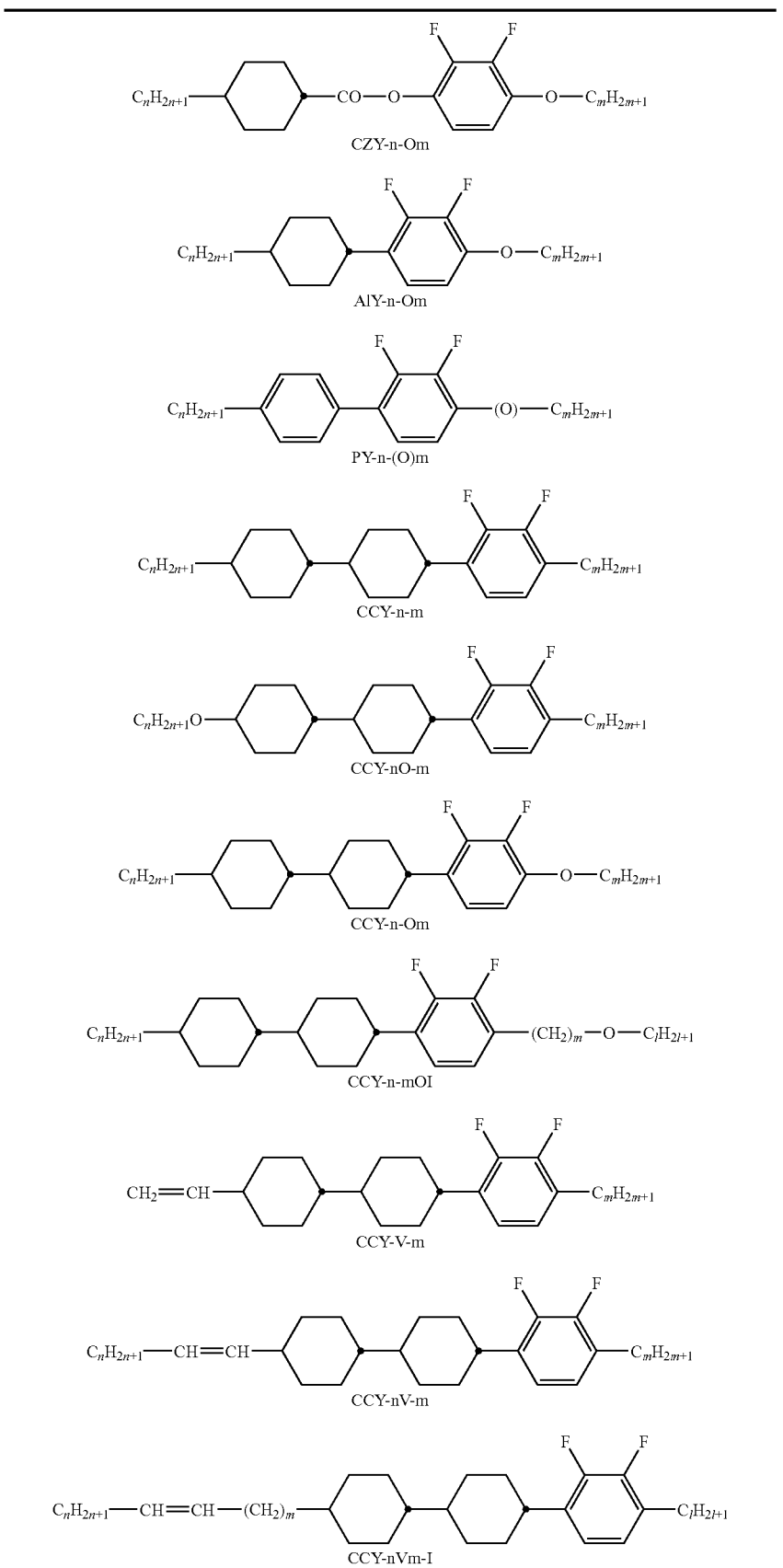

TABLE D-continued
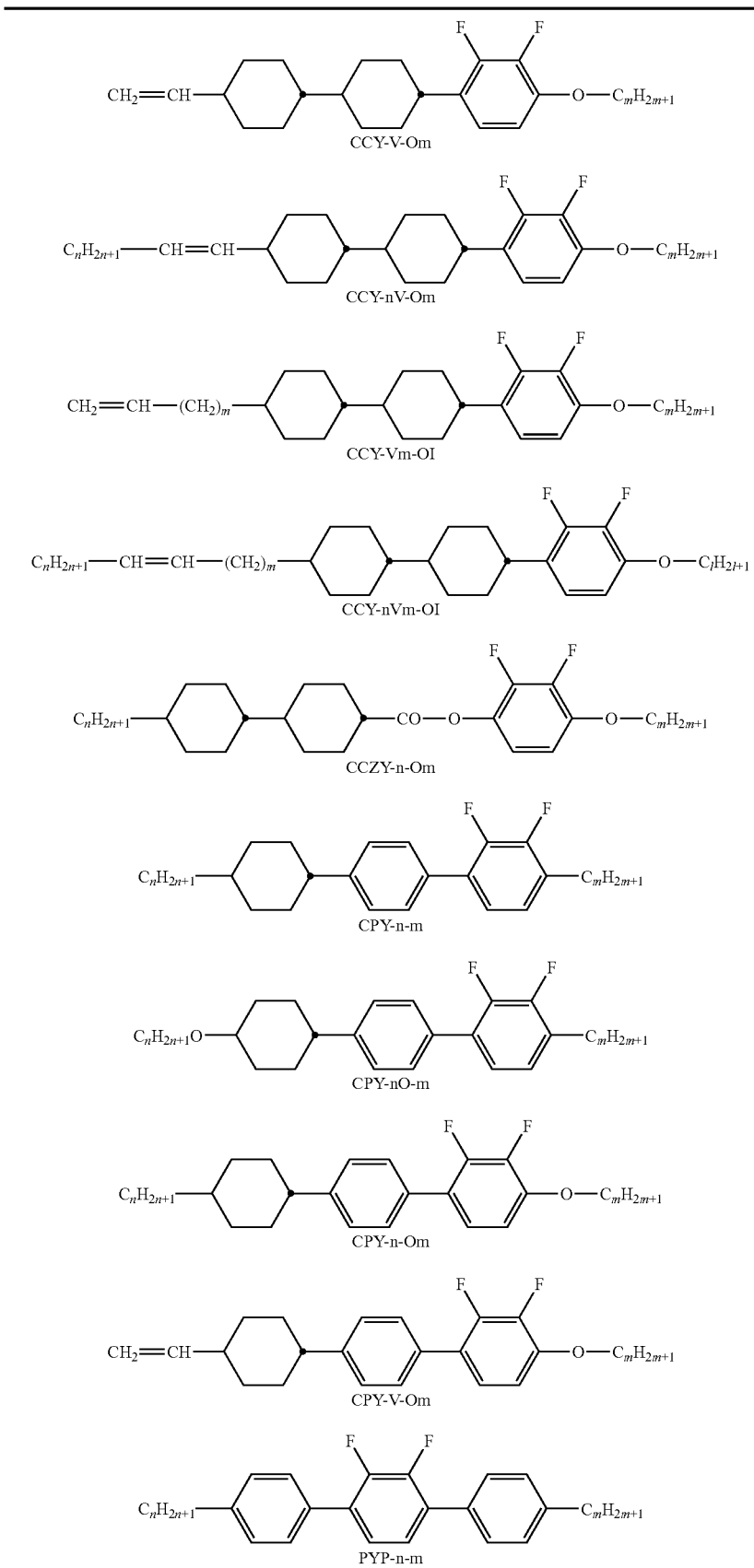

TABLE D-continued
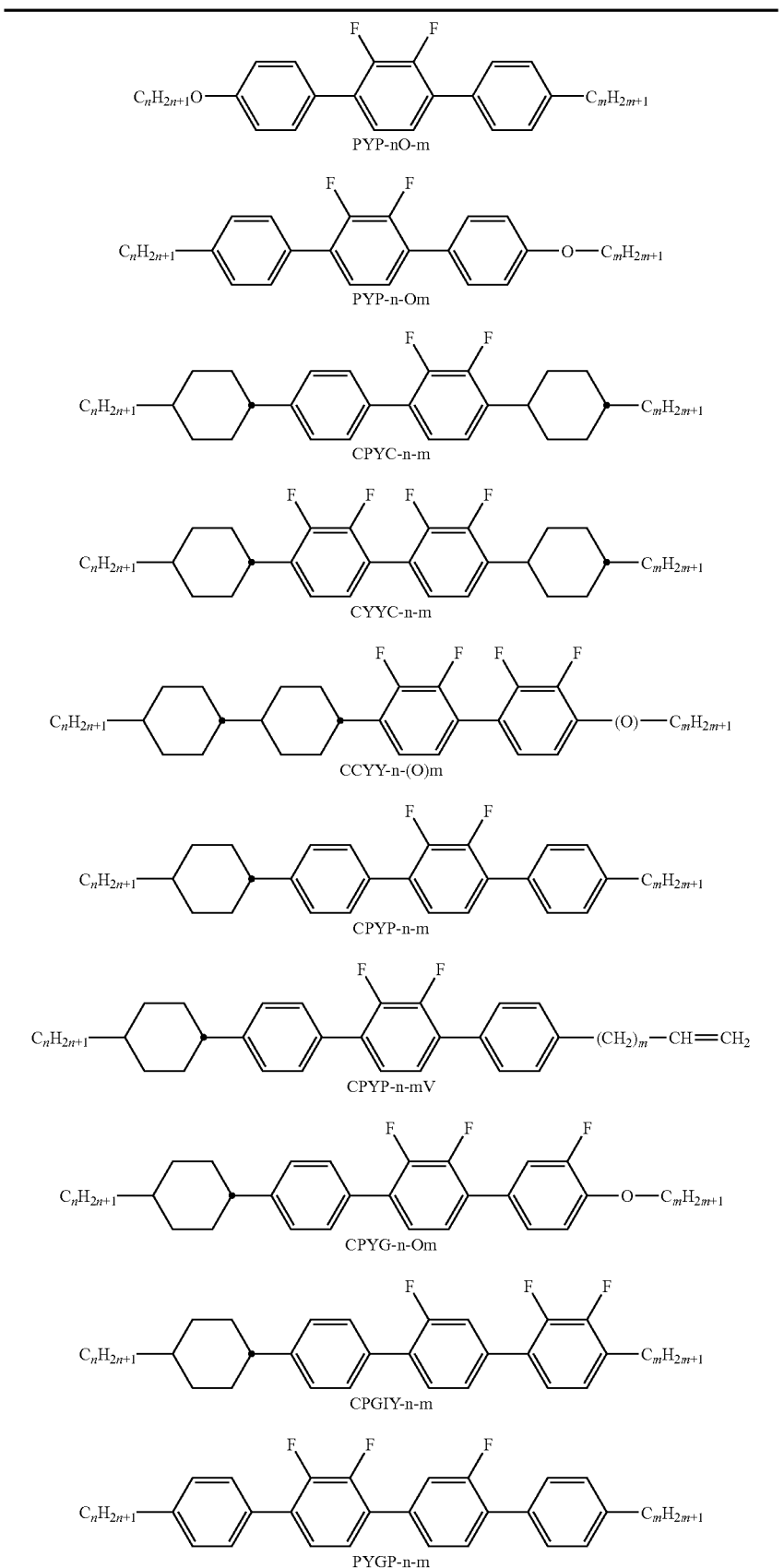

TABLE D-continued
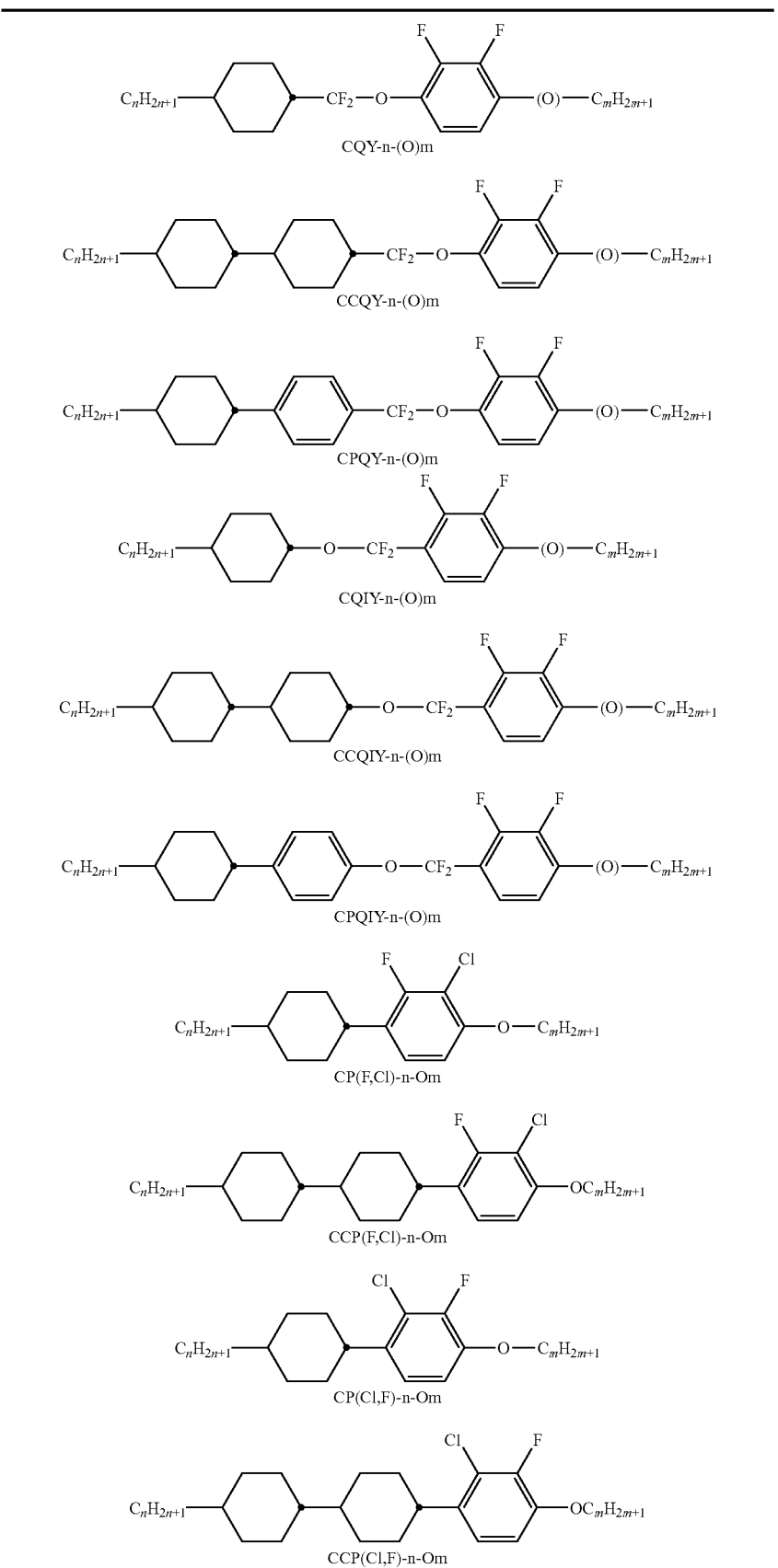

TABLE D-continued
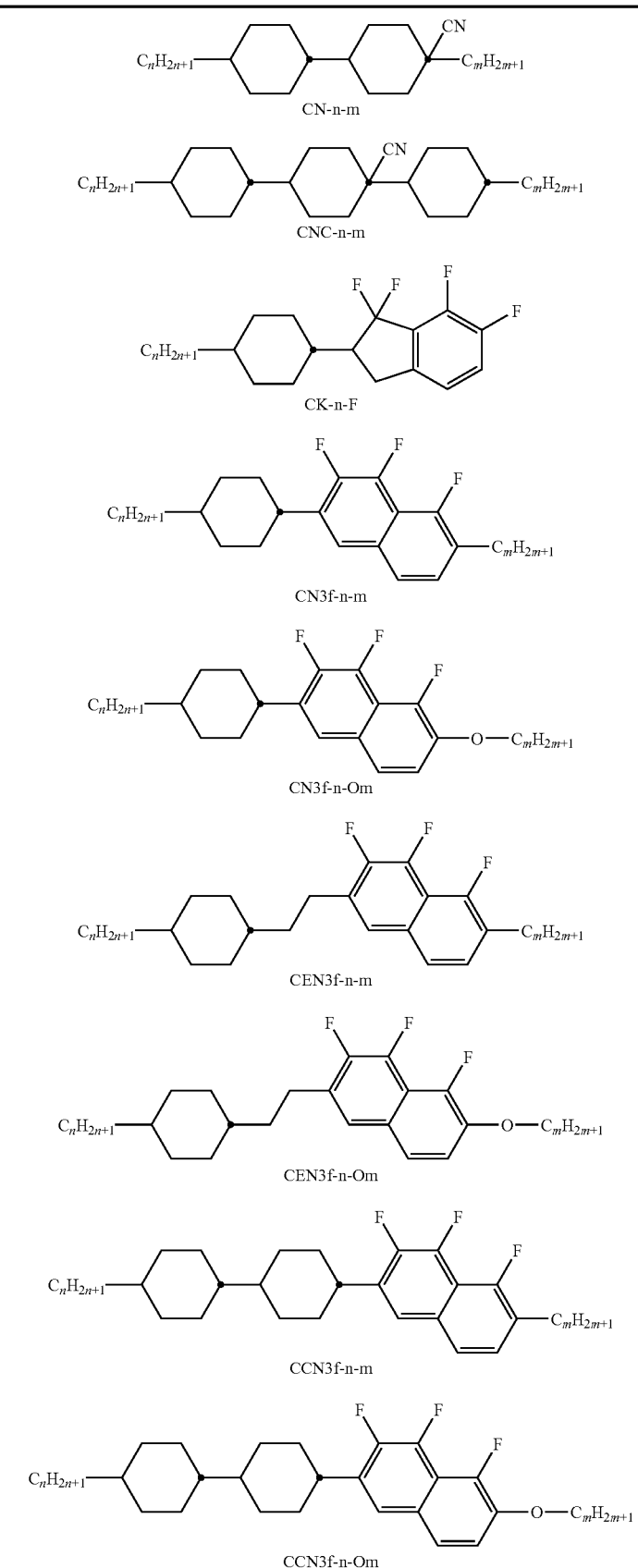

TABLE D-continued
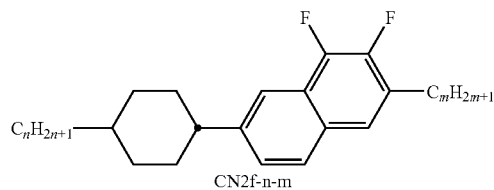
CN2f-n-m
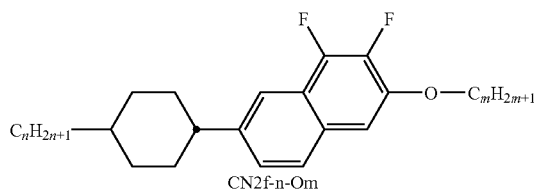
CN2f-n-Om
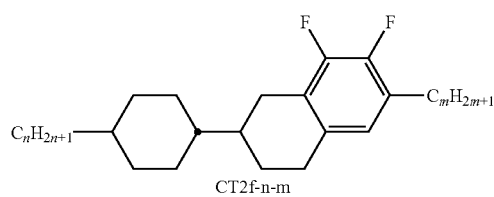
CT2f-n-m
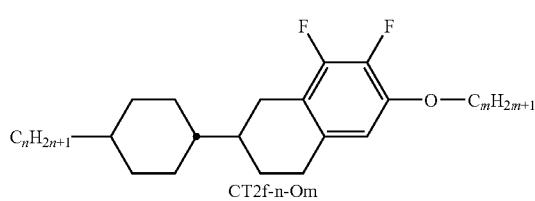
CT2f-n-Om
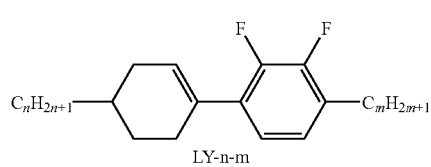
LY-n-m
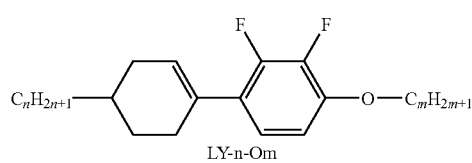
LY-n-Om
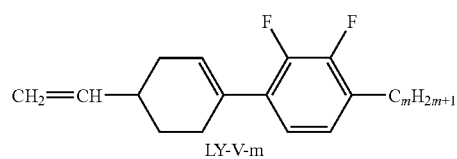
LY-V-m
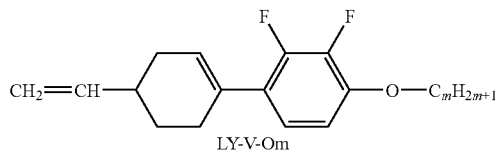
LY-V-Om
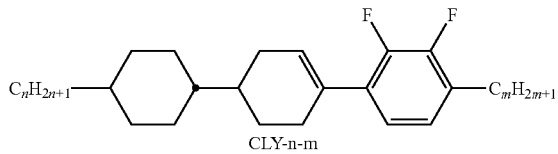
CLY-n-m TABLE D-continued
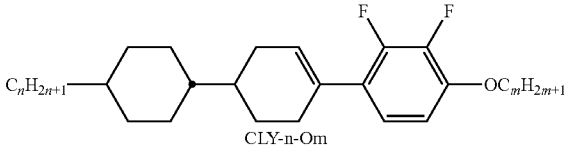
CLY-n-Om
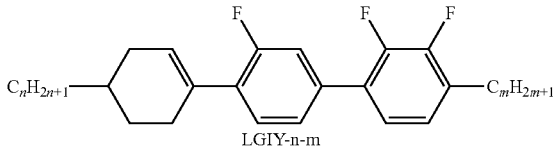
LGIY-n-m
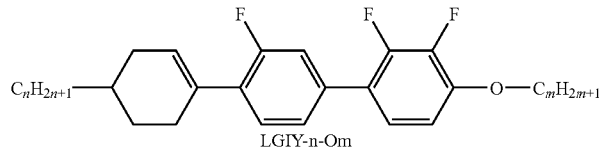
LGIY-n-Om
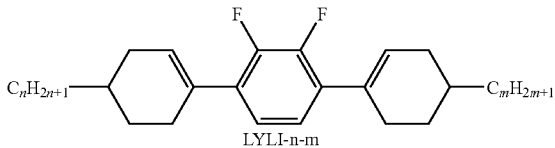
LYLI-n-m
Table E shows chiral dopants which are preferably employed in the mixtures according to the invention.
TABLE E
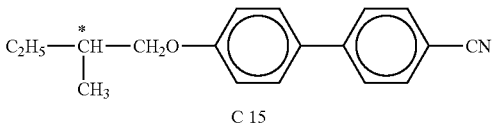
C 15
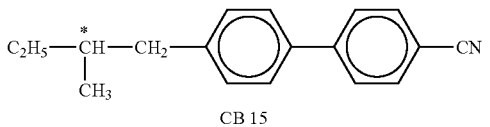
CB 15
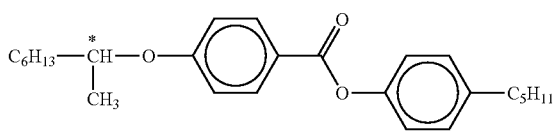
CM 21
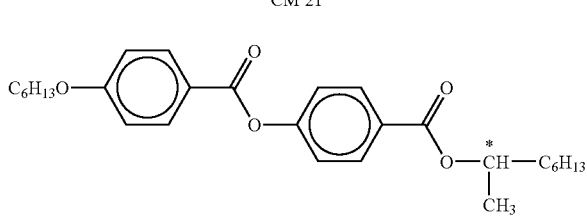
RS-811/S-811
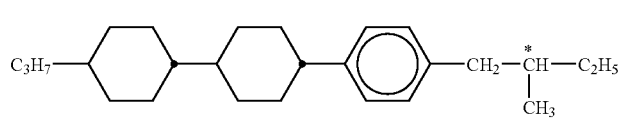
CM 44

TABLE E-continued
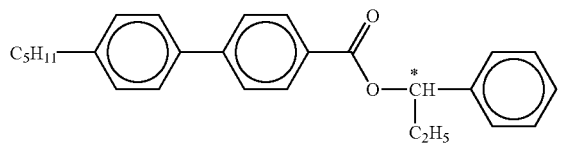
CM 45
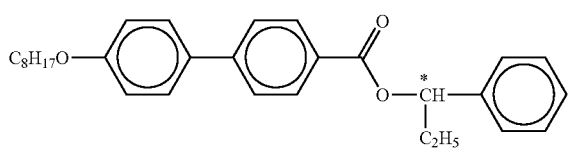
CM 47
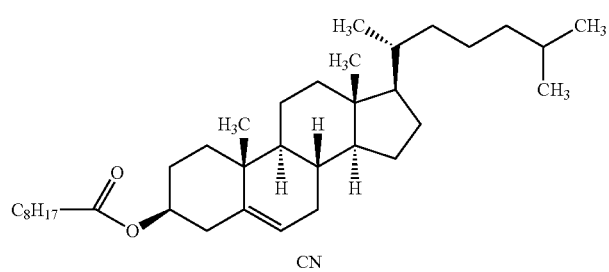
CN
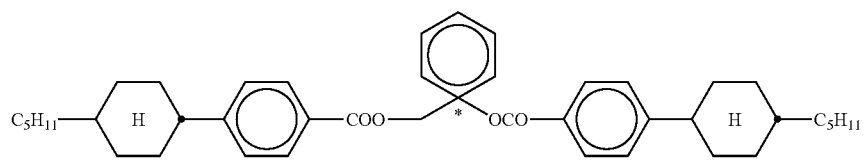
R-1011/S-1011
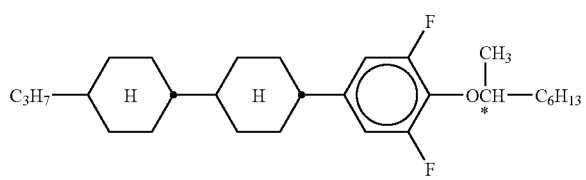
R-2011/S-2011
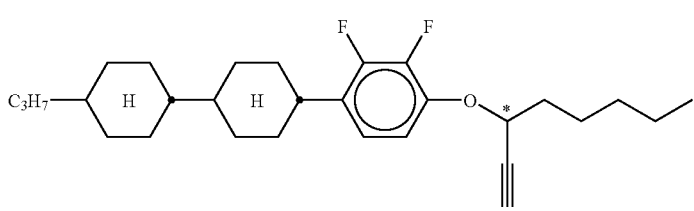
R-3011/S-3011
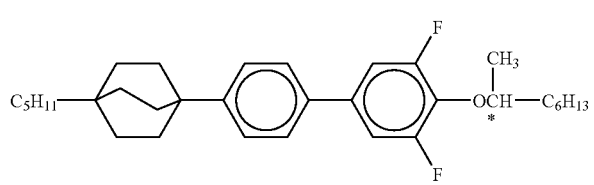
R-4011/S-4011

TABLE E-continued
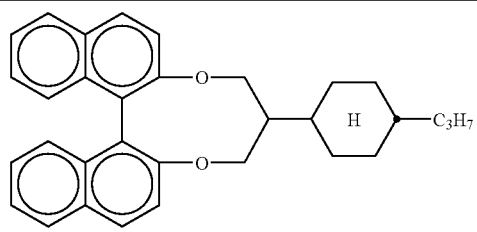
R-5011/S-5011
Compounds selected from the group of the compounds from Table E.
TABLE F
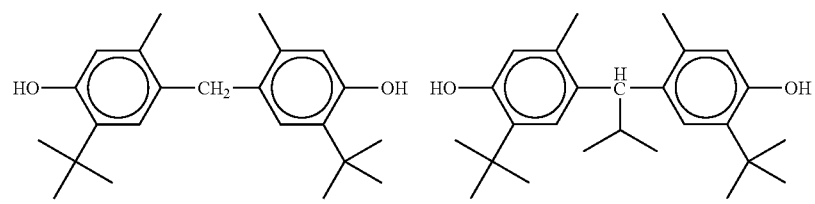
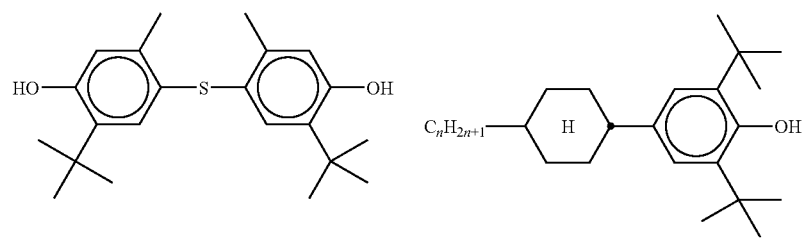
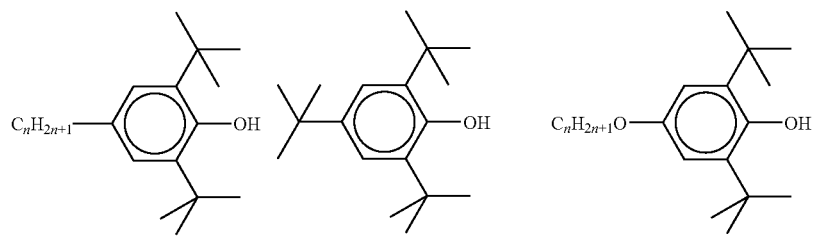
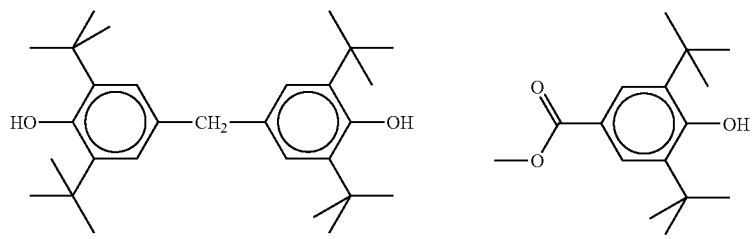
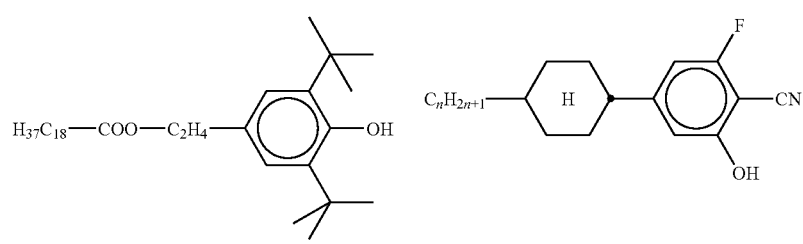

TABLE F-continued
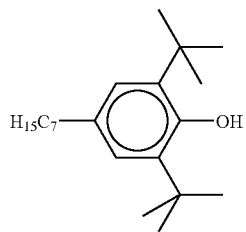
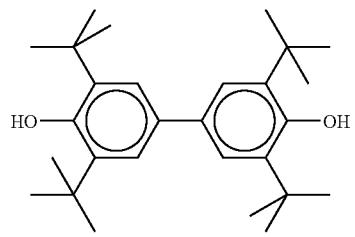
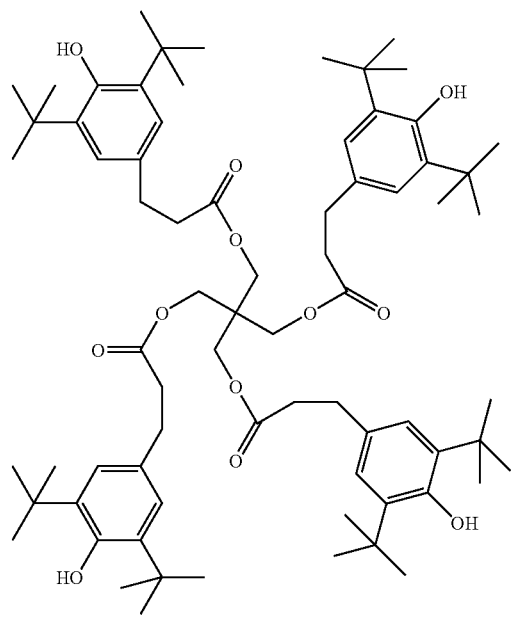
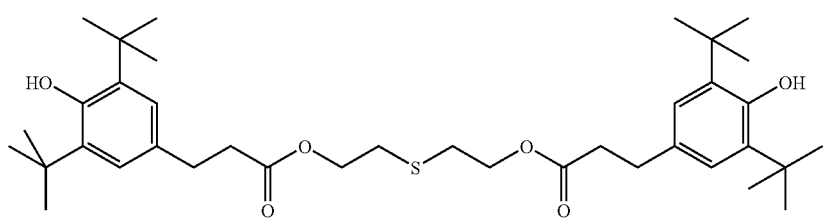
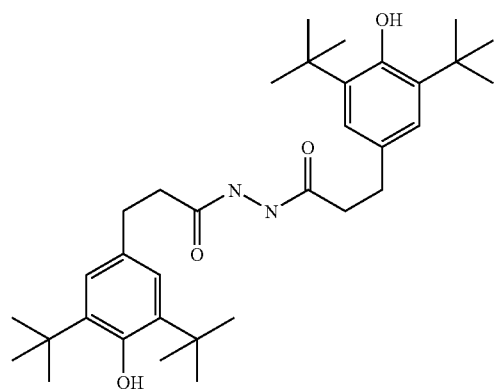

TABLE F-continued
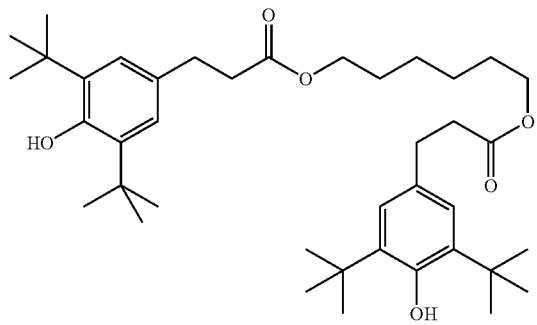
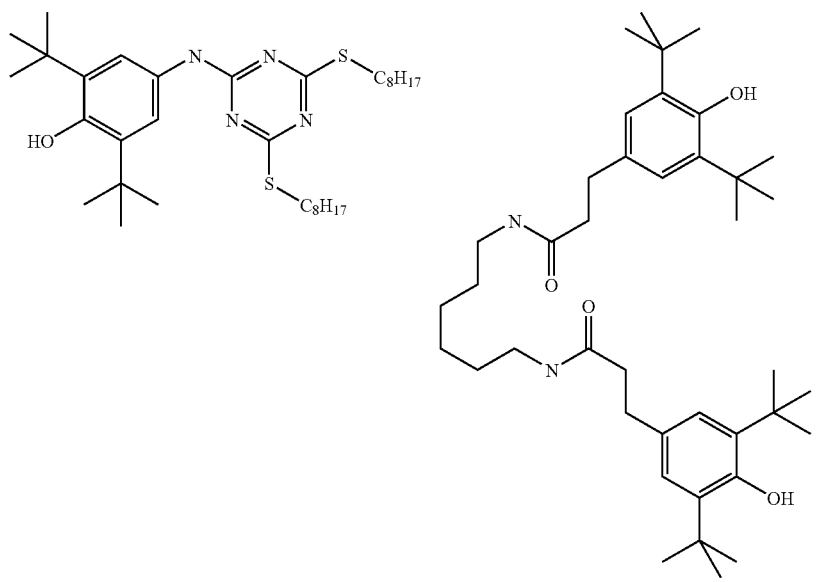
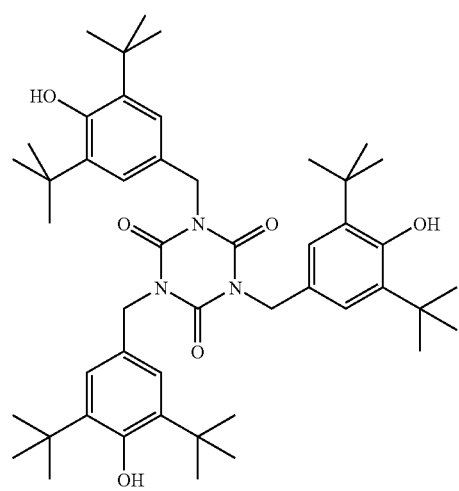

TABLE F-continued
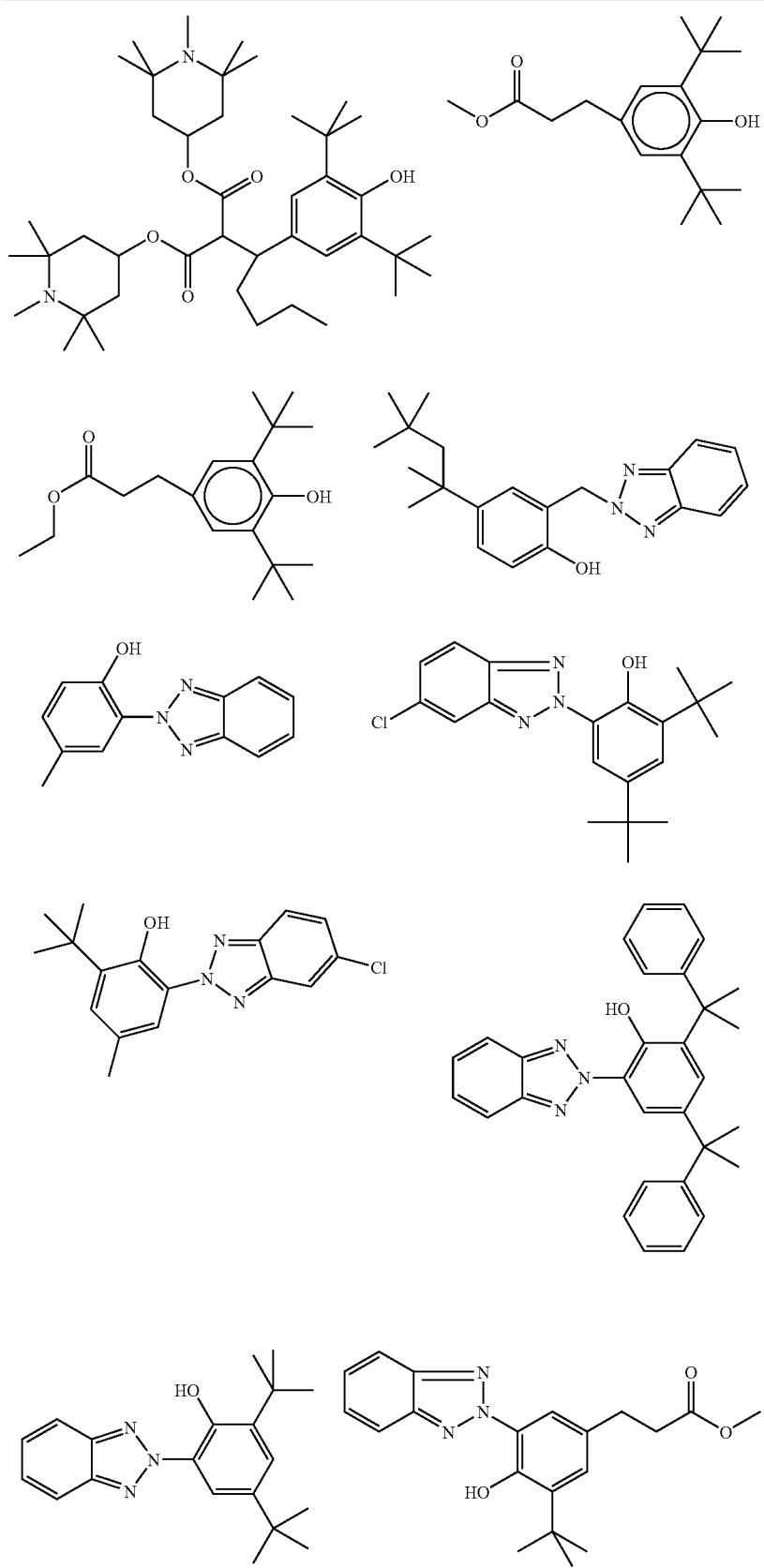

TABLE F-continued
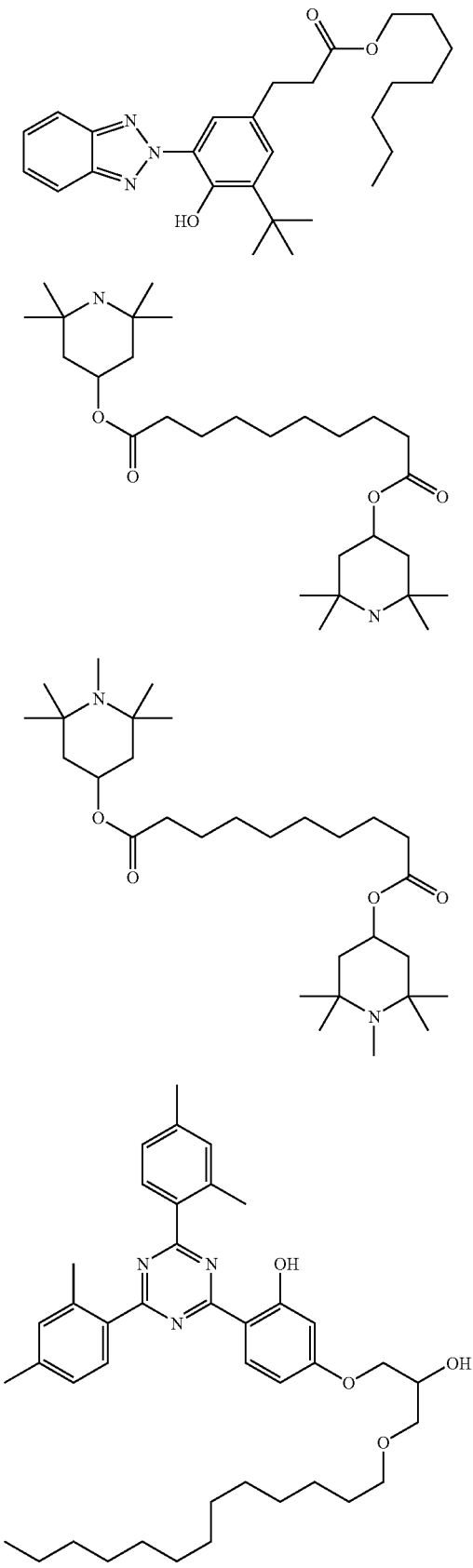

TABLE F-continued

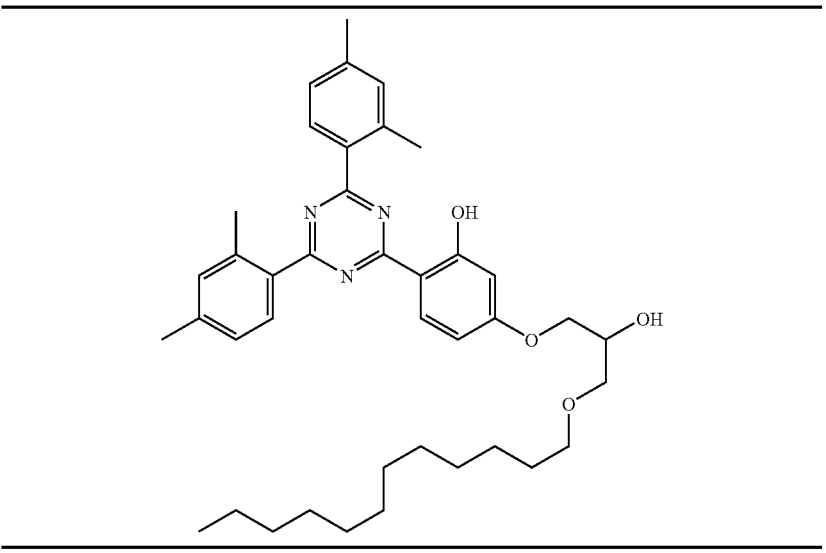

(n here denotes an integer from 1 to 12)

In a preferred embodiment of the present invention, the media according to the invention comprise one or more compounds selected from the group of the compounds from Table F.

MIXTURE EXAMPLES

Examples 1.1 to 1.4

Example 1.1

| Composition | | | |
|---|---|---|---|
| Compound | | Concentration | |
| No. | Abbr. | % by weight | Physical properties |
| 1 | CY-3-O4 | 30.0 | T (N, I) = 86.0° C. |
| 2 | CY-5-O2 | 12.0 | $n_e$ (20° C., 589 nm) = 1.5911 |
| 3 | CLY-3-O2 | 7.0 | $\Delta n$ (20° C., 589 nm) = 0.1101 |
| 4 | CCY-3-O3 | 9.0 | $\epsilon_\perp$ (20° C., 1 kHz) = 11.4 |
| 5 | CCY-4-O2 | 8.0 | $\Delta\epsilon$ (20° C., 1 kHz) = −7.0 |
| 6 | CLY-5-O2 | 7.0 | $K_1$ (20° C.) = 15.4 pN |
| 7 | CLY-3-1 | 9.0 | $K_3/K_1$ (20° C.) = 1.05 |
| 8 | CPY-2-O2 | 8.0 | $\gamma_1$ (20° C.) = 295 mPa·s |
| 9 | CPY-3-O2 | 8.0 | $V_0$ (20° C.) = 1.60 V |
| 10 | CC-4-V | 2.0 | |
| Σ | | 100.0 | |

Example 1.2

| Composition | | | |
|---|---|---|---|
| Compound | | Concentration | |
| No. | Abbr. | % by weight | Physical properties |
| 1 | CY-3-O4 | 24.0 | T (N, I) = 87.0° C. |
| 2 | CLY-3-O2 | 7.0 | $\Delta n$ (20° C., 589 nm) = 0.1090 |
| 3 | CCY-3-O3 | 4.0 | $\Delta\epsilon$ (20° C., 1 kHz) = −7.0 |
| 4 | CCY-4-O2 | 5.0 | $\gamma_1$ (20° C.) = 260 mPa·s |

-continued

| Composition | | | |
|---|---|---|---|
| Compound | | Concentration | |
| No. | Abbr. | % by weight | Physical properties |
| 5 | CLY-5-O2 | 7.0 | |
| 6 | CLY-3-1 | 9.0 | |
| 7 | CPY-2-O2 | 8.0 | |
| 8 | CPY-3-O2 | 8.0 | |
| 9 | CC-4-V | 8.0 | |
| 10 | PYP-2-3 | 3.0 | |
| 11 | CK-3-F | 5.0 | |
| 12 | CK-4-F | 7.0 | |
| 13 | CK-5-F | 5.0 | |
| Σ | | 100.0 | |

Example 1.3

| Composition | | | |
|---|---|---|---|
| Compound | | Concentration | |
| No. | Abbr. | % by weight | Physical properties |
| 1 | CY-3-O4 | 22.0 | T (N, I) = 86.5° C. |
| 2 | CLY-3-O2 | 7.0 | $\Delta n$ (20° C., 589 nm) = 0.1100 |
| 3 | CCY-3-O3 | 5.0 | $\Delta\epsilon$ (20° C., 1 kHz) = −6.9 |
| 4 | CCY-4-O2 | 5.0 | $\gamma_1$ (20° C.) = 280 mPa·s |
| 5 | CLY-5-O2 | 7.0 | |
| 6 | CLY-3-1 | 9.0 | |
| 7 | CPY-2-O2 | 7.0 | |
| 8 | CPY-3-O2 | 7.0 | |
| 9 | CC-4-V | 15.0 | |
| 10 | CN3f-3-O4 | 9.0 | |
| 11 | CN3f-5-O2 | 7.0 | |
| Σ | | 100.0 | |

Example 1.4

| Compound | | Composition | |
|---|---|---|---|
| No. | Abbr. | % by weight | Physical properties |
| 1 | CY-V-O2 | 20.0 | T (N, I) = 86.7° C. |
| 2 | CY-V-O4 | 10.0 | Δn (20° C., 589 nm) = 0.1090 |
| 3 | CLY-3-O2 | 10.0 | Δε (20° C., 1 kHz) = −7.0 |
| 4 | CCY-V-O2 | 12.0 | $\gamma_1$ (20° C.) = 238 mPa · s |
| 5 | CCY-V-O4 | 12.0 | |
| 6 | CLY-5-O2 | 10.0 | |
| 7 | CLY-3-1 | 9.0 | |
| 8 | CPY-V-O2 | 5.0 | |
| 9 | CPY-V-O4 | 5.0 | |
| 10 | CC-4-V | 7.0 | |
| Σ | | 100.0 | |

Examples 2.1 to 2.4

Example 2.1

| Compound | | Composition | |
|---|---|---|---|
| No. | Abbr. | % by weight | Physical properties |
| 1 | CY-3-O4 | 13.0 | T (N, I) = 82.0° C. |
| 2 | CY-5-O2 | 8.0 | $n_e$ (20° C., 589 nm) = 1.5834 |
| 3 | CLY-3-O2 | 10.0 | Δn (20° C., 589 nm) = 0.1008 |
| 4 | CLY-3-1 | 7.0 | $\epsilon_\perp$ (20° C.) = 7.4 |
| 5 | CPY-2-O2 | 12.0 | Δε (20° C., 1 kHz) = −3.7 |
| 6 | CPY-3-O2 | 12.0 | $K_1$ (20° C.) = 14.9 pN |
| 7 | CC-3-5 | 12.0 | $K_3/K_1$ (20° C.) = 1.05 |
| 8 | CP-3-O1 | 10.0 | $\gamma_1$ (20° C.) = 159 mPa · s |
| 9 | CC-5-O1 | 11.0 | $V_0$ (20° C.) = 2.17 V |
| 10 | CCOC-3-3 | 5.0 | |
| Σ | | 100.0 | |

Example 2.2

| Compound | | Composition | |
|---|---|---|---|
| No. | Abbr. | % by weight | Physical properties |
| 1 | CY-3-O4 | 6.0 | T (N, I) = 81.0° C. |
| 2 | CLY-3-O2 | 10.0 | Δn (20° C., 589 nm) = 0.0982 |
| 3 | CLY-3-1 | 7.0 | Δε (20° C., 1 kHz) = −3.7 |
| 4 | CPY-2-O2 | 10.0 | $\gamma_1$ (20° C.) = 140 mPa · s |
| 5 | CPY-3-O2 | 10.0 | |
| 6 | CC-3-5 | 12.0 | |
| 7 | CP-3-O1 | 12.0 | |
| 8 | CC-5-O1 | 12.0 | |
| 9 | CC-3-4 | 4.0 | |
| 10 | PYP-2-4 | 4.0 | |
| 11 | CK-3-F | 4.0 | |
| 12 | CK-4-F | 5.0 | |
| 13 | CK-5-F | 4.0 | |
| Σ | | 100.0 | |

Example 2.3

| Compound | | Composition | |
|---|---|---|---|
| No. | Abbr. | % by weight | Physical properties |
| 1 | CY-3-O4 | 6.0 | T (N, I) = 82.0° C. |
| 2 | CLY-3-O2 | 10.0 | Δn (20° C., 589 nm) = 0.1005 |
| 3 | CLY-3-1 | 7.0 | Δε (20° C., 1 kHz) = −3.8 |
| 4 | CPY-2-O2 | 9.0 | $\gamma_1$ (20° C.) = 148 mPa · s |
| 5 | CPY-3-O2 | 8.0 | |
| 6 | CC-3-5 | 12.0 | |
| 7 | CP-3-O1 | 12.0 | |
| 8 | CC-5-O1 | 12.0 | |
| 9 | CC-3-4 | 9.0 | |
| 10 | PYP-2-4 | 2.0 | |
| 11 | CN3f-3-O4 | 8.0 | |
| 12 | CN3f-5-O2 | 5.0 | |
| Σ | | 100.0 | |

Example 2.4

| Compound | | Composition | |
|---|---|---|---|
| No. | Abbr. | % by weight | Physical properties |
| 1 | CY-V-O2 | 14.0 | T (N, I) = 81.0° C. |
| 2 | CLY-3-O2 | 12.0 | Δn (20° C., 589 nm) = 0.1010 |
| 3 | CCY-V-O2 | 6.0 | Δε (20° C., 1 kHz) = −3.7 |
| 4 | CLY-3-1 | 7.0 | $\gamma_1$ (20° C.) = 143 mPa · s |
| 5 | CPY-V-O2 | 10.0 | |
| 6 | CPY-V-O4 | 10.0 | |
| 7 | CC-3-5 | 12.0 | |
| 8 | CP-3-O1 | 12.0 | |
| 9 | CC-5-O1 | 12.0 | |
| 10 | CCOC-3-3 | 5.0 | |
| Σ | | 100.0 | |

Examples 3.1 to 3.5

Example 3.1

| | Composition | | |
|---|---|---|---|
| Compound | | Concentration | |
| No. | Abbr. | % by weight | Physical properties |
| 1 | LY-3-O2 | 18.0 | $T(N, I) = 81.5°$ C. |
| 2 | CY-5-O2 | 14.0 | $n_e$ (20° C., 589 nm) = 1.6159 |
| 3 | CCY-3-O2 | 5.0 | $\Delta n$ (20° C., 589 nm) = 0.1265 |
| 4 | CPY-2-O2 | 12.0 | $\epsilon_\perp$ (20° C., 1 kHz) = 7.6 |
| 5 | CPY-3-O2 | 12.0 | $\Delta \epsilon$ (20° C., 1 kHz) = −3.9 |
| 6 | CPP-3-2 | 13.0 | $K_1$ (20° C.) = 15.4 pN |
| 7 | CC-3-V1 | 12.0 | $K_3/K_1$ (20° C.) = 1.10 |
| 8 | CC-5-V | 9.0 | $\gamma_1$ (20° C.) = 156 mPa · s |
| 9 | PGIGI-3-F | 5.0 | $V_0$ (20° C.) = 2.21 V |
| Σ | | 100.0 | |

Example 3.2

| | Composition | | |
|---|---|---|---|
| Compound | | Concentration | |
| No. | Abbr. | % by weight | Physical properties |
| 1 | LY-3-O2 | 17.0 | $T(N, I) = 82.0°$ C. |
| 2 | CPY-2-O2 | 12.0 | $\Delta n$ (20° C., 589 nm) = 0.1264 |
| 3 | CPY-3-O2 | 12.0 | $\Delta \epsilon$ (20° C., 1 kHz) = −3.8 |
| 4 | CPP-3-2 | 12.0 | $\gamma_1$ (20° C.) = 150 mPa · s |
| 5 | CC-3-V1 | 11.0 | |
| 6 | CC-5-V | 12.0 | |
| 7 | PGIGI-3-F | 9.0 | |
| 8 | CK-3-F | 5.0 | |
| 9 | CK-4-F | 5.0 | |
| 10 | CK-5-F | 5.0 | |
| Σ | | 100.0 | |

Example 3.3

| | Composition | | |
|---|---|---|---|
| Compound | | Concentration | |
| No. | Abbr. | % by weight | Physical properties |
| 1 | LY-3-O2 | 17.0 | $T(N, I) = 81.0°$ C. |
| 2 | CPY-2-O2 | 11.0 | $\Delta n$ (20° C., 589 nm) = 0.1273 |
| 3 | CPY-3-O2 | 11.0 | $\Delta \epsilon$ (20° C., 1 kHz) = −3.9 |
| 4 | CPP-3-2 | 12.0 | $\gamma_1$ (20° C.) = 161 mPa · s |
| 5 | CC-3-V1 | 10.0 | |
| 6 | CC-5-V | 19.0 | |
| 7 | PGIGI-3-F | 6.0 | |
| 8 | CN3f-3-O4 | 7.0 | |
| 9 | CN3f-5-O2 | 7.0 | |
| Σ | | 100.0 | |

Example 3.4

| | Composition | | |
|---|---|---|---|
| Compound | | Concentration | |
| No. | Abbr. | % by weight | Physical properties |
| 1 | LY-3-O2 | 18.0 | $T(N, I) = 81.5°$ C. |
| 2 | CY-5-O2 | 6.0 | $\Delta n$ (20° C., 589 nm) = 0.1268 |
| 3 | CLY-3-O2 | 12.0 | $\Delta \epsilon$ (20° C., 1 kHz) = −3.8 |
| 4 | CCY-3-O2 | 2.0 | $\gamma_1$ (20° C.) = 134 mPa · s |
| 5 | CPY-2-O2 | 7.0 | |
| 6 | CPY-3-O2 | 7.0 | |
| 7 | CC-3-V1 | 12.0 | |
| 8 | CC-5-V | 19.0 | |
| 9 | PYP-2-4 | 9.0 | |
| 10 | PYP-2-3 | 8.0 | |
| Σ | | 100.0 | |

Example 3.5

| | Composition | | |
|---|---|---|---|
| Compound | | Concentration | |
| No. | Abbr. | % by weight | Physical properties |
| 1 | LY-3-O2 | 17.0 | $T(N, I) = 81.0°$ C. |
| 2 | CY-V-O2 | 4.0 | $\Delta n$(20° C., 589 nm) = 0.1271 |
| 3 | CLY-3-O2 | 12.0 | $\Delta \epsilon$(20° C., 1 kHz) = −3.8 |
| 4 | CCY-V-O2 | 5.0 | $\gamma_1$(20° C.) = 131 mPa · s |
| 5 | CPY-V-O2 | 7.0 | |
| 6 | CPY-V-O4 | 6.0 | |
| 7 | CC-3-V1 | 12.0 | |
| 8 | CC-5-V | 20.0 | |
| 9 | PYP-2-4 | 9.0 | |
| 10 | PYP-2-3 | 8.0 | |
| Σ | | 100.0 | |

Examples 4.1 and 4.2

Example 4.1

| | Composition | | |
|---|---|---|---|
| Compound | | Concentration | |
| No. | Abbr. | % by weight | Physical properties |
| 1 | CY-3-O4 | 10.0 | $T(N, I) = 96.5°$ C. |
| 2 | CCY-3-O2 | 5.0 | $\Delta n$(20° C., 589 nm) = 0.1231 |
| 3 | CCY-3-O3 | 5.0 | $\Delta \epsilon$(20° C., 1 kHz) = −3.8 |
| 4 | CCY-4-O2 | 5.0 | $\gamma_1$(20° C.) = 194 mPa · s |
| 5 | CLY-3-1 | 6.0 | |
| 6 | LGIY-2-1 | 4.0 | |
| 7 | LYLI-3-3 | 6.0 | |
| 8 | CPY-2-O2 | 11.0 | |
| 9 | CPY-3-O2 | 10.0 | |
| 10 | PYP-2-3 | 5.0 | |
| 11 | PYP-2-4 | 6.0 | |

-continued

| Compound | | Concentration | |
|---|---|---|---|
| No. | Abbr. | % by weight | Physical properties |
| 12 | CC-3-V1 | 10.0 | |
| 13 | CC-4-V | 11.0 | |
| 14 | CC-3-O1 | 6.0 | |
| Σ | | 100.0 | |

Example 4.2

| Compound | | Concentration | |
|---|---|---|---|
| No. | Abbr. | % by weight | Physical properties |
| 1 | CY-3-O4 | 11.0 | T(N, I) = 96.0° C. |
| 2 | CLY-3-O2 | 5.0 | $\Delta n(20° C., 589 \, nm) = 0.1227$ |
| 3 | CCY-3-O3 | 5.0 | $\Delta\epsilon(20° C., 1 \, kHz) = -3.9$ |
| 4 | CCY-4-O2 | 5.0 | $\gamma_1(20° C.) = 191 \, mPa \cdot s$ |
| 5 | CLY-3-1 | 6.0 | |
| 6 | LGIY-2-1 | 4.0 | |
| 7 | LYLI-3-3 | 6.0 | |
| 8 | CPY-2-O2 | 10.0 | |
| 9 | CPY-3-O2 | 10.0 | |
| 10 | PYP-2-3 | 5.0 | |
| 11 | PYP-2-4 | 6.0 | |
| 12 | CC-3-V1 | 11.0 | |
| 13 | CC-4-V | 10.0 | |
| 14 | CC-3-O1 | 6.0 | |
| Σ | | 100.0 | |

Examples 5.1 and 5.2

Example 5.1

| Compound | | Concentration | |
|---|---|---|---|
| No. | Abbr. | % by weight | Physical properties |
| 1 | CY-3-O2 | 20.0 | T(N, I) = 80.0° C. |
| 2 | CY-5-O2 | 4.0 | $n_e(20° C., 589 \, nm) = 1.5710$ |
| 3 | CLY-2-O2 | 12.0 | $\Delta n(20° C., 589 \, nm) = 0.0910$ |
| 4 | CLY-2-O4 | 9.0 | $\epsilon_\perp(20° C., 1 \, kHz) = 7.7$ |
| 5 | CLY-3-O2 | 12.0 | $\Delta\epsilon(20° C., 1 \, kHz) = -4.1$ |
| 6 | CPY-3-O2 | 8.0 | $K_1(20° C.) = 14.5 \, pN$ |
| 7 | CC-3-V1 | 6.0 | $K_3/K_1(20° C.) = 0.97$ |
| 8 | CC-4-V | 25.0 | $\gamma_1(20° C.) = 110 \, mPa \cdot s$ |
| 9 | CC-3-4 | 4.0 | $V_0(20° C.) = 1.95 \, V$ |
| Σ | | 100.0 | |

Example 5.2

| Compound | | Concentration | |
|---|---|---|---|
| No. | Abbr. | % by weight | Physical properties |
| 1 | LY-3-O2 | 11.0 | T(N, I) = 81.0° C. |
| 2 | LY-5-O4 | 18.0 | $n_e(20° C., 589 \, nm) = 1.5720$ |
| 3 | CLY-3-O2 | 10.0 | $\Delta n(20° C., 589 \, nm) = 0.0922$ |
| 4 | CLY-3-O4 | 14.0 | $\epsilon_\perp(20° C., 1 \, kHz) = 7.6$ |
| 5 | CLY-5-O2 | 14.0 | $\Delta\epsilon(20° C., 1 \, kHz) = -4.1$ |
| 7 | CC-4-V | 25.0 | $K_1(20° C.) = 16.7 \, pN$ |
| 8 | CC-3-4 | 8.0 | $K_3/K_1(20° C.) = 0.86$ |
| Σ | | 100.0 | $\gamma_1(20° C.) = 124 \, mPa \cdot s$ |
| | | | $V_0(20° C.) = 1.99 \, V$ |

Examples 6.1 and 6.2

Example 6.1

| Compound | | Concentration | |
|---|---|---|---|
| No. | Abbr. | % by weight | Physical properties |
| 1 | CY-3-O2 | 13.0 | T(N, I) = 79.0° C. |
| 2 | CY-5-O2 | 4.0 | $n_e(20° C., 589 \, nm) = 1.5642$ |
| 3 | CLY-2-O4 | 6.0 | $\Delta n(20° C., 589 \, nm) = 0.0865$ |
| 4 | CLY-3-O2 | 6.0 | $\epsilon_\perp(20° C., 1 \, kHz) = 6.9$ |
| 5 | CLY-3-O3 | 6.0 | $\Delta\epsilon(20° C., 1 \, kHz) = -3.5$ |
| 6 | CCY-3-O2 | 7.0 | $K_1(20° C.) = 15.5 \, pN$ |
| 7 | CCY-3-O3 | 8.0 | $K_3/K_1(20° C.) = 0.96$ |
| 8 | CPY-3-O2 | 8.0 | $\gamma_1(20° C.) = 123 \, mPa \cdot s$ |
| 9 | CC-3-4 | 10.0 | $V_0(20° C.) = 2.19 \, V$ |
| 10 | CC-3-5 | 9.0 | |
| 11 | CC-3-O1 | 6.0 | |
| 12 | CC-3-O3 | 5.0 | |
| 13 | CP-5-3 | 12.0 | |
| Σ | | 100.0 | |

Example 6.2

| Compound | | Concentration | |
|---|---|---|---|
| No. | Abbr. | % by weight | Physical properties |
| 1 | CY-3-O2 | 14.0 | T(N, I) = 79.0° C. |
| 2 | CY-5-O2 | 10.0 | $n_e(20° C., 589 \, nm) = 1.5696$ |
| 3 | CLY-2-O4 | 6.0 | $\Delta n(20° C., 589 \, nm) = 0.0896$ |
| 4 | CLY-3-O2 | 6.0 | $\epsilon_\perp(20° C., 1 \, kHz) = 7.0$ |
| 5 | CLY-3-O3 | 6.0 | $\Delta\epsilon(20° C., 1 \, kHz) = -3.5$ |
| 6 | CCY-3-O3 | 7.0 | $K_1(20° C.) = 13.9 \, pN$ |
| 7 | CCY-3-1 | 4.0 | $K_3/K_1(20° C.) = 1.06$ |

-continued

| Composition | | | |
|---|---|---|---|
| Compound | | Concentration | |
| No. | Abbr. | % by weight | Physical properties |
| 8 | CPY-3-O2 | 8.0 | $\gamma_1(20°\,C.) = 117\,mPa \cdot s$ |
| 9 | CC-3-V1 | 8.0 | $V_0(20°\,C.) = 2.18\,V$ |
| 10 | CC-4-V | 20.0 | |
| 11 | CP-5-3 | 5.0 | |
| 12 | CCP-V-1 | 6.0 | |
| Σ | | 100.0 | |

Examples 7.1 to 7.3

Example 7.1

| Composition | | | |
|---|---|---|---|
| Compound | | Concentration | |
| No. | Abbr. | % by weight | Physical properties |
| 1 | CY-3-O2 | 20.0 | $T(N, I) = 80.0°\,C.$ |
| 2 | CY-5-O2 | 8.5 | $n_e(20°\,C., 589\,nm) = 1.5613$ |
| 3 | CLY-3-O2 | 11.0 | $\Delta n(20°\,C., 589\,nm) = 0.0850$ |
| 4 | CCY-3-O3 | 13.0 | $\epsilon_\perp(20°\,C., 1\,kHz) = 7.3$ |
| 5 | CCY-4-O2 | 5.0 | $\Delta\epsilon(20°\,C., 1\,kHz) = -3.8$ |
| 6 | CPY-2-O2 | 2.0 | $K_1(20°\,C.) = 14.8\,pN$ |
| 7 | CPY-3-O2 | 4.0 | $K_3/K_1(20°\,C.) = 1.06$ |
| 8 | CC-3-V1 | 10.0 | $\gamma_1(20°\,C.) = 119\,mPa \cdot s$ |
| 9 | CC-5-V | 18.0 | $V_0(20°\,C.) = 2.14\,V$ |
| 10 | CC-3-4 | 8.5 | |
| Σ | | 100.0 | |

Example 7.2

| Composition | | | |
|---|---|---|---|
| Compound | | Concentration | |
| No. | Abbr. | % by weight | Physical properties |
| 1 | CY-3-O2 | 13.0 | $T(N, I) = 77.5°\,C.$ |
| 2 | CY-5-O2 | 12.0 | $n_e(20°\,C., 589\,nm) = 1.5640$ |
| 3 | CLY-2-O4 | 8.0 | $\Delta n(20°\,C., 589\,nm) = 0.0855$ |
| 4 | CLY-3-O2 | 8.0 | $\epsilon_\perp(20°\,C., 1\,kHz) = 7.1$ |
| 5 | CCY-3-O3 | 9.0 | $\Delta\epsilon(20°\,C., 1\,kHz) = -3.6$ |
| 6 | CCY-4-O2 | 8.0 | $K_1(20°\,C.) = 13.6\,pN$ |
| 7 | CPY-3-O2 | 4.0 | $K_3/K_1(20°\,C.) = 1.04$ |
| 8 | CC-3-V1 | 10.0 | $V_0(20°\,C.) = 2.09\,V$ |
| 9 | CC-4-V | 20.0 | |
| 10 | CP-5-3 | 5.0 | |
| 11 | CCP-V-1 | 3.0 | |
| Σ | | 100.0 | |

Example 7.3

| Composition | | | |
|---|---|---|---|
| Compound | | Concentration | |
| No. | Abbr. | % by weight | Physical properties |
| 1 | CY-3-O2 | 16.0 | $T(N, I) = 79.5°\,C.$ |
| 2 | CLY-2-O4 | 7.0 | $n_e(20°\,C., 589\,nm) = 1.5685$ |
| 3 | CLY-3-O2 | 7.0 | $\Delta n(20°\,C., 589\,nm) = 0.0895$ |
| 4 | CLY-3-O3 | 7.0 | $\epsilon_\perp(20°\,C., 1\,kHz) = 6.8$ |
| 5 | CCY-3-O3 | 5.0 | $\Delta\epsilon(20°\,C., 1\,kHz) = -3.4$ |
| 6 | CCY-3-1 | 8.0 | $K_1(20°\,C.) = 15.7\,pN$ |
| 7 | CPY-3-O2 | 10.0 | $K_3/K_1(20°\,C.) = 0.96$ |
| 8 | CC-3-4 | 9.0 | $V_0(20°\,C.) = 2.23\,V$ |
| 9 | CC-3-5 | 9.0 | |
| 10 | CC-3-O1 | 5.0 | |
| 11 | CC-3-O3 | 5.0 | |
| 12 | CP-5-3 | 12.0 | |
| Σ | | 100.0 | |

Examples 8.1 and 8.2

Example 8.1

| Composition | | | |
|---|---|---|---|
| Compound | | Concentration | |
| No. | Abbr. | % by weight | Physical properties |
| 1 | CY-3-O2 | 20.0 | $T(N, I) = 77.5°\,C.$ |
| 2 | CY-5-O2 | 9.0 | $n_e(20°\,C., 589\,nm) = 1.5684$ |
| 3 | CLY-2-O4 | 6.0 | $\Delta n(20°\,C., 589\,nm) = 0.0881$ |
| 4 | CLY-3-O2 | 5.0 | $\epsilon_\perp(20°\,C., 1\,kHz) = 6.8$ |
| 5 | CLY-3-O3 | 5.0 | $\Delta\epsilon(20°\,C., 1\,kHz) = -3.3$ |
| 6 | CCY-3-O3 | 8.0 | $K_1(20°\,C.) = 14.0\,pN$ |
| 7 | CCY-2-1 | 2.0 | $K_3/K_1(20°\,C.) = 1.09$ |
| 8 | CPY-3-O2 | 3.0 | $\gamma_1(20°\,C.) = 124\,mPa \cdot s$ |
| 9 | CC-2-5 | 11.0 | $V_0(20°\,C.) = 2.16\,V$ |
| 10 | CC-3-4 | 10.0 | |
| 11 | CC-3-5 | 4.0 | |
| 12 | CP-5-3 | 4.0 | |
| 13 | CCP-3-1 | 4.0 | |
| 14 | CCP-3-3 | 4.0 | |
| 15 | CPP-3-2 | 5.0 | |
| Σ | | 100.0 | |

Example 8.2

| Composition | | | |
|---|---|---|---|
| Compound | | Concentration | |
| No. | Abbr. | % by weight | Physical properties |
| 1 | CY-3-O2 | 20.0 | $T(N, I) = 80.0°\,C.$ |
| 2 | CLY-2-O4 | 6.0 | $n_e(20°\,C., 589\,nm) = 1.5680$ |
| 3 | CLY-3-O2 | 6.0 | $\Delta n(20°\,C., 589\,nm) = 0.0894$ |
| 4 | CLY-3-O3 | 6.0 | $\epsilon_\perp(20°\,C., 1\,kHz) = 6.6$ |
| 5 | CCY-3-O3 | 6.0 | $\Delta\epsilon(20°\,C., 1\,kHz) = -3.2$ |
| 6 | CPY-3-O2 | 10.0 | $K_1(20°\,C.) = 14.0\,pN$ |
| 7 | CC-2-5 | 10.0 | $K_3/K_1(20°\,C.) = 1.11$ |

-continued

| Composition | | | |
|---|---|---|---|
| Compound | | Concentration | |
| No. | Abbr. | % by weight | Physical properties |
| 8 | CC-3-4 | 10.0 | $\gamma_1(20°\,C.) = 112\,mPa\cdot s$ |
| 9 | CC-3-5 | 5.0 | $V_0(20°\,C.) = 2.21\,V$ |
| 10 | CC-3-O1 | 5.0 | |
| 11 | CC-3-O3 | 8.0 | |
| 12 | CP-5-3 | 2.0 | |
| 13 | CPP-3-2 | 6.0 | |
| Σ | | 100.0 | |

Example 9

| Composition | | | |
|---|---|---|---|
| Compound | | Concentration | |
| No. | Abbr. | % by weight | Physical properties |
| 1 | CLY-3-O2 | 10.0 | $T(N, I) = 96.5°\,C.$ |
| 2 | CLY-3-O4 | 9.0 | $n_e(20°\,C., 589\,nm) = 1.4539$ |
| 3 | CCY-3-O3 | 10.0 | $\Delta n(20°\,C., 589\,nm) = 0.0854$ |
| 4 | CPY-3-O2 | 8.0 | $\epsilon_\perp(20°\,C., 1\,kHz) = 6.6$ |
| 5 | CCP-V-1 | 6.0 | $\Delta\epsilon(20°\,C., 1\,kHz) = -3.1$ |
| 6 | CC-3-O1 | 9.0 | $K_1(20°\,C.) = 17.0\,pN$ |
| 7 | CC-3-V1 | 11.0 | $K_3/K_1(20°\,C.) = 1.03$ |
| 8 | CC-4-V | 20.0 | $\gamma_1(20°\,C.) = 110\,mPa\cdot s$ |
| 9 | CC-3-4 | 4.0 | $V_0(20°\,C.) = 2.50\,V$ |
| 10 | CK-3-F | 4.0 | |
| 11 | CK-4-F | 5.0 | |
| 12 | CK-5-F | 4.0 | |
| Σ | | 100.0 | |

Example 10

The following mixture is prepared and investigated.

| Composition | | | |
|---|---|---|---|
| Compound | | Concentration | |
| No. | Abbr. | % by weight | Physical properties |
| 1 | CY-3-O4 | 14.0 | $T(N, I) = 70.0°\,C.$ |
| 2 | CY-5-O4 | 13.0 | $n_e(20°\,C., 589\,nm) = 1.5600$ |
| 3 | CCY-2-1 | 9.0 | $\Delta n(20°\,C., 589\,nm) = 0.0825$ |
| 4 | CCY-2-1 | 9.0 | $\epsilon_\perp(20°\,C., 1\,kHz) = 7.0$ |
| 5 | CCY-3-O2 | 8.0 | $\Delta\epsilon(20°\,C., 1\,kHz) = -3.5$ |
| 6 | CCY-5-O2 | 8.0 | $K_1(20\,C.) = 13.3\,pN$ |
| 7 | CPY-2-O2 | 8.0 | $K_3/K_1(20°\,C.) = 1.00$ |
| 8 | CC-3-5 | 14.0 | $\gamma_1(20°\,C.) = 141\,mPa\cdot s$ |
| 9 | CC-5-O1 | 9.0 | $V_0(20°\,C.) = 2.06\,V$ |
| 10 | CP-5-3 | 8.0 | $HR_{20} = 99\%$ |
| Σ | | 100.0 | $HR_{20}$ (2 h, UV) = 90% |

10% of compound CLY-3-O3 and 0.3% of the reactive mesogenic compound of the following formula:

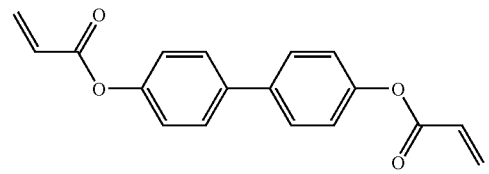

are added to this mixture, and the resultant mixture is introduced into a test cell with electrodes and irradiated with UV. The HR is then investigated. The value is $HR_{20}=99\%$.

The invention claimed is:

1. A liquid-crystalline medium comprising a mixture of dielectrically negative, polar compounds, which comprises one or more compounds of formula I

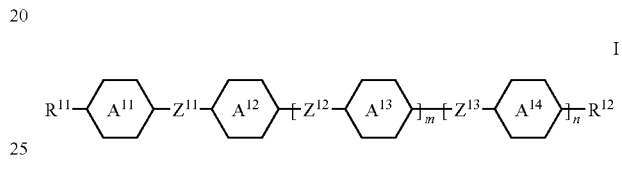

in which $R^{11}$ and $R^{12}$ each, independently of one another, denote H, an unsubstituted alkyl or alkenyl radical having up to 15 C atoms, in which one or more $CH_2$ groups may be replaced by —O—, —S—,

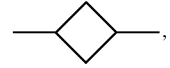

—C≡C—, —$CF_2$—O—, —O—$CF_2$—, —CO—O— or —O—CO— in such a way that O atoms are not linked directly to one another,
one of the rings

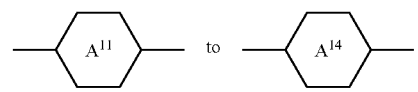

present denotes

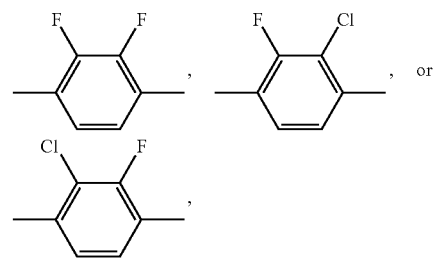

and another of the rings

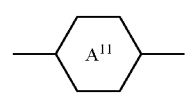

to

present denotes

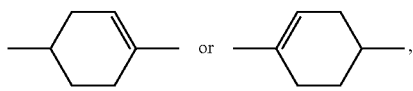

and the others, if present, each, independently of one another, denote

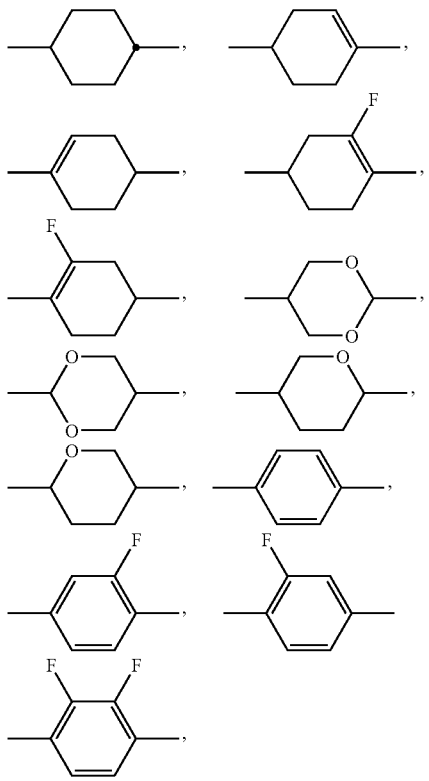

$Z^{11}$ to $Z^{13}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and m and n each, independently of one another, denote 0 or 1, and one or more compounds selected from formulae II-3, II-5, II-6 and II-7

II-3

II-5

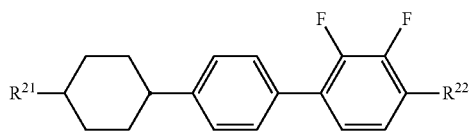

II-6

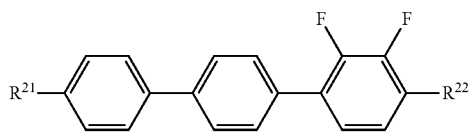

II-7

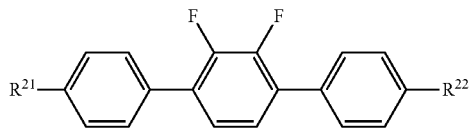

in which $R^{21}$ and $R^{22}$ each, independently of one another, denote H, an alkyl or alkenyl radical having up to 15 C atoms, in which one or more CH$_2$ groups may be replaced by —O—, —S—,

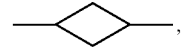

—C≡C—, —CF$_2$—O—, —O—CF$_2$—, —CO—O— or —O—CO— in such a way that O atoms are not linked directly to one another.

2. A medium according to claim 1, comprising a) a first dielectrically negative, mesogenic component (component A), which consists of one or more dielectrically negative compound(s) of formula I, and b) a second dielectrically negative, mesogenic component (component B), which consists of one or more dielectrically negative compound(s) of formula II, wherein at least one of the compounds of formula II is a compound selected from formulae II-3, II-5, II-6 and II-7

II $$R^{21}\text{—}\boxed{A^{21}}\text{—}Z^{21}\text{—}[\boxed{A^{22}}\text{—}Z^{22}]_l\text{—}[\boxed{A^{13}}\text{—}Z^{23}]_o\text{—}\boxed{A^{24}}\text{—}R^{22}$$

in which $R^{21}$ and $R^{22}$ each, independently of one another, denote H, an alkyl or alkenyl radical having up to 15 C atoms, in which one or more CH$_2$ groups may be replaced by —O—, —S—, —C≡C—, —CF$_2$—O——O—CF$_2$—, —CO—O— or —O—CO— in such a way that O atoms are not linked directly to one another, one of the rings

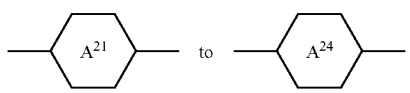

present denotes

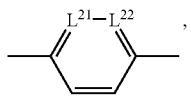

and the others, if present, each, independently of one another, denote

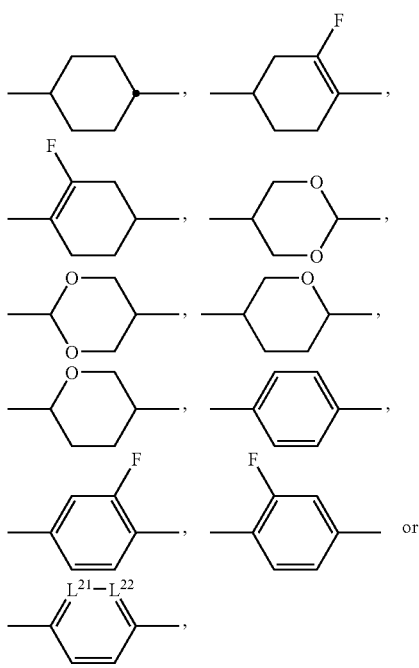

$L^{21}$ and $L^{22}$ each, independently of one another, denote $=C(X^2)-$ or $=N-$,
$X^2$ denotes F, Cl, $OCF_3$, $CF_3$, $CH_3$, $CH_2F$, or $CHF_2$,
$Z^{21}$ to $Z^{23}$ each, independently of one another, denote $-CH_2-CH_2-$, $-CH_2-CF_2-$, $-CF_2-CH_2-$, $-CF_2-CF_2-$, $-CH=CH-$, $-CF=CH-$, $-CH=CF-$, $-C\equiv C-$, $-CH_2-O-$, $-O-CH_2-$, $-CO-O-$, $-O-CO-$, $-CF_2-O-$, $-O-CF_2-$ or a single bond, and
l and o each, independently of one another, denote 0 or 1, and optionally c) a dielectrically neutral, mesogenic component (component C), which consists of one or more dielectrically neutral compounds of formula III

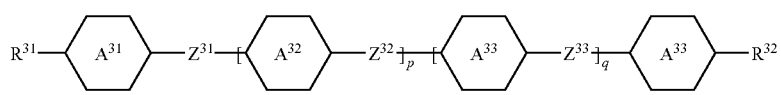

in which
$R^{31}$ and $R^{32}$ each, independently of one another, denote H, an unsubstituted alkyl or alkenyl radical having up to 15 C atoms, in which one or more $CH_2$ groups may be replaced by $-O-$, $-S-$,

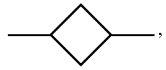

$-C\equiv C-$, $-CF_2-O-$, $-O-CF_2-$, $-CO-O-$ or $-O-CO-$ in such a way that O atoms are not linked directly to one another,

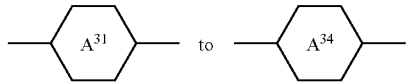

each, independently of one another, denote

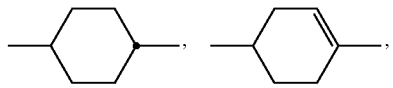
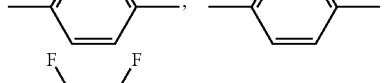

$Z^{31}$ to $Z^{33}$ each, independently of one another, each, independently of one another, denote $-CH_2-CH_2-$, $-CH=CH-$, $-C\equiv C-$, $-CH_2-O-$, $-O-CH_2-$, $-CO-O-$, $-O-CO-$, $-CF_2-O-$, $-O-CF_2-$, $-CF_2-CF_2-$ or a single bond, and
p and q each, independently of one another, denote 0 or 1, and optionally d) a further dielectrically negative, mesogenic component (component D), which consists of one or more dielectrically negative compounds selected from formula IV and V

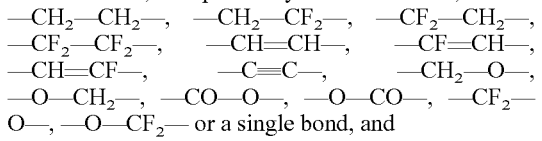

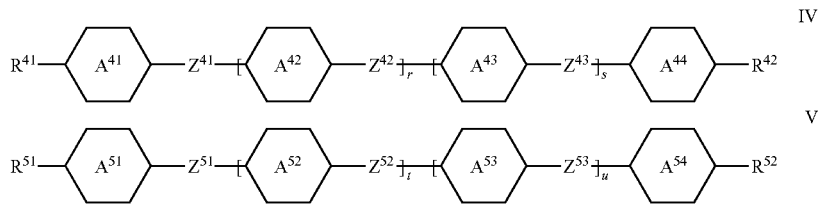

in which

R$^{41}$ and R$^{42}$ and

R$^{51}$ and R$^{52}$ each, independently of one another, denote H, an unsubstituted alkyl or alkenyl radical having up to 15 C atoms, in which one or more CH$_2$ groups may be replaced by —O—, —S—,

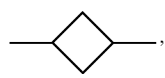

—C≡C—, —CF$_2$—O—, —O—CF$_2$—, —CO—O— or —O—CO— in such a way that O atoms are not linked directly to one another, one of the rings

and

denotes

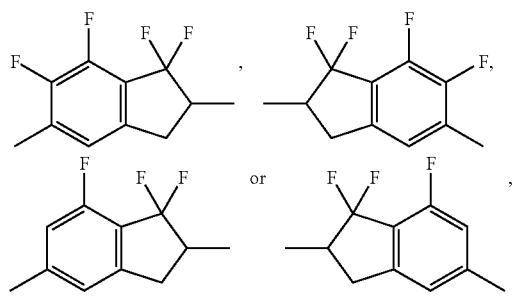

also denotes a single bond,

and the other rings

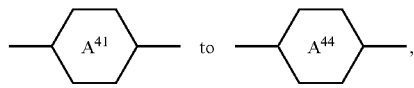

if present, each, independently of one another, denote

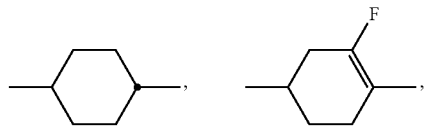

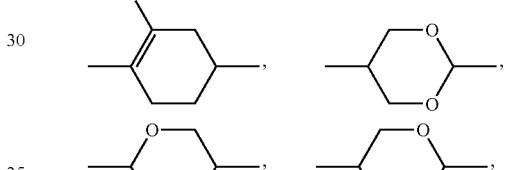

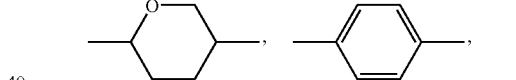

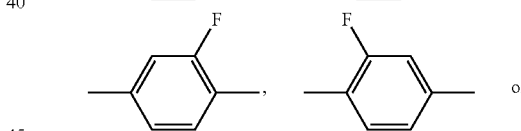

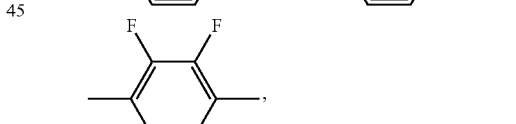

one of the rings

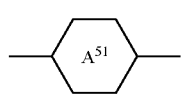

to

denotes

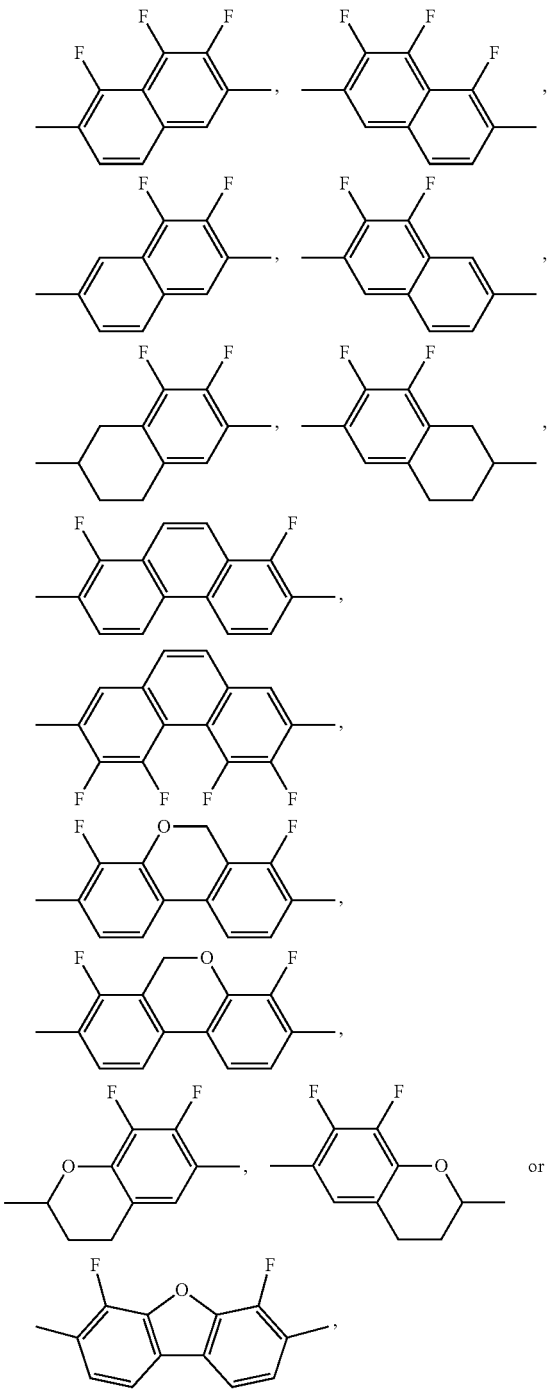

and the others, if present, each, independently of one another, denote

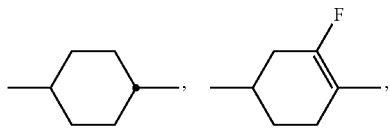

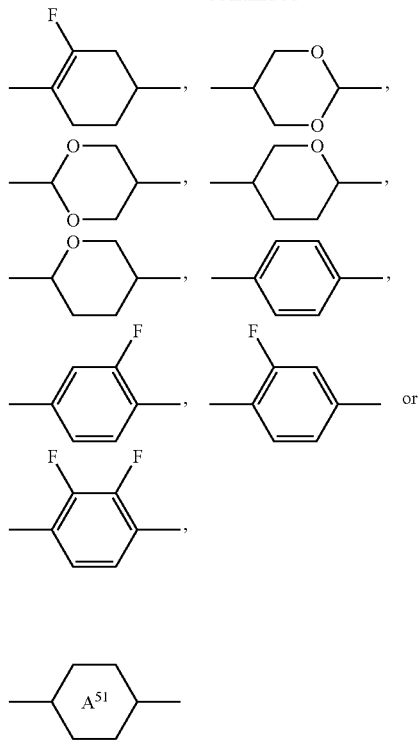

also denotes a single bond, $Z^{41}$ to $Z^{43}$ and $Z^{51}$ to $Z^{53}$ each, independently of one another, each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, r and s each, independently of one another, denote 0 or 1, and t and u each, independently of one another, denote 0 or 1, and optionally e) a chiral component (component E), which consists of one or more chiral compounds:

wherein the medium comprises at least one of components (C), (D), and (E).

3. A medium according to claim 1, comprising one or more compounds of formula I in which at least one of the groups

and present in a compound of formula I denotes

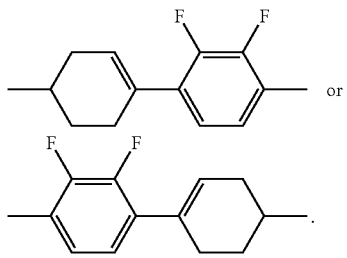

or

4. A medium according to claim 1, comprising two, three, four or more compounds of formula I.

5. A medium according to claim 1, wherein the proportion of compounds of formula I in the mixture as a whole is at least 15% by weight.

6. A medium according to claim 1, wherein the proportion of compounds of formulae IA-1 and IB-1 to IB-4 in the mixture as a whole is at least 20% by weight IA-1
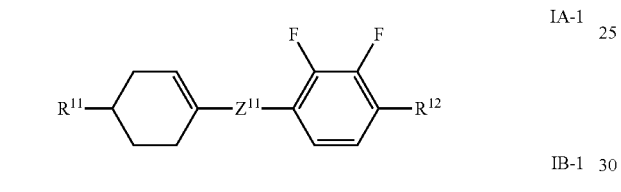

IB-1
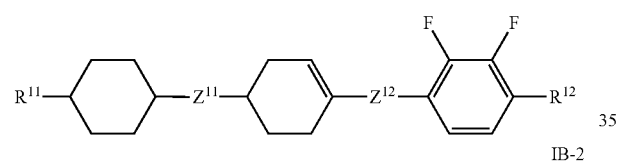

IB-2

IB-3
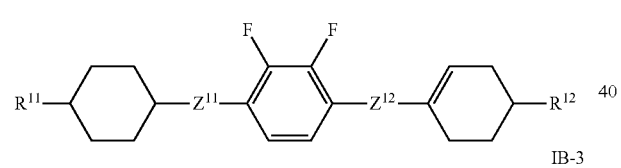

IB-4
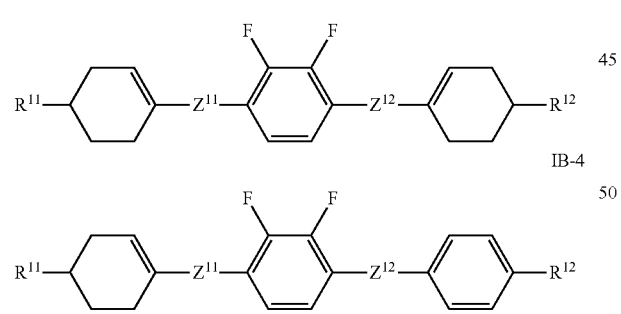

in which $R^{11}$, $R^{12}$, $Z^{11}$ and $Z^{12}$ have the meaning given in Formula I.

7. A medium according to claim 1, comprising at least one compound of formula IA-1, IB-1 to IB-3 or IB-9

IA-1
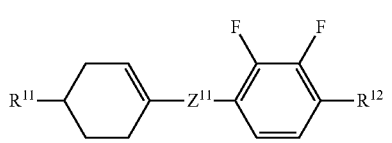

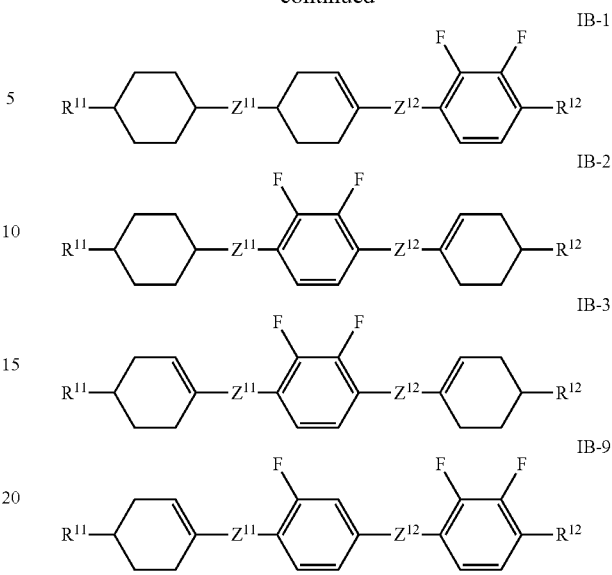

in which $R^{11}$, $R^{12}$, $Z^{11}$ and $Z^{12}$ have the meaning given in Formula I.

8. A medium according to claim 1, comprising one or more compounds of formula I in which $Z^{11}$ to $Z^{13}$ each denote a single bond.

9. A medium according to claim 2, comprising at least one of
(a) 2-80% by weight of one or more compounds of formula I,
(b) 2-80% by weight of one or more compounds of formula II,
(c) 2-80% by weight of one or more compounds of formula III, and
(d) 2-80% by weight of one or more compounds selected from formulae IV and V,
where the total content of all compounds of formulae I, II, III, IV and V in the medium is 100% by weight or less.

10. An electro—optical display, which contains, as dielectric, a liquid-crystalline medium according to claim 1.

11. A display according to claim 10, which has an active-matrix addressing device.

12. A display according to claim 10, which is based on the VA, ECB, PALC, FFS or IPS effect.

13. A method of generating an electro-optical effect comprising applying a voltage to an electro-optical display according to claim 10.

14. A method according to claim 13, wherein said electro-optical display has an active-matrix addressing device.

15. A medium according to claim 1, wherein
$R^{21}$ denotes alkyl or alkenyl, and
$R^{22}$ denotes alkyl, alkenyl, alkoxy or alkenyloxy.

16. A medium according to claim 1, which comprises one or more compounds of formula II-5.

17. A medium according to claim 1, which comprises one or more compounds of formula II-7.

18. A medium according to claim 1, which comprises one or more compounds of formula II-5 and one or more compounds of formula II-7.

19. A medium according to claim 2, wherein said medium contains component (C).

20. A medium according to claim 2, wherein said medium contains component (D).

21. A medium according to claim 2, wherein said medium contains component (E).

22. A medium according to claim 1, wherein said medium comprises at least one of a dielectrically negative compound of formula II, which is not a compound of formula II-3, II-5, II-6 or II-7

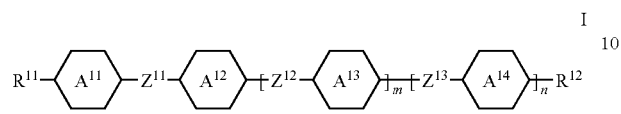  I in which

R$^{21}$ and R$^{22}$ each, independently of one another, denote H, an alkyl or alkenyl radical having up to 15 C atoms, in which one or more CH$_2$ groups may be replaced by —O—, —S—,

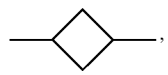,

—C≡C—, —CF$_2$—O—, —O—CF$_2$—, —CO—O— or —O—CO— in such a way that O atoms are not linked directly to one another, one of the rings

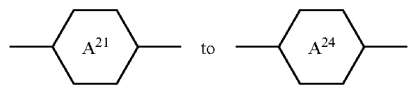

present denotes

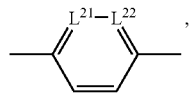, and the others, if present, each, independently of one another, denote

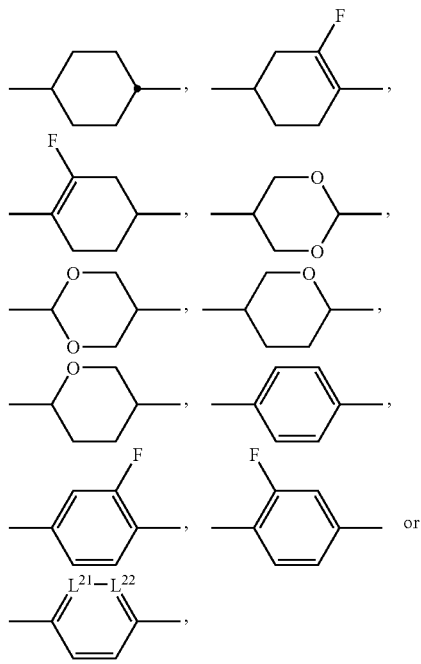

or

L$^{21}$ and L$^{22}$ each, independently of one another, denote =C(X$^2$)— or =N—, X$^2$ denotes F, Cl, OCF$_3$, CF$_3$, CH$_3$, CH$_2$F, or CHF$_2$, Z$^{21}$ to Z$^{23}$ each, independently of one another, denote —CH$_2$—CH$_2$—, —CH$_2$—CF$_2$—, —CF$_2$—CH$_2$—, —CF$_2$—CF$_2$—, —CH=CH—, —CF=CH—, —CH=CF—, —C≡C—, —CH$_2$—O—, —O—CH$_2$— CO—O—, —O—CO—, —CF$_2$—O—, —O—CF$_2$— or a single bond, and 1 and o each, independently of one another, denote 0 or 1.

* * * * *

UNITED STATES PATENT AND TRADEMARK OFFICE
CERTIFICATE OF CORRECTION

PATENT NO. : 8,168,081 B2
APPLICATION NO. : 12/373398
DATED : May 1, 2012
INVENTOR(S) : Melanie Klasen-Memmer et al.

It is certified that error appears in the above-identified patent and that said Letters Patent is hereby corrected as shown below:

Column 124, line 50 (Claim 2), Formula II appears as:

It should appear as:

-- 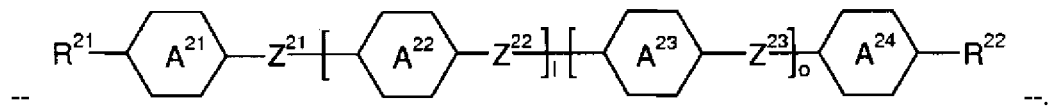 --.

Column 124, line 65 (Claim 2), reads as follows: "-C≡C-, -CF$_2$-O—O-CF$_2$-, -CO-O- or"
It should read: -- -C≡C-, -CF$_2$-O-,-O-CF$_2$-, -CO-O- or --.

Column 125, last line (Claim 2), Formula III appears as follows:

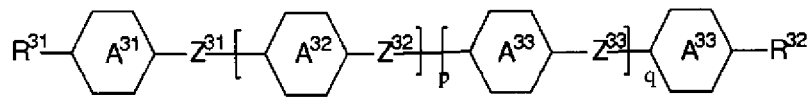

It should appear as:

-- 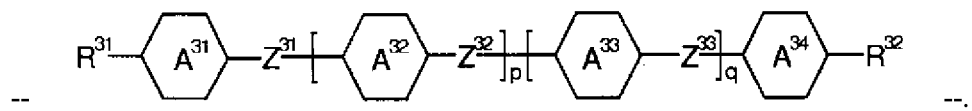 --.

Signed and Sealed this
Thirty-first Day of July, 2012

David J. Kappos
*Director of the United States Patent and Trademark Office*

CERTIFICATE OF CORRECTION (continued)
U.S. Pat. No. 8,168,081 B2

Column 126, lines 49 – 50 (Claim 2), read as follows: "$Z^{31}$ to $Z^{33}$ each, independently of one another, each, independently of one another, denote -CH$_2$-CH$_2$-,"
It should read as: -- $Z^{31}$ to $Z^{33}$ each, independently of one another, denote -CH$_2$-CH$_2$-, --.

Column 130, lines 35 – 36 (Claim 2), read as follows: "$Z^{51}$ to $Z^{53}$ each, independently of one another, each, independently of one another, denote -CH$_2$-CH$_2$-,"
It should read as: -- $Z^{51}$ to $Z^{53}$ each, independently of one another, denote -CH$_2$-CH$_2$-, --.

Column 133, line 11 (Claim 22), appears as: Formula I

It should appear as: Formula II

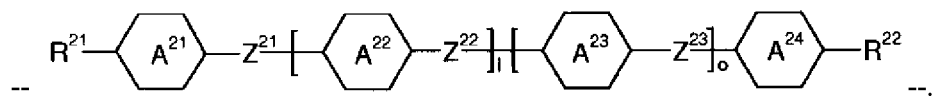

--.